(12) United States Patent
Coghlan

(10) Patent No.: US 10,887,550 B2
(45) Date of Patent: Jan. 5, 2021

(54) LOCAL AUTHORITY'S MOBILE PLATFORM

(71) Applicant: Robert George Coghlan, Hialeah, FL (US)

(72) Inventor: Robert George Coghlan, Hialeah, FL (US)

( * ) Notice: Subject to any disclaimer, the term of this patent is extended or adjusted under 35 U.S.C. 154(b) by 0 days.

(21) Appl. No.: 16/925,726

(22) Filed: Jul. 10, 2020

(65) Prior Publication Data

US 2020/0344447 A1 Oct. 29, 2020

(51) Int. Cl.
*H04N 7/15* (2006.01)
*H04L 29/06* (2006.01)
*G06K 9/00* (2006.01)
*G06F 16/587* (2019.01)
*G06F 16/51* (2019.01)

(52) U.S. Cl.
CPC ............. *H04N 7/152* (2013.01); *G06F 16/51* (2019.01); *G06F 16/587* (2019.01); *G06K 9/00288* (2013.01); *H04L 63/0861* (2013.01)

(58) Field of Classification Search
CPC ........... H04N 7/15; H04L 29/06; G06F 16/51; G06F 16/587; G06K 9/00
USPC ............................................. 348/14.01–14.16
See application file for complete search history.

(56) References Cited

U.S. PATENT DOCUMENTS

| | | | | |
|---|---|---|---|---|
| 2003/0200227 | A1* | 10/2003 | Ressler | G08G 1/017 |
| 2014/0368601 | A1* | 12/2014 | deCharms | H04L 65/403 |
| | | | | 348/14.02 |
| 2016/0173950 | A1* | 6/2016 | Brown, Jr. | G06Q 30/0277 |
| | | | | 725/116 |
| 2019/0318618 | A1* | 10/2019 | Gilbert | G06Q 50/18 |

* cited by examiner

*Primary Examiner* — Melur Ramakrishnaiah

(57) ABSTRACT

A unified process of immediate intervention for local and remote parties interactive audio-visual teleconferencing by means of a local authority's dedicated battery powered wearable mobile computerized device display monitor interface platform is provided. The unified process includes among other embodiments and processes; a secured central computer, a network, and a Local Authority's Mobile Platform, (LAMP). A secured immediate intervention audio-visual teleconferencing (IIAVT) means initializes between a plurality of local and remote individuals when a local authority and a local individual are interacting by means of the local authority engaging a LAMP's initialization means, and whereas a process of the present invention is performed for the principle of maintaining an order of an enforcement of a law and an exercise of a right.

3 Claims, 29 Drawing Sheets

(XOXOXO) —— 46

FIGURE 28

LOCAL AUTHORITY'S MOBILE PLATFORM

BACKGROUND OF THE INVENTION

Background art in the current practice of providing a platform that is dedicated to a process of immediate intervention by means of a local to remote teleconference is comprised of disassociated elements. Current art suggests that through a cobbling together of a patchwork of elements that were not originally intended to provide a dedicated platform that contains embodiment and processes for the purpose of providing an immediate intervention audio-visual teleconference when a local authority and a local individual are interacting for the purpose of maintain an order of an enforcement of a law and the exercise of a right conditions that such art is cohesive in functionality. As well, currently practiced art implies structures formed from an array of elements that are freely pooled from miscellaneous resources and adjoined in such a way as to provide an impression that the art was attentively and systematically planned. Reason has it that such combined art does not provide a unified platform, as a problem in the field of endeavor to which the present invention pertains persists. See following.

FIELD OF THE INVENTION

The present invention relates to the field of endeavor: two-way video and voice communication, i.e., telephony, interactive video distribution systems, computer graphics processing and selective visual display, multi-plex communications, telephonic communications and electrical computers and digital processing systems.

DESCRIPTION OF RELATED ART

Problem(s) exist when a local authority is interacting with a local individual. In the current practice of interaction between a local authority and local individual, there are limited to no technological means to provide for a platform that supports an immediate intervention audio-visual teleconferencing between a plurality of local individuals and remote individuals for the purposes of maintaining an order of law when a local authority is enforcing a law, and when a local individual is exercising a right, when a local authority and a local individual are interacting.

Consequently an in view of such lack of technological means, occasions where a local authority and/or a local individuals action were deemed inconsistent and non-compliant with a correct enforcement of a law and a correct exercise of a right became apparent and were recently and often caught on video recordings that were played-out in a media. Thus, and in view of a public perception of disorder of a local authority enforcing a law and/or a local individual exercising a right, caused civil disorder along with injury, death and destruction of property, both private and governmental. Examples of such disorder interactions are provided further in this document.

A process of the present invention is drawn towards the aforementioned problem(s) in the field of endeavor to which the present invention pertains. This document details how a process of the present invention solves such problem. See following.

How a process of the present invention solves the aforementioned problem(s) in the field of endeavor to which the present invention pertains.

In its entirety, the present invention is engineered and formulated with thoughtful consideration toward engineering of all its embodiments inclusive of a central computer, a LAMP, a registry database and means to provide for an IIAVT. Thus, those interacting with the present invention's processes are not dependent on chance planning but rather are interacting with a process that is designed, engineered, built-out and operates as unified. Current technology in the field of endeavor of the principles of the enforcement of a law and the exercise of a right has limited means to real-time to provide for an "immediate intervention audio-visual teleconference" when a local authority is interacting with a local individual. Early and contemporary practice of an enforcement of a law and the exercise of a right and their respective contemporary practice make known such limited means. For these matters, the prevailing state of the art of the principles of the enforcement of a law and the exercise of a right, specifically in the form of immediate intervention by means of an audio-visual teleconference between local and remote parties, necessitates technological modernization in order to attend to the long-felt need of securing the well-being of an enforcement of a law and the exercise of a right for the purpose of maintaining a civil order through a corollary effect of such processes as the present invention provides.

In light of the series of current art of disconnected embodiments and the undertaking of a search and an operation of strenuously cobbling together a patchwork of assorted prior art references in order to produce a ghost of a façade of the nature of the present invention for purposes of producing a resemblance of the present invention's materially means, it should be understood that that present invention provides an inventive leap of such scope that its facility uniformly achieves a result that is not available in part or in whole in current art in the practice of immediate intervention of IIAVT. With reference then to such current art as exhibited as unified in the present application, there is a failure of all current art taken singularly or in combination to exhibit the inventive leap to a level and degree as the facility of the present invention provides in the present invention's conceptual consideration, explicitly, its facility of providing for an immediate intervention IIAVT. As such, no current art is efficiently suitable for reference as current art references are involved chiefly with apparatuses and applications. Whereby, the present invention comports a 'unified process". With these respects, all currently art fails in reference to the conceptual considerations of the present invention, and the present succeeds in providing a means that materially enhances currently practiced art in order to address the long felt and socially urgent cause to which its processes are drawn.

The present invention is therefore drawn towards problems in its field of endeavor and supplies enhancements toward the described limited technological means and associated problems, as it affords the presence of remote parities to be virtually present when local authorities are interacting with local individuals. Computerized processes as specified in the present invention as well provide means of programmatically contacting remote individuals for the purpose of immediately providing for an intervention means when a local authority is interacting with a local individual.

Individuals, such as those specified in the present invention's Claims, Abstract, Specification and Drawings are inherently imperiled to risks of internal and external orders when a local authority is interacting with a local individual as such parties are not able to be effectually and programmatically contact remote parties for the purpose of an immediate intervention of an audio-visual teleconference by the current state of the art's technology to a level and degree as the processes of the present art accomplishes. A unified process comprised such as that of the present invention are necessitated to address the long-felt and indeed "socially urgent" circumstance as the expressed technological problem in the field of endeavor of immediate intervention of an audio-visual teleconference supplies.

In light of historical and recent incidents whereupon local authorities are interacting with local individuals, and the action of one or both parties escalated into actions that are deemed as inconsistent with the principles of the enforcement of a law and the exercise of a right where captured on a third parties' electronic device and distributed to a media and in turn a media distributed the capturing of the actions by a local authority and a local individual that escalated into actions that are deemed inconsistent and non-compliant with the principles of the enforcement of a law and the exercise of a right, played out in a media in such a form as to spur social unrest. And some historical and contemporary cases, there is still no investigative conclusion as to why the actions of a local authority and a local individual that escalated into actions that are deemed inconsistent and non-compliant with the principles of the enforcement of a law and the exercise of a right and therefore are embedded in a social psychology of a populace, provide a 'pressuring' of a populace so when a further incident of a local authority and a local individual that escalated into actions that are deemed inconsistent and non-compliant with the principles of the enforcement of a law and the exercise of a right plays out in a media, a populace has a tendency to abruptly react in a manner that is as well deemed inconsistent and non-compliant with the principles of the enforcement of a law and the exercise of a right in the form of rioting, looting, violence and the destruction of personal and public property. Given then an action of a local authority and a local individual that escalated into actions that are deemed inconsistent and non-compliant with the principles of the enforcement of a law and the exercise of a right and are time-sensitive with respects to interactions of a local authority and local individuals actions, current response systems are understaffed and technologically ill-equipped to provide expedient, accurate response in terms of a mitigating effort to ensure an order of an enforcement of a law and the order of and exercise of a right.

The inventor of the present invention points out and distinctly claims as per the Claims of the present invention that the present invention is characterized as a "process", for immediate intervention IIAVT, by utilizing clear and definitive claim language in the claims and limitations of the present invention. The present invention's process contain an innovative utility of a social interest as it makes available means for programmatically computerized real-time response and addressing of a local authority and a local individual that escalated into actions that are deemed inconsistent and non-compliant with the principles of the enforcement of a law and the exercise of a right for the purpose of maintaining a social order. For reasons such as these, a problem in the current state of technology of immediate intervention by means of a local to remote parties IIAVT that are dependent upon the legacy of conventional means of addressing a local authority' and/or a local individual's actions that escalated into actions that are deemed inconsistent and non-compliant with the principles of the enforcement of a law and the exercise of a right in view of the failure of current art to provide a facility such as that of the present invention provides becomes evident. Conventional legacy conventions provide means for a local authority to communicate with a remote authority by means of communication such as radio communications. In doing so, a local authority is provided means to communicate with a remote authority in order to address an interaction of a local authority with a local individual. Conversely, there are no currently practiced means to provide for a local individual who is interacting with a local authority with an equitable means of communicating with a remote individual. An imbalance in equitable means of communication therefore becomes readily apparent. The present invention overcomes such communication inequity of the means of legacy dependency upon radio communications, police body cams, dashboard cams and third party electronic device recordings of interactions of a local authority and a local individual that escalated into actions that are deemed inconsistent and non-compliant with the principles of the enforcement of a law and the exercise of a right by its means to provide for a local to remote an IIAVT means in order to provide for the virtual presence of remote parities in order to quell a prospective action of a local authority and/or a local individual so that an order of an enforcement of a law and an order of an exercise of a right may be maintained. As such, a prominent utility of the present invention may be characterized as, "preemptive".

As such the processes of the present invention transform the current state of the art of immediate intervention IIAVT, and in doing so, generates near real-time interactive processes of an IIAVT in order to provide expedient response to an interaction between a local authority and a local individual. It is therefore imperative that such interactions should be addressed with the processes of the present invention as the present invention will provide increased levels of data in the form of near-real time digital imagery of the above-described set of interactions between a local authority and a local individual as such technological processes will afford a novel resolution to the problems exhibited within the current state of technology in the art of immediate intervention IIAVT of a local authority interacting with a local individual. The present invention essentially discovers a process of immediate intervention IIAVT of a local authority and a local individual interactions will follow a civil order. Thus, the problem in the field of endeavor of local immediate intervention IIAVT for purposes described herein will be materially enhanced.

Details of how a process of the present invention solves the stated problem(s) in its field of endeavor involve:

A processes for providing a central computer that is encoded with registry database and a computerized local platform, both of which are connected to a network, and being comprised of at least the internet for a purpose of an immediate intervention audio-visual teleconference IIAVT between a local authority and a local individual in an effort to ensure that an action of a local authority is consistent and compliant with the principles of the enforcement of a law, and an action of a local individual is consistent and compliant with an exercise of a right. More particularly, the present invention provides for unified process of immediate intervention teleconferencing between local parties, such as a local authority and a local individual to virtually interact and audio-visually communicate through a teleconference means with remote parties so the local parties may be advised of how to maintain an action that is consistent with the principles of the enforcement of a law and the exercise of a right.

For such purposes it should be understood that current practice of the principles of the enforcement of a law is generally rendered at a location, such as a "locality" and is done so with an interaction between a local authority and a local individual while each party is remote from the resource of individuals whom would otherwise condition such interaction in such a manner as to counsel the involved parties who may be under duress. Often times, the matter of involved parties under duress causes confusion in terms of an understanding of a communication between the involved parties and the actions of the involved parties escalate into actions that are deemed and inconsistent and non-compliant with the principles of the enforcement of a law and the exercise of a right. A "conceptual consideration" of the present invention is to provide for a virtual presence of remote parities in a IIAVT so that local parties may be guided through the course a such interaction, notably when the involved parties are under duress and the tension of such duress begins to lead the parities to action that would be considered inconsistent and non-compliant with the principles of the enforcement of a law and the exercise of a right.

A maintenance of an order of a law and order of a right will be materially enhanced when local parties are able to virtual IIAVT with remote parities so that local parities will not feel "isolated" in a locality, by the virtual presence of remote parties that the local parties consider are professionally and personal trustworthy and may depend on the counsel of the remote parities in order to maintain an action that is deemed consistent with an order of a law and the exercise of a right. As a remote party such as a remote authority (embodiment 19), in relation to a local authority that holds a ranking of a deputy may consist of a higher ranking authority such as; a Lieutenant, Sargent or Chief the local ranking authority would be well-advised as to an action to undertake for the purpose of properly enforcing a law, and in turn, ensure an order of a law. Similarly, a local individual who is involved with an interaction with a local authority would, by the means of "remote contact individuals" (embodiment 20), depend on the counsel of the remote contact individual that were stipulated by the local party when the local party inputted a data into a registry database in advance of the interaction between the local individual and the local authority. The local individual remote contact individuals may consist of, though not be limited to such parties as a family relation such a spouse, a parental figure, a professional colleague, a friend, neighbor, or spiritual advisor. As well the local individual may input of a data of a remote contact individual such as a private attorney and be likewise legally counseled to further ensure an action of the local individual remain consistent with the compliance of the principles of the enforcement of a law while the local individual is exercising a right.

The charter of a "remote neutral moderator" (embodiment 21), is characterized as an individual who is "neutral" to the interests of the involved parties, and rather, maintains an order of a IIAVT in such a form as to provide for equality of all involved parties to participate in the IIAVT in an orderly fashion. The remote neutral moderator therefore would be trained to moderate an IIAVT in a reasonable and impartial matter so the locally involved individuals may participate in the IIAVT in a fair and balanced custom. In the event a local jurisdiction, such as the municipality of a city does not have a resource to provide for a remote neutral moderator, a broader governing agency, such as a county or state level may employ a remote neutral moderator to be "on-call" for a duration of time, such as a twenty four hour per day, five day a week, three hundred and sixty five day a year schedule.

As the processes of the present invention are reasoned as "immediate intervention" it should be explicit in such description that the processes of the present invention would be disposed to carry out an ongoing IIAVT at any time of day or night. The processes of the present invention would do so by immediately and programmatically contacting a remote party in relation to a local authority when the local authority engages an "initialize button" on the local authority's LAMP and populate the IIAVT with a number of parties, for example two (2) parties that provide of a counsel of a proper enforcement of a law.

An immediate and programmatic process of the present invention would be to as well contact a remote neutral authority and populate an ongoing IIAVT with the virtual presence of a remote neutral moderator. In a similar manner, when a local individual is interacting with a local authority and the local authority requests an identifying material of the local individual, such a driver license, and when the local authority inputs a data of the local individual in the local authority's LAMP by means of an embodiment of a keyboard, the processes of the present invention immediately and programmatical contact a plurality of the local individual's remote contact and populate the IIAVT with a plurality of the local individual's remote contacts, such as the local individual's remote contact that were inputted into a database in advance of the interaction between the local authority and the local individual. Upon an occasion whereby a local authority has reasonable cause to determine that a local individual has been involved in an action that would be inconsistent and non-complaint with a law, and/or has been deemed by the local authority, perhaps through notification of third party individuals such has a shop owner who has personally witness the actions of a local individual to be involved in the commission of a crime, such a theft, the local authority may have a legal obligation to identify the local individual by means described herein, such as the utilization of a facial recognition technique, performed by means of a facial recognition embodiment of the local authority's LAMP, notably when the local individual is in refusal to offer a personally identifying information to the local authority, such a driver license.

Further, a geographic position and orientation of the local authority is made known to the remote parties, inclusive of a remote authority, a remote contact individual and a remote neutral moderator so the remote parties may have a "sense" as to the locality of the involvement between the local authority and the local individual. As the context of an IIAVT is considered as, "ongoing" and the IIAVT is populated with the virtual presence of remote individuals, an ambition of the present invention to carry out and maintain an order of an enforcement of a law and the order of an exercise of a right may consequently transpire.

In terms of the aforementioned "background of the invention" it should be understood and appreciated that an ambition of the present invention is to quell a prospective inconsistent and non-compliant actions in reference to an enforcement of a law by a local authority and the exercise of a right by a local individual in order that an order of a law and an order of a right are maintained. In an effort to provide a concrete working example of recent interactions between a local authority and a local individual that escalated beyond a consistency and a compliance with an enforcement of a law by a local authority and the exercise of a right by a local individual, the inventor of the present invention herein provides examples and consequences of a local authority interacting with a local individual without the availability of processes of the present invention. Such examples are real-world examples and are to be understood as illustrative, of a local authority and a local individuals actions, during an interaction between a local authority and a local individual that escalated into a manner that is understood as being inconsistent and non-compliant with the principles of the enforcement of a law by a local authority and the exercise of right by a local individual. In providing such example illustrations, prospective practitioners of the processes of the present invention will be advised of how the processes of the present invention may potentially provide a means to quell an action of a local authority and a local individual in advance of such actions by a local authority and a local individual that escalated into actions that are inconsistent and non-compliant with the principles of the enforcement of a law by an authority and an exercise of a right by an individual, and hence, maintain an order of an enforcement of a law by a local authority and an order of an exercise of a right by a local individual.

Within the due course of producing the present invention, the Inventor recognizes an urgent social value to mitigate further involvements of local authorities and local individuals. With such value in mind, the Inventor, for the ethical merit of considering the empathy for the foregoing examples of individuals, extends condolences to the family members, friends, and professional colleagues of involved parties. In such light, an ambition of the Inventor is to provide for a more "just" society, and when the processes of the present invention are in practice, it will be remarkably noted that the processes of the present invention provide means to maintain a social order in terms of the principles of the enforcement of a law and the exercise of a right. Therefore, "some good" will come out of the examples herein, and in essence provide for what all parties seek, "a more just and peaceful society".

Eleven (11) Examples and consequences of a local authority interacting with a local individual without the availability of the processes of the present invention (In chronological order).

1) 30 Aug. 2010: Seattle, Wash. USA a local authority fatally shot a local individual. The local individual, by trade, was a woodcarver and was holding a woodcarving knife and was shot four times by the local authority. The Seattle Police Department's Firearms Review Board ruled that the local authority was unjustified in shooting the local individual and violated the department's policy. The local authority resigned from The Seattle Police Department. The processes of the present invention of immediate invention IIAVT so the involved local individuals may have been counseled by remote authorities and remote contact individuals for the purposes of de-escalating the escalated actions of the local individuals were not available for practice, and consequently, the escalated action(s) of either the local authority and/or the local individual escalated into action(s) that are deemed as inconsistent and non-compliant with the principles of the enforcement of law and the exercise of a right. The involvement of the parities was relayed in a media and a public response ensued.

2) 5 Oct. 2010: A Phoenix, Ariz. USA, a local authority fatally shot a local individual when police were called to his family's home in response to a domestic dispute. The local individual was holding a bicycle when he was fatally shot by the local authority. The local authority was found guilty of manslaughter, assault, and animal cruelty. The processes of the present invention of immediate invention IIAVT so the involved local individuals may have been counseled by remote authorities and remote contact individuals for the purposes of de-escalating the escalated actions of the local individuals were not available for practice, and consequently, the escalated action(s) of either the local authority and/or the local individual escalated into action(s) that are deemed as inconsistent and non-compliant with the principles of the enforcement of law and the exercise of a right. The involvement of the parities was relayed in a media and a public response ensued.

3) 9 Feb. 2012: A Culpeper, Va. USA, a local authority fatally shot a local individual while she was in her SUV. The local authority was thereafter convicted of voluntary manslaughter. The processes of the present invention of immediate invention IIAVT so the involved local individuals may have been counseled by remote authorities and remote contact individuals for the purposes of de-escalating the escalated actions of the local individuals were not available for practice, and consequently, the escalated action(s) of either the local authority and/or the local individual escalated into action(s) that are deemed as inconsistent and non-compliant with the principles of the enforcement of law and the exercise of a right. The involvement of the parities was relayed in a media and a public response ensued.

4) 22 Jul. 2012: A Los Angeles Calif. USA, Police Department local authority kicked and punched a local individual during an arrest. The local individual later died in police custody. The local authority was found guilty of assault, though not found guilty of causing the local individual's death. The local authority was sentenced to three (3) years imprisonment. The processes of the present invention of immediate invention IIAVT so the involved local individuals may have been counseled by remote authorities and remote contact individuals for the purposes of de-escalating the escalated actions of the local individuals were not available for practice, and consequently, the escalated action(s) of either the local authority and/or the local individual escalated into action(s) that are deemed as inconsistent and non-compliant with the principles of the enforcement of law and the exercise of a right. The involvement of the parities was relayed in a media and a public response ensued.

5) 17 Jul. 2014, A New York City Police Department local authority during an arrest of a local individual on suspicion of selling single cigarettes from packs without tax stamps, placed the local individual in a "chokehold". The local individual died in the New York City borough of Staten Island as a result of the local authority putting him in a chokehold while arresting him (despite chokeholds being banned in NYPD since 1993). A video footage of the incident captured by a secondary individual was replayed in a national media and generated a widespread national awareness and provoked inquiries referencing the appropriate use of force by a law enforcement in a manner consistent with an enforcement of law. The local individual, with multiple police officers pinning him down upon the concrete of a sidewalk, exclaimed, "I can't breathe" 11 times while lying face down on the sidewalk. The local individual lost consciousness, as he remained lying on the sidewalk for seven minutes while officers waited for an emergency services in the form of an ambulance to arrive. The local individual was pronounced deceased at a district hospital approximately one hour after the incident. The processes of the present invention of immediate invention IIAVT so the involved local individuals may have been counseled by remote authorities and remote contact individuals for the purposes of de-escalating the escalated actions of the local individuals were not available for practice, and consequently, the escalated action(s) of either escalated into action(s) that are deemed as inconsistent and non-compliant with the principles of the enforcement of law and the exercise of a right. The involvement of the parities was relayed in a media and a nationwide public response in the form of a public outcry inclusive of rioting, looting, protesting for justice and violence ensued in the wake of the incident.

6) 19 Jan. 2020, [End of Watch] Two Honolulu Hi., USA, Police local authorities were shot and killed while responding to a stabbing call at a home in Honolulu, Hi. One local authority was one of the first police officers to arrive at the scene and tended to a victim outside of a home. As the local authority and other officers walked toward the house a man, a local individual discharged a firearm, killing the local authority. A second local authority was shot moments later as he and other officers arrived on the scene. The first local authority was a U.S. Air Force Reserves veteran. The local authority served with the Honolulu Police Department for seven (7) years and previously served with the Montgomery County Sheriffs Office in the state of Tennessee in the USA. The local authority is survived by three daughters and one grandson. The second local authority had served with the Honolulu Police Department for nine (9) years. He is survived by his wife and teenage son. The processes of the present invention of immediate invention IIAVT so the involved local individuals may have been counseled by remote authorities and remote contact individuals for the purposes of de-escalating the escalated actions of the local individuals were not available for practice, and consequently, the escalated action(s) of either the local authorities and/or the local individual who is now presumed deceased in view of a house fire, escalated into action(s) that are deemed as inconsistent and non-compliant with the principles of the enforcement of law and the exercise of a right. The involvement of the parities was relayed in a media in the wake of the incident.

7) 17 Feb. 2020, [End of Watch] A White Mountain Apache Tribal Police Department, Pinetop, Ariz., USA, a local authority was shot and fatally wounded subsequent to responding to reports of shots fired in the vicinity of the Hon-Dah Casino in Pinetop, Ariz., shortly before 1:00 am local time. The local authority was first to arrive on the scene and encountered a local individual, who instantly assaulted him. During an ensuing struggle, an individual male, fatally shot the local authority. Another officer who arrived on the scene shot and killed the local individual. The local authority served with the White Mountain Apache Tribal Police Department for nine (9) months and formerly served with the Navajo County Sheriffs Office. He is survived by his wife and two children. The processes of the present invention of immediate invention IIAVT so the involved local individuals may have been counseled by remote authorities and remote contact individuals for the purposes of de-escalating the escalated actions of the local individuals were not available for practice, and consequently, the escalated action(s) of either the local authority and/or the local individual escalated into action(s) that are deemed as inconsistent and non-compliant with the principles of the enforcement of law and the exercise of a right. The involvement of the parities was relayed in a media in the wake of the incident.

8) 13 Mar. 2020, [End of Watch] A Philadelphia Police Department, Pennsylvania USA, local authority was shot and killed during a SWAT team operation to arrest a homicide suspect, herein known as a local individual. The local authorities' SWAT team was securing the home the local individual opened fire on the SWAT team and a round of ammunition assailed in one of his shoulder's. The local authority was transported to nearby Temple University Hospital where he succumbed to his wound 20 minutes after being shot. The local individual who shot the local authority was charged with murder. The local authority served with the Philadelphia Police Department for 23 years. The local authority was posthumously promoted to the rank of Sergeant. He is survived by his wife and two children. One of the local authority's sons also served with the Philadelphia Police Department. The processes of the present invention of immediate invention IIAVT so the involved local individuals may have been counseled by remote authorities and remote contact individuals for the purposes of de-escalating the escalated actions of the local individuals were not available for practice, and consequently, the escalated action(s) of either the local authority and and/or the local individual's actions escalated into action(s) that are deemed as inconsistent and non-compliant with the principles of the enforcement of law and the exercise of a right. The involvement of the parities was relayed in a media in the wake of the incident.

9) 9 Apr. 2020, [End of Watch] An Indianapolis Metropolitan Police Department, Indiana USA local authority was shot and killed while responding to a domestic disturbance call. A subject, herein known as a "local individual" inside a home opened fire on the local authority. The local authority was transported to a local hospital she later succumbed to her wounds. The local individual was taken into custody and charged with murder. The local authority was a veteran of the National Guard and served with the Indianapolis Metropolitan Police Department for three (3) years. She is survived by her 3-year-old son, her parents, both of whom serve with the Marion County Sheriffs Office, and two sisters who have worked in the Corrections Department. The processes of the present invention of immediate invention IIAVT so the involved local individuals may have been counseled by remote authorities and remote contact individuals for the purposes of de-escalating the escalated actions of the local individuals were not available for practice, and consequently, the escalated action(s) of either the local authority and and/or the local individual escalated into action(s) that are deemed as inconsistent and non-compliant with the principles of the enforcement of law and the exercise of a right. The involvement of the parities was relayed in a media in the wake of the incident.

10) 31 May 2020, [End of Watch] A Detroit Police Department, Michigan USA, ft local authority died while responding to a domestic violence call. The local authority was shot by a suspect, herein known as a "local individual" as he approached a door. A subject, herein known as the "local individual" aimed a semi-automatic handgun at the local authority. the local authority immediately grabbed the firearm and struggled with the local individual. Both the local authority and the local individual simultaneously fired shots. The local authority was struck once in the head and the local individual was struck twice. the local authority suffered a traumatic brain injury and remained in a rehabilitation facility until his passing. The local authority served with the Detroit Police Department for 17 years. He is survived by his wife, daughter, and two sons. The processes of the present invention of immediate invention IIAVT so the involved local individuals may have been counseled by remote authorities and remote contact individuals for the purposes of de-escalating the escalated actions of the local individuals were not available for practice, and consequently, the escalated action(s) of either the local authority and and/or the local individual escalated into action(s) that are deemed as inconsistent and non-compliant with the principles of the enforcement of law and the exercise of a right. The involvement of the parities was relayed in a media in the wake of the incident.

11) 12 Jun. 2020, An Atlanta Police Department, Atlanta Ga., USA, local authority fatally shot a local individual in the parking lot of a local restaurant. When a second police officer, herein known as a "local authority" approached the local individual, the local individual scuffled with the officers, and took the second local authority's taser and punched the local authority and ran. When the local authority pursued the local individual, the local individual turned to fire the taser toward the local authority, who then shot the local individual twice in his back. the local individual subsequently died. A secondary local individual captured the incident on a computerized device and footage of the incident from the officers' bodycams, from the secondary individual's computerized device, and a security camera at the restaurant were widely distributed in a media the local authority was fired and has been charged with felony murder and ten additional offenses. The processes of the present invention of immediate invention IIAVT so the involved local individuals may have been counseled by remote authorities and remote contact individuals for the purposes of de-escalating the escalated actions of the local individuals were not available for practice, and consequently, the escalated action(s) of either the local authority and/or the local individual escalated into action(s) that are deemed as inconsistent and non-compliant with the principles of the enforcement of law and the exercise of a right. The involvement of the parities was relayed in a media and a nationwide public response in the form of a public outcry inclusive of rioting, looting, protesting for justice and violence ensued in the wake of the incident.

The foregoing example illustrations and their ambition to provide practitioners of the processes of the present invention a means to understand it's functioning utilities in real world settings are in their entireties provided to illustrate the conceptual consideration and it's long felt and indeed, 'socially urgent' need for practice. As the foregoing examples illustrate a local authority's and/or a local individual's action that escalated beyond a consistency with a law and a right, a further and notable outcome of such actions are such that some of the actions of a local authority and/or a local individual were captured on an audio-visual recording of by a secondary individual that was in proximity to the local authority and the local individual. A relation of such audio-visual recording of the local authority's interaction with the local individual was presented in a media of a populous, namely the populous of the United States of America, (USA). An ensuing social disorder abruptly became apparent causing widespread social misunderstandings in the form of social movements that were predicated upon a concept of an anti-authority or an anti-policing state. In addition, there was widespread social unrest in the form of rioting, looting, violence, destruction of property and political polarization, all of which came at an economic cost to the populace of the United States of America. It should as well be understood that as such audio-visual recording by a secondary individual of a local authority and a local individual's interaction during an encounter between a local authority and a local individual was presented in a media and as a media is as well an international media, a social unrest in a secondary countries also took place, and as well provided for rioting, looting, violence and an anti-authority and anti-police state of mindset in a populace of a country that is considered foreign to The United States.

As the processes of the present invention were not available at the time of the aforementioned example illustrations, there was little to no clear way for remote parties in relation to a local authority and a local individual to counsel a local authority and a local individual for the purposes of quelling an action of a local authority and a local individual and so an action of a local authority and a local individual would not escalate into an action that would be deemed as inconsistent and non-compliant with the principles of the enforcement of a law and the exercise of a right.

The processes of the present invention are drawn towards such lack of technology in the field of endeavor of immediate intervention IIAVT in order that interactions between a local authority and a local individual do not escalate outside of the bounds of an enforcement of a law and an exercise of a right. As such, a secondary individual equipped with an audiovisual recording device such as a cell or smartphone making an audio-visual recording of such actions by a local authority and a local individual that are outside of the bounds of an enforcement of a law and an exercise of a right, and providing such audio-visual data to a media and a media distributing such audio-visual data to a populace of persons such as the populace of The United States and other foreign countries reacting in such a manner as to exacerbate an already inflammatory social condition that determines an ensuing state of social unrest inclusive of looting, rioting, violence and destruction of personal and private property, all of which come at critical social and economic costs to a populace of persons.

A further illustration of the preceding claims and limitations of the present invention are herein provided in order that a conceptual consideration of an operational quality of the present invention is fully illustrated so that one ordinarily skilled in the art of the field of endeavor to which the present invention pertains may understand a conceptual consideration and an operational quality of the present invention in order to make and practice the processes of the present invention in a manner that is consistent with a manner in which the Inventor of the present invention intends. The Claims and Limitations of the present invention being further characterized as; a unified process for immediate intervention of local and remote parties interactive audio-visual teleconferencing through means of a local authority's dedicated battery powered wearable mobile computerized device display monitor interface platform. A composite of the LAMP may be comprised of though not limited to a bullet-proof encasement fabricated for the purpose of protecting a local authority as the LAMP is mounted over or in proximity to a vital organ, the heart, of a local authority. A mounting means of the LAMP upon a vest of a local authority may be comprised of though not limited to; a clipping means, a buttoning means, a magnetic means, a pouch means, or a zipper means. A composite of the LAMP being comprised of a weatherproof aggregate. As a local authority generally wears a uniform and/or coat over a, such mounting means will be adapted to mount the LAMP upon a vest of a local authority so a uniform and/or coat of a local authority may be worn in a general mode. The monitor of the composite being formed of a bulletproof composite glass. As the LAMP is mounted over, or in proximity to a vital organ, a heart, of a local authority a secondary and tertiary measure of protection will be subsequently provided.

A securing of data of the central computer for the purpose of securing the central processing computer. A network, such as the network of the World Wide Web for the purpose of transponding a data of the present invention. The central computer being equipped with a non-transitory computer readable medium and connecting the central computer to a network for the purpose of transmitting a data through a network. Facial recognition technology for the purposes of facial recognition data means. The LAMP being equipped with a computerized data processor for the purposes of processing a data. A global positioning satellite (GPS) technology (x, y) coordinate means as supplied by though not limited to the GPS of The United States Air Force for the purpose of calculating a GPS data. A geographical orientation compass means for the purpose of geographical orientation of a local authorities LAMP. As the LAMP is mounted upon a vest of an authority in an alignment that is parallel to a body alignment of a local authority, a calculation of a data will determine a geographical orientation of a local authority. Electronic communication and signalizations means (ECS), for the purpose of connecting to a transponding a data through a network. Display monitor means for the purpose of displaying a visual of an IIAVT. Digital imaging camera(s) means for the purpose of digitally imaging a local individual. Audio speaker means for the purpose of providing an audio means of an IIAVT. Touchscreen keyboard means for the purpose of inputting a data by a local authority. Human organism presence detection method means for the purpose of detecting the presence of a local authority. With reference to the operational facility of the present invention to detect the presence of a human organism that is considered local in relation to a GPS (x, y) coordinate of a local authority the following set of detection means of a human organism methods are herein provided although a method to detect the presence of a human organism are not limited to such methods: a) infrared body temperature signature of a human organism, b) a heart-beat audio signature of a human organism, c) a contour calculation of a human organism and a d) three dimensional (3D) imaging detection of a form or the entirety of a form of a human organism. Audio-Visual Teleconferencing means for the purposes of an IIAVT. Ballistic body armor for the purposes of fabricating an encasement of a LAMP.

Pending Immediate Intervention Teleconference Means Illustration

A pending immediate intervention teleconference means may be illustrated as though not limited to providing a remote contact individual with an immediate local interactive intervention computerized application means so the remote contact individual may access the application in order to engage in an IIAVT, an application means of the present invention having an operational quality of being programmed for programmatically immediately alerting all parties of a pending teleconference in the event that an IIAVT is initializing, and initializing all processes in order that all processes of the present invention may be actualized and serviceable, inputting a local individual's uniquely identifying criteria manually a LAMP by a local authority so a local individual's identity may be established so an IIAVT call may initiate, such uniquely identifying criteria of a local individual may include though not be limited to a driver's license, such uniquely identifying criteria of a local individual may be inputted by a local authority when a local individual voluntarily provides a uniquely identifying criteria such as though not limited to a driver's license, performing a facial recognition process programmatically utilizing the LAMP's camera by capturing a digital image of a facial likeness data of a local individual utilizing the LAMP's camera digital imaging means, transferring the likeness data through the network to the central computer, the central computer performing a facial recognition likeness calculation of an individual and determining an identity of an individual so that an identity of a local individual may be established when a local individual refuses to provide a uniquely identify criteria to a local authority and when a local authority has established due cause as consistent with a law and a right that permits the local authority to utilize a facial recognition calculation in order to establish an identity of a local individual in order to initiate an IIAVT, initializing an IIAVT so that local parties in relation to remote parties may be real-time virtually present in order to be interactive so that an interaction between a local authority and a local individual may include the virtual presence of remote contact individuals in order to ensure the equity of a protocol of a law and a right is being carried-out accordingly in so parties that are involved in an IIAVT include though not limited to, a local authority, such as a police officer, a private certified security guard, a Federal agent such as a Transportation Safety Administration (TSA), authority or Federal Bureau of Investigation (FBI), authority, a local individual such as a driver of an automobile that has been pulled over by a local authority such as a police officer for a reason of a moving infraction, such as inoperable vehicular taillights, a remote authority such as a ranking police officer remotely located in a police station, a remote mediatory to direct mediation between all parties, a remote law attorney representative of a policing department are assured such law a right are being exercised, a remote contact individual such as a family member of a local individual, a remote professional colleague of a local individual in the event a driving infraction occurs during a time when a local individual is involved in professional activities, and a remote attorney of law representative of a local individual, providing a remote authority a means to govern an IIAVT, as the processes of the present invention are established and maintain by an authority, an authority would assume responsibility for governing an IIAVT in accordance with a protocol of a law, designating the identified individual as local in relation to the local authority and as remote to the remote authority, and designating a contact individual as remote in relation to the local authority and as remote in relation to the identified individual in order to establish a template of geographic positioning of all parties involved in an IIAVT for purposes of logistical notation efficiency, engaging the local authority, the local identified individual, the remote authority, and the remote contact individual in the IIAVT with the purposes of providing a fair and balanced approach to an interaction between a local authority and a local individual so that a local individual being pulled over for the reason of a vehicular taillight inoperability does not escalate into a unforeseen circumstance, and in the event a local authority requires counsel to determine how to police a local individual that has been pulled over for a reason of a vehicular taillight inoperability infraction, should the local individual be non-compliant with the commands of a local authority, the local authority may be counseled by a remote party such as a ranking police officer to ensure a local authority is following a police protocol, a remote contact individual of a local individual such as family member of the local individual who may virtually address a local individual in order to assure the local individual of a way of responding to a local authority's commands, a remote professional colleague in the event a local individual has been pulled over for a vehicular taillight inoperable infraction in order to assure the local individual of a way of responding to a local authority's commands, a remote attorney of law representing a local individual who has been pulled over for a vehicular taillight inoperable infraction in order to assure the local individual of a legal way to exercise a local individual's right, such as a civil right, while as well-being compliant with a law, and, storing a record of the IIAVT in the central computer's non-transitory computer readable medium so that the recording of the teleconferencing may be accessed as required.

Reflection and Request of Inventor of the Present Invention

In reflection of individuals who were involved in an action between a local authority and a local individual that resulted in the passing of a local authority [End of Watch], and/or a local individual, the Inventor of the present invention "requests" an honorary tribute to the involved parties by providing the processes of the present invention to have a dual namesake after a local authority and a local individual who passed in view of an interaction between a local authority and a local individual, such as, "Name-Name". The Inventor of the present invention honorably defers the choice of a namesake to a practitioner of the present invention's art.

BRIEF SUMMARY OF THE INVENTION

In essence, the substance of the present invention's conceptual consideration is centered upon a programmatic performance of all of its processes, inclusive of its embodiments, as being an operationally unified platform dedicated to a process of providing an immediate intervention audiovisual teleconference for a plurality of individuals when a local authority and local individual are interacting for the principle of maintaining an order of an enforcement of a law and an order of an exercise of a right. As such, the present invention's inventive leap advantages itself above currently practiced art in the field of endeavor in the technological arts of providing a means for immediate intervention IIAVT between a local authority and a local individual with a remote authority and a remote contact individual. The present invention does so by providing an immediate intervention IIAVT between the foregoing set of parties in order to provide for immediate intervention IIAVT so that locally involved parties may have immediate access to secondary remote parties for the purpose of mitigating an action of a local authority and a local individual so that such parties follow a protocol during an interaction between a local authority and a local individual during such interaction in a manner consistent with a law and a right.

As mitigating a potential of a local authority's action and a local individual's action and an indispensable time-critical exercise of providing a means of an IIAVT in the event a local authority and a local individual's action may be adjudicated as inconsistent and non-compliant in terms of in relation the enforcement of a law and the excercise of a right. The inventive leap and unified processes of the present invention are drawn toward such interests within its field of endeavor in the technological arts of providing a means of affording all parties that would be determined as "stakeholders" in reference to an interaction between a local authority and a local individual of a "presence" in such interaction by means of an IIAVT.

It should therefore be understood and appreciated that the processes of the present invention, inclusive of programming the central computer and an associated embodiment of the present invention that are interconnected to the central computer by means of a network are to be understood as a unified process. A false distinction in terms of a review of the present invention would be that of the present invention as comparable to an apparatus or application. The present invention is neither an apparatus nor an application. While the present invention does comport an embodiment of an apparatus and an application, in its entirety, the present invention to be understood as a unified process. A relation to prior art consisting of apparatus and/or an application would be inconsistent with the characterization of the present invention as a unified process. A substantive quality of the processes of the present invention, inclusive of its facility to provide for means of a registry in a database in conjunction with a processing of the central computer to provide a data to a local authority, a local individual, a remote authority and a remote contact individual of a quality that is not practiced in the present practice of immediate intervention by means of an IIAVT between a local authority and a local individual and a virtual presence of a remote authority and a remote contact individual in order that the remote authority and remote contact individual council and mitigate a local authority and a local individual so that a local authority and a local individual's actions do not escalate into actions that are inconsistent and non-compliant with a law and a right is a proper qualification of the present invention's nature.

In light of a brief summary of the present invention, a process, consistent with the subject matter and implementation thereof of a claim of the present invention, is herein provided. The steps of performing the processes of the present invention are mailable in terms of their ordering. See following.

Implementations of the disclosed technology are comprised of at least the steps of a process of at least claim 1 of the present invention whereas:

Equipping the central computer with a non-transitory computer readable medium and connecting the central computer to the network (a), whereas the central computer is equipped with a non-transitory computer readable medium and is connected to the network for purposes of transmitting a data between the central computer and a least one (1) LAMP, and the central computer's non-transitory computer readable medium being capable of receiving and storing electronic data in a format readable by a mechanical device, such as a computer, i.e., a computer of the present invention, herein understood as the 'central computer', and being comprised of at least, magnetic recordings, processing waveforms, and barcodes, in binary code, and whereas the network is comprised of a least the "Internet" or "World Wide Web" of which such terms are often utilized interchangeably.

Encoding the central computer's non-transitory computer readable medium with a database of a registry of a uniquely identifying criteria of authoritative and local individual's personally identifying criteria data and facial recognition data (b), whereas encoding the central computer's non-transitory computer readable medium with a database with a registry of a uniquely identifying criteria of authoritative and local individual's personally identifying criteria data, and the criteria comprising at least a uniquely identifying personal identification such as a driver's license, (comprised of at least one (1) photographic realistic image(s) of the local individual, inclusive of though not limited to the local individual's facial features), a social security number or portion thereof, an international passport number, (comprised of at least one (1) photographic realistic image(s) of the local individual, inclusive of though not limited to the local individual's facial features), a voter's registration, a personal identification, (comprised of at least one (1) photographic realistic image(s) of the local individual, inclusive of though not limited to the local individual's facial features), and/or at least one (1) photographic realistic image(s), the photographic realistic image being comprised of at least one (1) photographic realistic image of the local individual, inclusive of though not limited to the local individual's facial features.

Equipping the LAMP with a computerized data processor and programming the computerized data processor of the LAMP to perform a calculation of a sub-processing of a data (c), whereas the LAMP's computerized data processor manipulates and converts raw input data acquired from at least embodiments of the LAMP, i.e., at least the LAMP's camera(s), into machine-readable form, and produces a formatting and transformation, i.e., sub-processing as a process that is part of a larger overall process, and whereas the LAMP's computerized data processor accepts input, processes the input, and returns a result and provides for a flow of data through its data processor to output devices, particularly, to and from the central computer by means of the network.

Equipping the LAMP with human organism presence detection means, a triangulation means, a global positioning (GPS) means, a compass means, an electronic communication and signalizations (ECS) means, a display monitor means, a digital imaging camera(s) means, an audio speaker means, a microphone means, a keyboard means, an initializing means, IIAVT means, a network connectivity means and connecting the LAMP to the network; (d), whereas in one implementation of the present invention a LAMP is equipped with functional embodiments comprised of a least: (d.1.), infrared body temperature signature of a human organism, whereas an operation of a camera of the LAMP utilizes its camera's infrared imaging means and captures at least one image(s) of an individual, who is considered local in relation to a local authority, in a light wavelength from 1,000 nm (1 µm) to 14,000 nm (14 µm), and produces an imagery of the local individual on a monitor of a computerized device that is perceivable to a human, (d.2.) a heart-beat audio signature of a human organism, whereas an operation of the LAMP's human organism detection means senses an atmospheric (air) vibration comprised of at least a heartbeat signature of a human organism, and the individual being considered local in relation to a local authority, (d.3.) a contour calculation of a human organism, whereas a computerized device, such as the central computer of the present invention is encoded with human organism contour profile(s) and compares a data of a human organism contour profile that it is encoded with to a data collected by the human organism presence means of the LAMP and as sent through the network to the central computer, and whereas the central computer determines a contour of an individual for purposes of determining the presence of an individual, such as an individual who is considered local in relation to a local authority, (d.4.) three dimensional (3D) imaging detection of a form or the entirety of a form of a human organism, whereas a computerized device, such as the central computer of the present invention is encoded with a three dimensional (3D) data of a human organism and compares a (3D) data of a human organism (3D) that it is encoded with to a data collected by the human organism presence means of the LAMP and as sent through the network to the central computer, and whereas the central computer determines a (3D) data of an individual for purposes of determining the presence of an individual, such as an individual who is considered local in relation to a local authority, (d.5.) a triangulation means, whereas a triangulation means is executed by utilization of a local authority's LAMP, and whereas a configuration of a local authority's LAMP consists of at least two (2) digital cameras, ('1' and '2'), (embodiment 14 of the present invention), and whereas a distance between the location points of the two (2) digital cameras, ('1' and '2'), is constant and a constant dimension of a 'baseline' (b) is therein established, and whereas a projection of the digital cameras ('1' and '2') upon an individual, such as though not limited to a 'local individual' of the present invention, senses a location of the local individual and establishes a third point, and whereas a determination of angles are formed from a dimension of the baseline (b) and a location of the third point that is determined by a location of a local individual, and whereas the form comprising a 'triangle' and location of a local individual in relation to a local authority is therein established by a metric of the third point of the triangle, and whereas a local authority's LAMP contains a GPS (x, y) means, (see GPS), and as a GPS (x, y) co-ordinate of a local authority's LAMP is known and a location relation between a local authority's LAMP has been established by a data of a GPS (x, y) co-ordinate, a GPS (x, y) co-ordinate of a local individual is established, and the local individual's geographical location becomes therein known; (d.6.) a global positioning (GPS), whereas a Global Positioning System (GPS), is a satellite-based radio-navigation system owned by the United States government and operated by the United States Space Force, and established on time and known position of GPS specialized aero-space satellites that carry stable atomic clocks that are inter-synchronized and synchronized with ground based chronometers, and a data of the GPS being transmitted through a network, such as the network that the present invention is connected to, and the data containing a data of a computerized device, such as data of an electronic communication and signalizations (see ECS), (GPS data), of a LAMP of the current invention, and a geographical location being ascertained from a signal, (GPS signal), being generated from the LAMP and received by the GPS, and as determined by a process of the GPS; (d.7.) compass(es), whereas a compass instrument is digital in composition and utilized for providing a data of a geographical orientation of a local authority relative to the geographical cardinal directions of north, south, east, and west, that is sub-processed by the LAMP's computerized data processor and sent through the network to the central computer, and the geographical orientation of a local authority being calculated by the central computer; (d.8.) electronic communication and signalization (ECS), whereas an ECS being comprised of at least a duplex constitution system where one (1) party sends an omni-directional data and/or at least two (2) parties are interconnected and communicating, and the ECS means are utilized for receiving and transferring a LAMP's data through the network to at least the central computer; (d.9.) display monitor(s), whereas the display monitor displays information in human readable graphical and/or pictorial form, and the screen of the display monitor being comprised of at least a composite that is of a weatherproof aggregate, and that is enclosed in an encasement, and the encasement of the LAMP's composite being formed of ballistic resistant or ballistic proof composite, and whereas the LAMP may be mounted over, or in proximity to a local authority's vital organ(s), such as a heart, should be therefore appreciated in the sense that a secondary and/or tertiary measure of ballistic protection is subsequently provided by composites of the LAMP. As a local authority generally wears a uniform and/or coat of a personal body armor such as a vest, the mounting means are adaptable to mount the LAMP upon a uniform, coat or vest of a local authority, so a uniform, coat or personal body armor such as a vest of a local authority may be worn in a general mode, and as a dimension of a LAMP provides local individual's a means to readily read graphical and/or pictorial information in an IIAVT (see IIAVT), and the display monitor having a means of an illumination quality so reading of graphical and/or pictorial information of an IIAVT is made clear and available to a local individual, day or night and in varying meteorological conditions; (d.10.) digital camera(s), whereas a digital camera(s) (i.e., embodiment 11 of the present invention) contains a 'lens' and the lens captures imagery in still and/or live video-streaming format, and the imagery contains a likeness of at least a facial feature or 'likeness' of a local individual, and whereas the computer processor of the LAMP converts a raw data of a digital imagery into a computer readable digital data format and the data being sub-processed by the computerized data processor of the LAMP and transmitted through the network to the central computer, and the data being utilized in at least an IIAVT; (d.11.) audio speaker(s), whereas the digital audio speaker(s) captures a sound wave and converts it into a digital data format, and whereas the computerized data processor of the LAMP transmits the digital data through the network to the central computer and whereas the data being utilized in at least an IIAVT; (d.12.) keyboard, whereas the keyboard utilizes a composition of buttons or key(s) to operate as electronic key(s), and when a command is inputted by means of engaging a key(s) a command is executed that directs the computerized data processor of the LAMP to perform a function(s); (d.13.) a microphone whereas the microphone is utilized for recording sound, such as human voice, and whereas the computer processor of the LAMP converts a raw data of a sound into a computer readable digital data format and whereas the data being sub-processed by the computerized data processor of the LAMP and data being transmitted through the network to the central computer and whereas the data being utilized in at least an IIAVT; (d.14.) initializing means, whereas an in at least one functional implementation of the initializing means, an embodiment of the LAMP being comprised of at least an encasement is provided with a means to initialize an IIAVT, such as a 'button', and whereas the button, when engaged by a local authority electronically initiates the LAMP for a purpose of providing an IIAVT; (d.15.) immediate intervention audio-visual teleconferencing (IIAVT) means, whereas a LAMP is comprised with a, and dedicated to, a technological means to provide for and (host) an immediate intervention audio-visual teleconference, and whereas the IIAVT, also known as videotelephony, contains means for reception and transmission of audio-video signals by a plurality of individuals at different locations, simultaneously, and whereas the IIAVT is performed immediately and in real-time for the purpose of providing an immediate intervention audio-video conference of at least an interaction between a local authority who is enforcing a law, a local individual who is exercising a right, and, a remote authority, a remote individual and a remote neutral moderator; (d.16.) network connectivity means, whereas the network connectivity means being comprised of at least a process of connecting a plurality of components of a network to one another, i.e., routers, switches and gateways; and, whereas the LAMP is connected to at least the network that is comprised of a least the internet.

Programming the computerized data processor of the LAMP to perform a sub-processing calculation of a human organism presence detection data, human organism recognition data, triangulation data, global positioning GPS data, compass(es) data, electronic communication and signalization ECS data, display monitor(s) data, digital camera(s) data, audio speaker(s) data, keyboard(s) data, initializing data; and an IIAVT data (e), whereas the sub-processor of the LAMP supplementary processes a data of the LAMP prior to a processing of a data by the central computer by offloading processor-intensive tasks for the purposes of accelerating a computerized process of the present invention's performance.

Programming the central computer to perform a calculation from a sub-processed data received through the network from the LAMP of a: human organism detection data, triangulation data, global positioning GPS data, compass(s) data, ECS data, display monitor data, digital camera(s) data, a microphone data, an audio speaker data, keyboard data, initializing data, IIAVT data, a registry of a uniquely identifying criteria of local authorities' and local individuals' personal identifying criteria data, and to determine an identity of a local individual from a sub-processed data received from the LAMP (f), whereas the central computer is programmed to process a data of a sub-processed data received through the network from the LAMP of a human organism presence detection data, human organism recognition data, triangulation data, global positioning GPS data, compass(s) data, electronic communication and signalization ECS data, display monitor(s) data, digital camera(s) data, microphone data, audio speaker(s) data, keyboard(s) data, initializing data; a registry of a uniquely identifying criteria of authoritative and local individual's personally identifying criteria data; and an IIAVT data.

Assigning a local authority, a remote authority, a local individual, a remote contact individual and a remote neutral moderator with a unique identifying code (g), whereas, i.e., a local authority is assigned a unique identifying code of, "abc123", a local individual is assigned a unique identifying code of, "def456" a remote authority is assigned a unique identifying code of, "ghi789", a remote contact individual is assigned a unique identifying code of, "jk1101112", and a remote neutral moderator is assigned a unique identifying code of, "mno131415".

Equipping a local authority with a LAMP (h), whereas a local authority being equipped with a LAMP.

Assigning a LAMP with a unique identifying code and synchronizing a unique identifying code of a local authority with a unique identifying code of a LAMP (i), whereas, i.e., a local authority is assigned a unique identifying code of, "abc123" and a LAMP is assigned a unique identifying code of, "pqr161718" and a synchronization of a local authority's unique identifying code and a LAMP's unique identifying code is, "abc123pqr161718".

Programming the computerized data processor of the LAMP to sub-process a data of unique identifying and synchronized unique identifying codes of a local authority and a LAMP (j), whereas the computerized data processor of the LAMP is programmed to sub-process a synchronized code of a local authority and a LAMP as, i.e., "abc123pqr161718".

Programming the computerized data processor of the LAMP to sub-process a data of an (IIAVT), (k), whereas the computerized data processor of the LAMP is programmed to process a data of an IIAVT.

Designating an authority as local and designating an authority as remote (l), whereas an authority is designated as local in relation to a local individual and whereas an authority is designated as remote in relation to a local authority and a local individual.

Mounting the LAMP upon and/or over an equipment of a local authority (m), whereas a LAMP is mounted upon and/or over an equipment of a local authority that is comprised of at least a personal body armor such as a vest, a uniform, coat or inclement weather gear.

Providing a means for local authorities, local individuals, remote authorities, remote contact individuals and a remote neutral moderator a means to input a uniquely identifying criteria of themselves into a secured computerized registry of the central computer's non-transitory computer readable medium database (n), whereas a means, such as a computerized device that is connected to the network that the central computer is connected to and that provides a means for local authorities, local individuals, remote authorities, remote contact individuals and a remote neutral moderators to input a uniquely identifying criteria of themselves, and whereas local authorities, local individuals, remote authorities, remote contact individuals and remote neutral moderators input a uniquely identifying criteria of themselves into a secured computerized registry of the central computer's non-transitory computer readable medium database by utilizing the provided computerized device that is connected to the network.

Synchronizing a secured computerized registry of the central computer's non-transitory computer readable database of local authorities, LAMP(s)', local individuals', remote authorities', remote contact individuals' and remote neutral moderators' unique identifying codes (o), whereas a secured computerized registry of the central computer's non-transitory computer readable database of local authorities, LAMP(s), local individuals, remote authorities, remote contact individuals and remote neutral moderators is synchronized by means of utilizing a unique identifying code of local authorities, LAMP(s), local individuals, remote authorities, remote contact individuals and remote neutral moderators.

Providing a registry of the central computer's non-transitory computer readable medium with a synchronist list of unique identifying criteria of local authorities, LAMPs, local individuals, remote authorities, remote contact individuals and remote neutral moderators a unique identifying criteria (p), whereas the central computer's non-transitory computer readable medium is provided with a synchronist list of unique identifying criteria of local authorities, LAMPs, local individuals, remote authorities, remote contact individuals and remote neutral moderators a unique identifying criteria.

Providing a means of a signatory documentation of accepting a term and condition to local individuals, remote authorities, remote contact individuals and remote neutral moderators, and encoding the central computer's non-transitory computer readable medium with the signatory documentation of accepting a term and condition of the local individuals, remote authorities, remote contact individuals and remote neutral moderators (q), whereas a signatory documentation of accepting a term and condition to local individuals, remote authorities, remote contact individuals and remote neutral moderators is encoded into the central computer's non-transitory computer readable medium with a signatory documentation of accepting a term and condition of the local individuals, remote authorities, remote contact individuals and remote neutral moderators.

Providing a remote authority, a remote contact individual and a remote neutral moderator with a computerized device and an immediate intervention computerized IIAVT application means, inclusive of a means for being programmatically and immediately alerted of a pending IIAVT (r), whereas a remote authority, a remote contact individual and a remote neutral moderator are provided with a computerized device that is equipped with an IIAVT application inclusive of a means for being programmatically and immediately alerting a remote authority, a remote contact individual and a remote neutral moderator of a pending IIAVT.

Inputting a local individual's unique identifying criteria by a local authority into a LAMP and sub-processing a local individual's unique identifying criteria by the computer processor of the LAMP and transmitting a sub-processed data of a local individual's unique identifying criteria through the network to the central computer (s), whereas a local individual's unique identifying criteria is inputted in a local authority's LAMP by the local authority and a local individual's unique identifying criteria is sub-processed by the computer processor of the LAMP and transmitted by the LAMP through the network to the central computer.

Encoding the central computer's non-transitory computer readable medium with a uniquely identifying criteria registry of local individuals' facial recognition database (t), whereas the central computer's non-transitory computer readable medium is encoded with a uniquely identifying criteria registry of local individuals' facial recognition database.

Performing a facial recognition process programmatically utilizing the LAMP's camera by capturing a digital image of a facial likeness data of a local individual utilizing the LAMP's camera digital imaging means, transferring the likeness data through the network to the central computer, the central computer performing a facial recognition likeness calculation of an individual and determining an identity of a local individual (u), whereas a facial recognition process is programmatically performed utilizing the LAMP's camera by capturing a digital image of a facial likeness data of a local individual utilizing the LAMP's camera digital imaging means, transferring the likeness data through the network to the central computer, the central computer performing a facial recognition likeness calculation of an individual by accessing a uniquely identifying criteria registry of local individuals' facial recognition database and determining an identity of a local individual.

Establishing a geographical global position of a local authority through a sub-processed data received through the network from the LAMP and determining a geographical orientation of a local authority from a sub-processed data of a LAMP's compass data that was sent through the network and as calculated by the central computer (v), whereas a geographical global position of a local authority is established through a sub-processed data received through the network from the LAMP, and a geographical orientation of a local authority from a sub-processed data of a LAMP's compass data that was sent through the network is determined by a calculation of the central computer.

Establishing a GPS (x, y) coordinate of a local individual in relation to a local authority through a GPS (x, y) coordinate data of a local authority and a triangulation data that was sub-processed by a LAMP and sent through the network to the central computer and as calculated by the central computer (w), whereas a GPS (x, y) coordinate of a local individual in relation to a local authority is established through a GPS (x, y) coordinate data of a local authority and a triangulation data that was sub-processed by a LAMP and sent through the network to the central computer and as calculated by the central computer.

Designating a local identified individual as local in relation to the local authority and as remote to the remote authority, and designating an authoritative individual as remote in relation to the local authority and as remote in relation to the local and identified individual and designating a remote contact individual as remote in relation to the local authority and as remote in relation to the local identified individual (x), whereas a local identified individual is designated as local in relation to the local authority and as remote to the remote authority, and designating an authoritative individual as remote in relation to the local authority and as remote in relation to the local and identified individual and designating a remote contact individual as remote in relation to the local authority and as remote in relation to the local identified individual.

Designating a remote neutral moderator as remote to a local authority, a local identified individual and a remote authority (y), whereas a remote neutral moderator is designated as remote in relation to a local authority, a local identified individual and a remote authority.

Initializing an IIAVT between a local authority, a local individual, a remote authority, a remote contact individual and a remote neutral moderator (z), whereas an IIAVT is initialized by means of a local authority engaging an initializing button of the LAMP that initializes an IIAVT between a local authority, a local individual, a remote authority, a remote contact individual and a remote neutral moderator.

Engaging the local authority, the local identified individual, the remote authority, remote contact individual and the remote neutral moderator in an IIAVT by immediately and programmatically alerting all parties in the event a local authority and a local individual are interacting (aa), whereas a local authority, a local identified individual, a remote authority, a remote contact individual and a remote neutral moderator are engaged in an IIAVT by a computerized application, and their provided computerized devices immediately and programmatically alert all parties when a local authority initializes an IIAVT by utilizing an initializing means of the local authorities' LAMP, and whereas all parties become immediately engaged in an IIAVT when a local authority and a local individual are interacting by means of the IIAVT.

Providing a remote neutral moderator a means to moderate an IIAVT (bb), whereas a neutral moderator is provided with a computerized device that is equipped with an application for an IIAVT, and whereas the neutral moderator being designated as remote and having means to moderate an IIAVT.

Storing a recording of the IIAVT in the central computer's non-transitory computer readable medium (cc), whereas a recording of the IIAVT is stored in the central computer's non-transitory computer readable medium.

And, implementations of the disclosed technology are comprised of at least the steps of a process of claim 2, whereas:

Providing a local authority, a local individual, a remote authority, a remote individual and a remote neutral moderator a means of training in order to practice the processes of the present invention (a), whereas a local authority, a local individual, a remote authority, a remote individual and a remote neutral moderator are provided with a means for practicing a process of the present invention that comprises at least a computer based asynchronous and/or a synchronous platform that is connected to the network that the central computer is connected to for the purpose of training a local authority, a local individual, a remote authority, a remote individual and a remote neutral moderator by means of practicing a process of the present invention so a local authority, a local individual, a remote authority, a remote individual and a remote neutral moderator are certified in advance of utilizing a process of the present invention in real life by means of practicing a process of the present invention so a local authority, a local individual, a remote authority, a remote individual and a remote neutral moderator can utilize a process of the present invention in real-life.

Providing a computerized device of a remote authority, a remote contact individual and a remote neutral moderator a computerized application means to be immediately and programmatically alerted upon an occasion that a local authority and a local individual are interacting (b), whereas a computerized device of a remote authority, a remote contact individual and a remote neutral moderator is provided with a computerized application means such as a software application (App), intended to function as a means to immediately and programmatically alert a remote authority, a remote contact individual and a remote neutral moderator of a pending IIAVT, and whereas a remote authority, a remote contact individual and a remote neutral moderator can manipulate at least a text, number, video, audio, and/or graphical elements within the app in order to initialize and maintain the IIAVT.

Encoding the central computer's non-transitory computer readable medium with a registry comprising local authorities, local individuals, remote authorities, local individuals, remote contacts individuals and remote neutral moderators (c), whereas the central computer's non-transitory computer readable medium is encoded with a registry, and whereas the registry is comprised of a least a handwritten and/or digital data that consists of fields for the entry of information pertaining to local authorities, local individuals, remote authorities, local individuals, remote contacts individuals and remote neutral moderators.

Encoding the central computer's non-transitory computer readable medium with local authorities, local individuals, remote authorities, remote contact individuals and remote neutral moderators condition of a legal record and a legal contract and providing a signatory line of a legal contract of local authorities, local individuals, remote authorities, remote contact individuals and a remote neutral moderators in a manner consistent with an enforcement of a law and an exercise of a right as expressed in a term and a condition of a legal contract (d), whereas encoding the central computer's non-transitory computer readable medium with a local authorities, local individuals, remote authorities, remote contact individuals and remote neutral moderators condition of a legal record comprised of i.e., a legal judgement, a legal motion, a legal petition, a legal pleading, a legal docket, a legal paper and a legal contract comprised of at least a document that recognizes and governs a right and a duty of a party to which the contract pertains in terms of an agreed upon set of interests, and providing a signatory line comprised of at least one (1) open line for the introduction of a hand written or digital data consisting of a depiction of a name of at least a local authority, a local individual, a remote authority, a remote contact individual or a remote neutral moderator, and whereas the legal contract is consistent with an enforcement of a law, and whereas laws and rights have associated codes a code may be utilized to represent a law, i.e. code (1), and an exercise of a right, i.e., right (1) as expressed in a term and a condition of the legal contract.

Securing and initializing all processes (e), whereas all processes of the present invention are secured by means of a computer hardware and software security system involving securing the central computer in a physically secure location, securing a LAMP in a physically secure location and/or securing a LAMP when the LAMP is in a physically unsecure location by means of providing the LAMP with a passcode in order to initialize it, and providing cybersecurity, or information technology security (IT security), that protects a computerized device, such as the central computer and/or a LAMP of the present invention from theft of or damage to their, software and/or electronic data, and protects from a disruption or misdirection of a service provided by a process of the central computer and/or LAMP, and whereas an initializing process is performed by an authority by initializing a process of the present invention.

And, implementations of the disclosed technology are comprised of at least the steps of process of claim 3, whereas:

Programmatically performing all processes as operationally unified (a), whereas a claim and a limitation of the present invention perform programmatically and as operationally unified.

BRIEF DESCRIPTION OF THE SEVERAL
VIEWS OF THE DRAWING(S)

Figure 3:
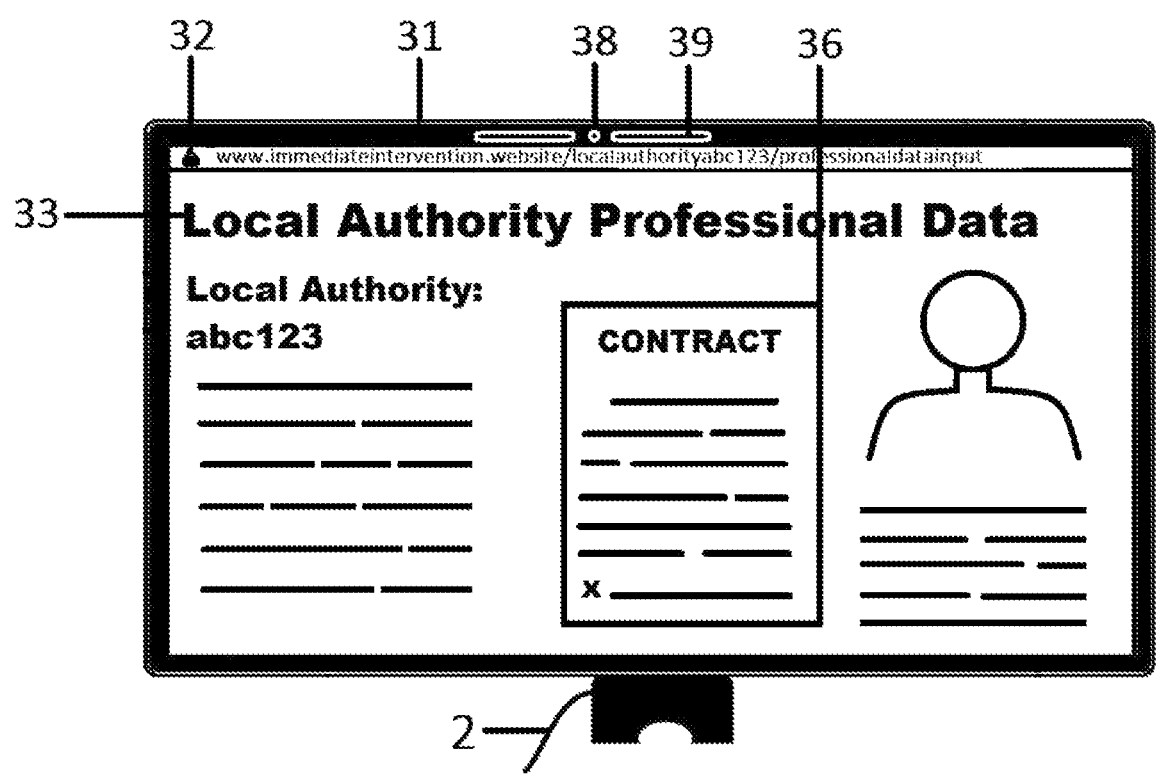

FIG. 3 illustrates a computerized device of a local authority (abc123), that is connected to a network. The local authority (abc123), is inputting a professional data of the local authority (abc123) and signing a contract that is formed in a manner consistent with a term and a condition in accordance with a law and a right. The contract stipulates a term and a condition of utilizing the processes of the present invention in accordance with a manner that is consistent with a term and a condition of a law and a right. A data of the local authority (abc123) is being transmitted through the network and is being stored in the central computer's non-transitory computer readable medium.

Figure 4:
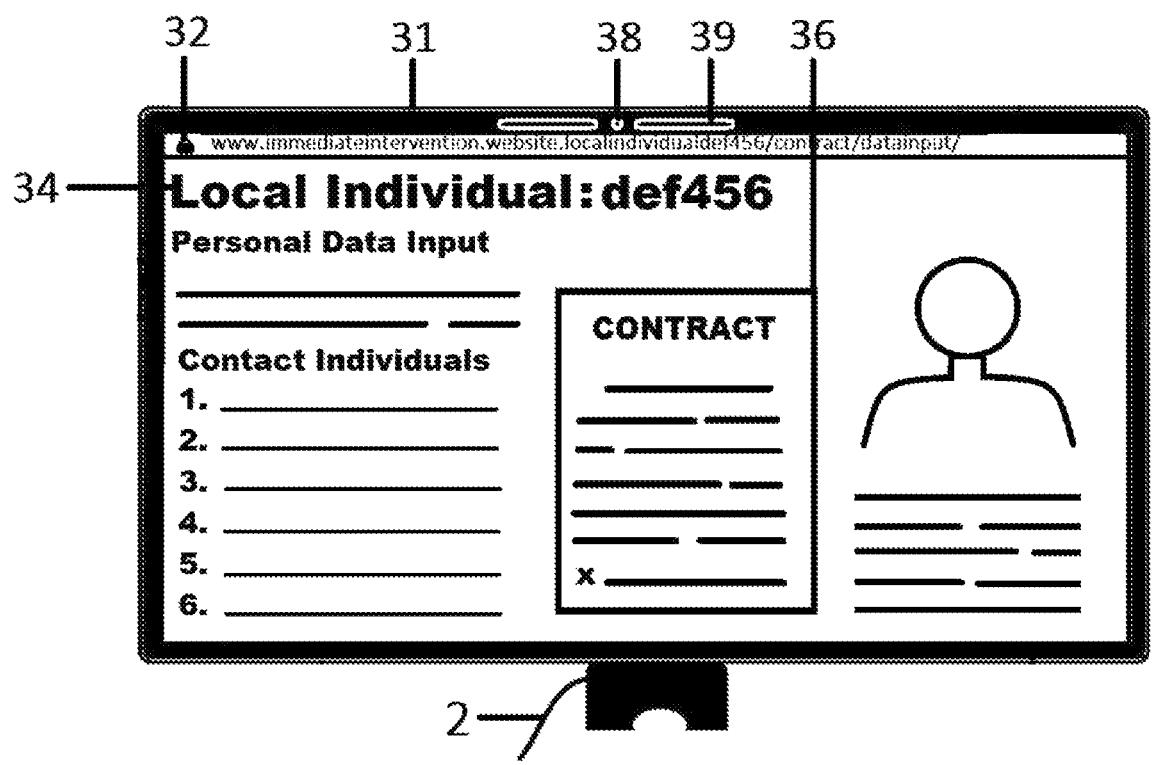

FIG. 4 illustrates a computerized device of a local individual (def456), that is connected to a network. The local individual (def456), is inputting a personal data of the local individual (def456), and a list of remote contact individuals, the local individual's remote contacts my consist of though not be limited to a family relation such a spouse, a parental figure, a professional colleague, a friend, neighbor or spiritual advisor and a private attorney, and signing a contract that is formed in a manner consistent with a term and a condition in accordance with a law and a right. The contract stipulates a term and a condition of utilizing the processes of the present invention in accordance with a manner that is consistent with a term and a condition of a law and a right. A data of the local individual (def456) is being transmitted through the network and is being stored in the central computer's non-transitory computer readable medium.

Figure 5:
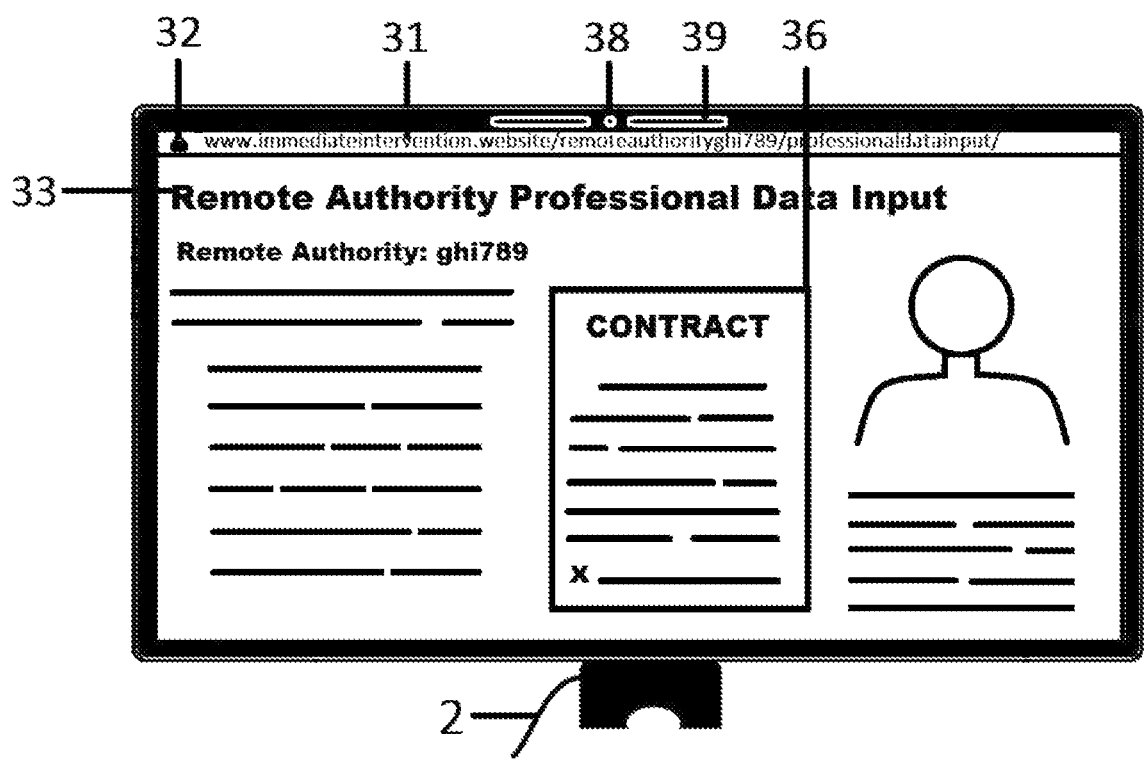

FIG. 5 illustrates a computerized device of a remote authority (ghi789), that is connected to a network. The remote authority (ghi789), is inputting a professional data of the remote authority (ghi789) and signing a contract that is formed in a manner consistent with a term and a condition in accordance with a law and a right. The contract stipulates a term and a condition of utilizing the processes of the present invention in accordance with a manner that is consistent with a term and a condition of a law and a right. A data of the remote authority (ghi789), is being transmitted through the network and is being stored in the central computer's non-transitory computer readable medium.

Figure 6:
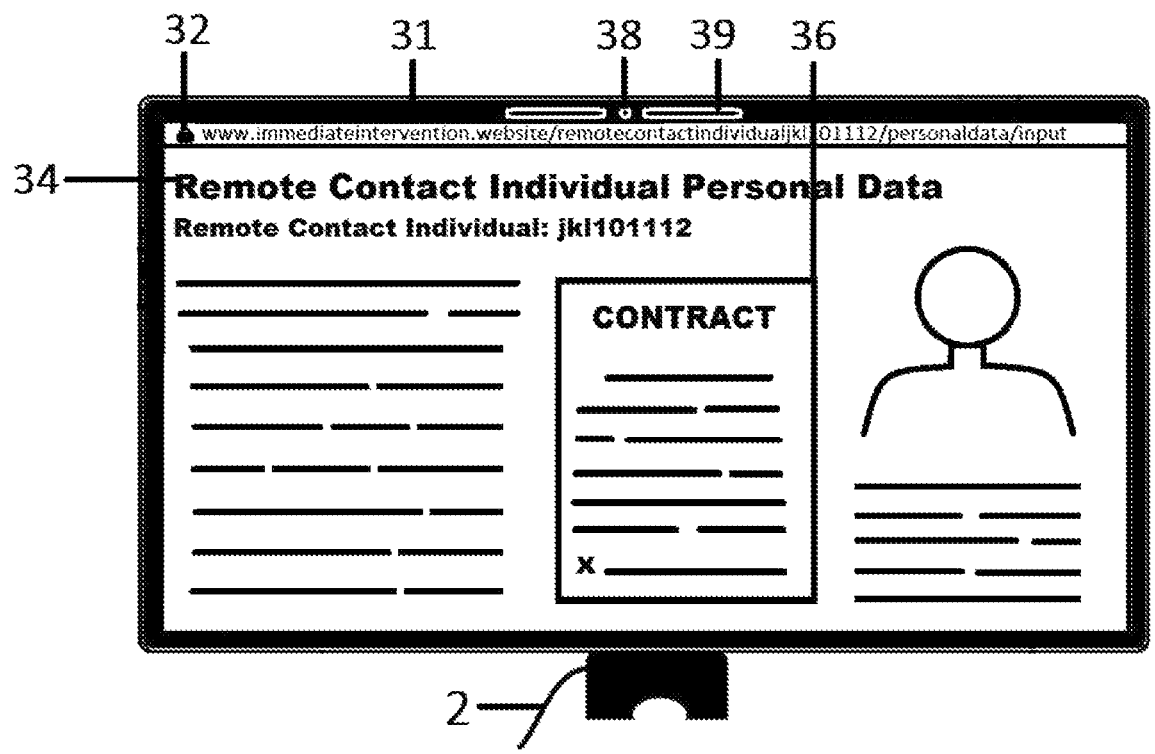

FIG. 6 illustrates a computerized device of a remote contact individual (jk101112), that is connected to a network. The remote contact individual (jk101112), is inputting a personal data of the remote contact individual (jk101112) and signing a contract that is formed in a manner consistent with a term and a condition in accordance with a law and a right. The contract stipulates a term and a condition of utilizing the processes of the present invention in accordance with a manner that is consistent with a term and a condition of a law and a right. A data of the remote contact individual (jk101112), is being transmitted through the network and is being stored in the central computer's non-transitory computer readable medium.

Figure 7:
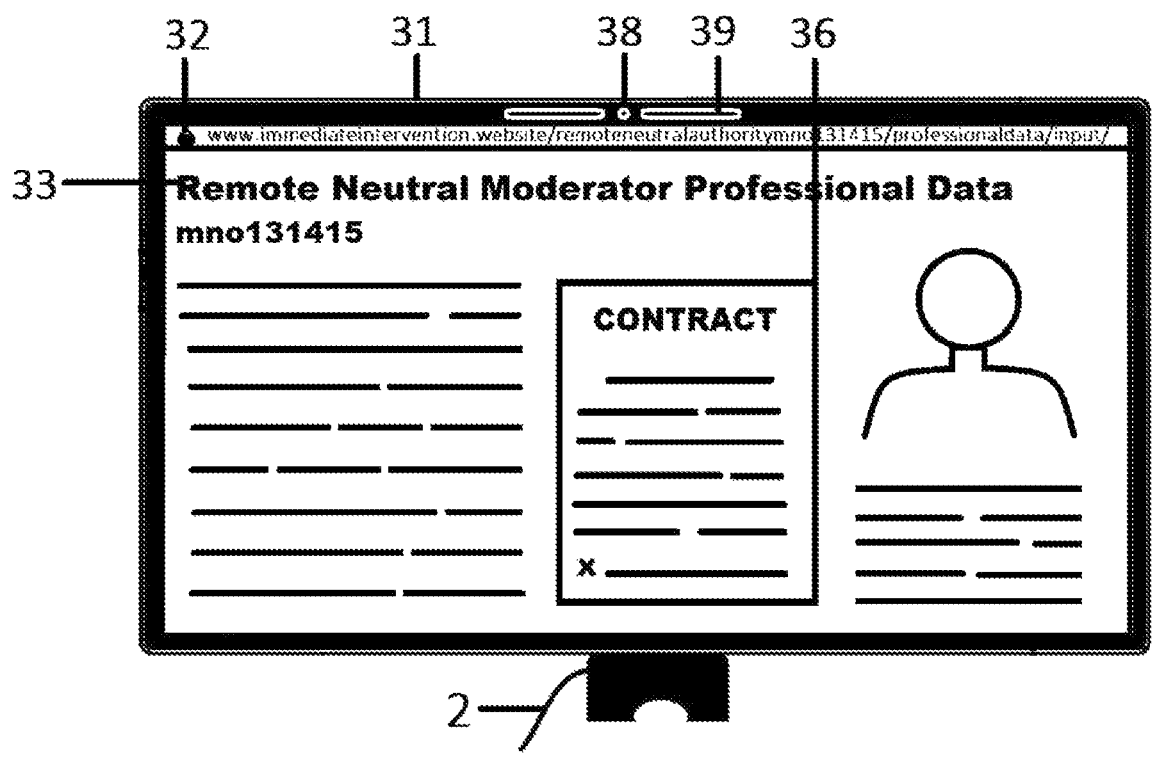

FIG. 7 illustrates a computerized device of a remote neutral moderator (mno131415), that is connected to a network. The remote neutral moderator (mno131415), is inputting a professional data of the remote neutral moderator (mno131415) and signing a contract that is formed in a manner consistent with a term and a condition in accordance with a law and a right. The contract stipulates a term and a condition of utilizing the processes of the present invention in accordance with a manner that is consistent with a term and a condition of a law and a right. A data of the remote neutral moderator (mno131415), is being transmitted through the network and is being stored in the central computer's non-transitory computer readable medium.

Figure 8:
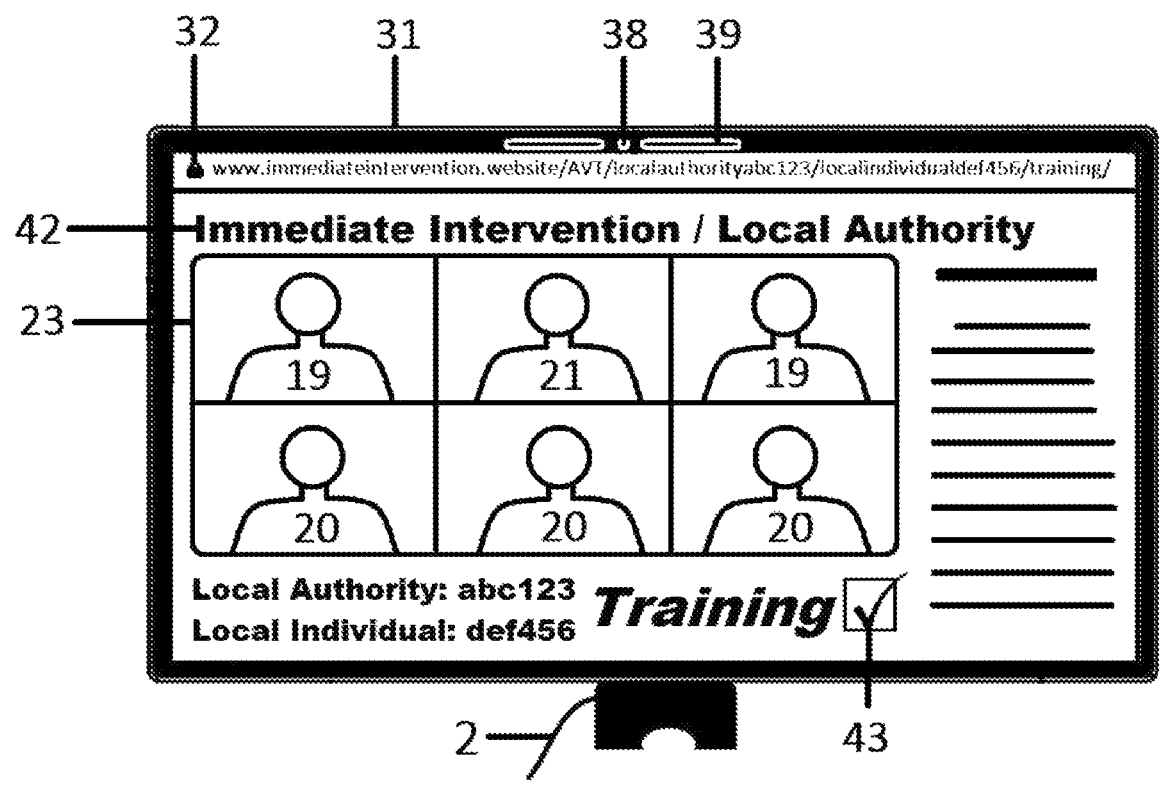

FIG. 8 illustrates a computerized device of a remote local authority (abc123) that is connected to a network and transmitting a data to the central computer and is equipped with a digital camera means, a speaker means and a microphone means. The local authority (abc123) has completed a training a requirement for practicing the processes of the present invention.

Figure 9:
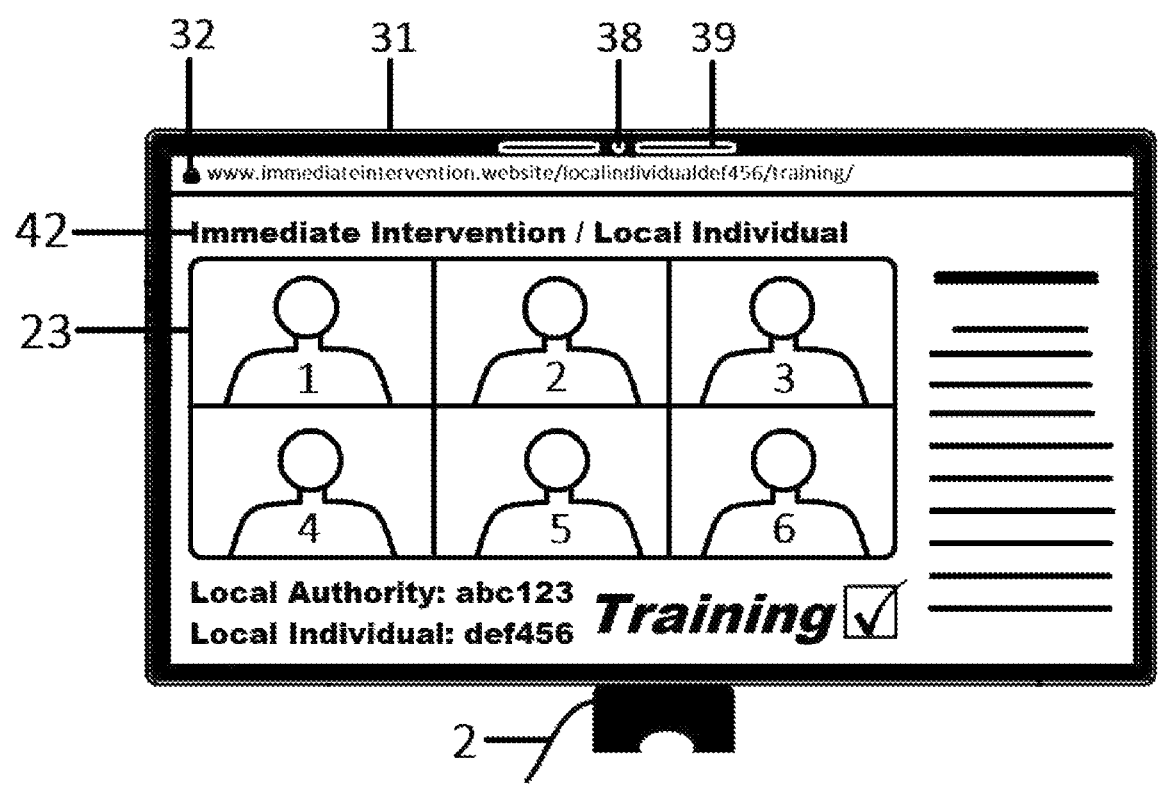

FIG. 9 illustrates a computerized device of a local authority (abc123) that is connected to a network and transmitting a data to the central computer and is equipped with a digital camera means, a speaker means and a microphone means. The local authority (abc123) has completed a training as required for practicing the processes of the present invention.

Figure 10:
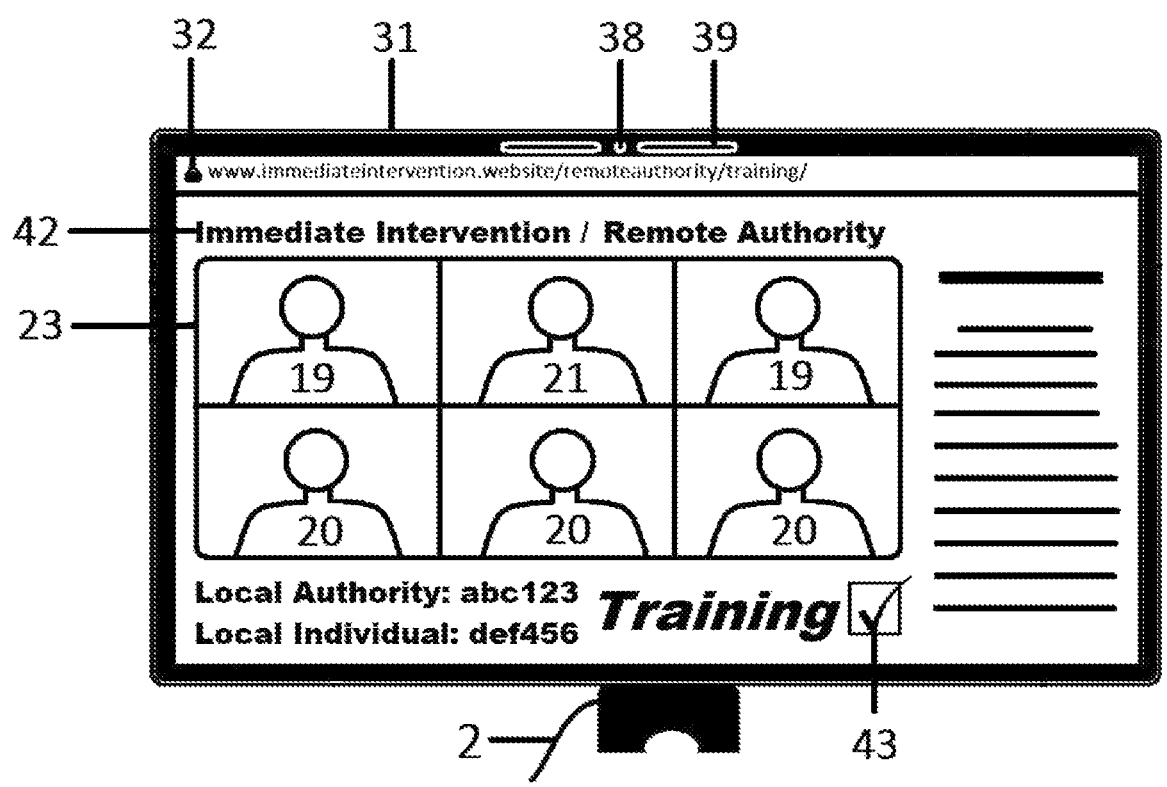

FIG. 10 illustrates a computerized device of a remote authority (ghi789) that is connected to a network and transmitting a data to the central computer and is equipped with a digital camera means, a speaker means and a microphone means. The remote authority (ghi789) has completed a training as required for practicing the processes of the present invention.

Figure 11:
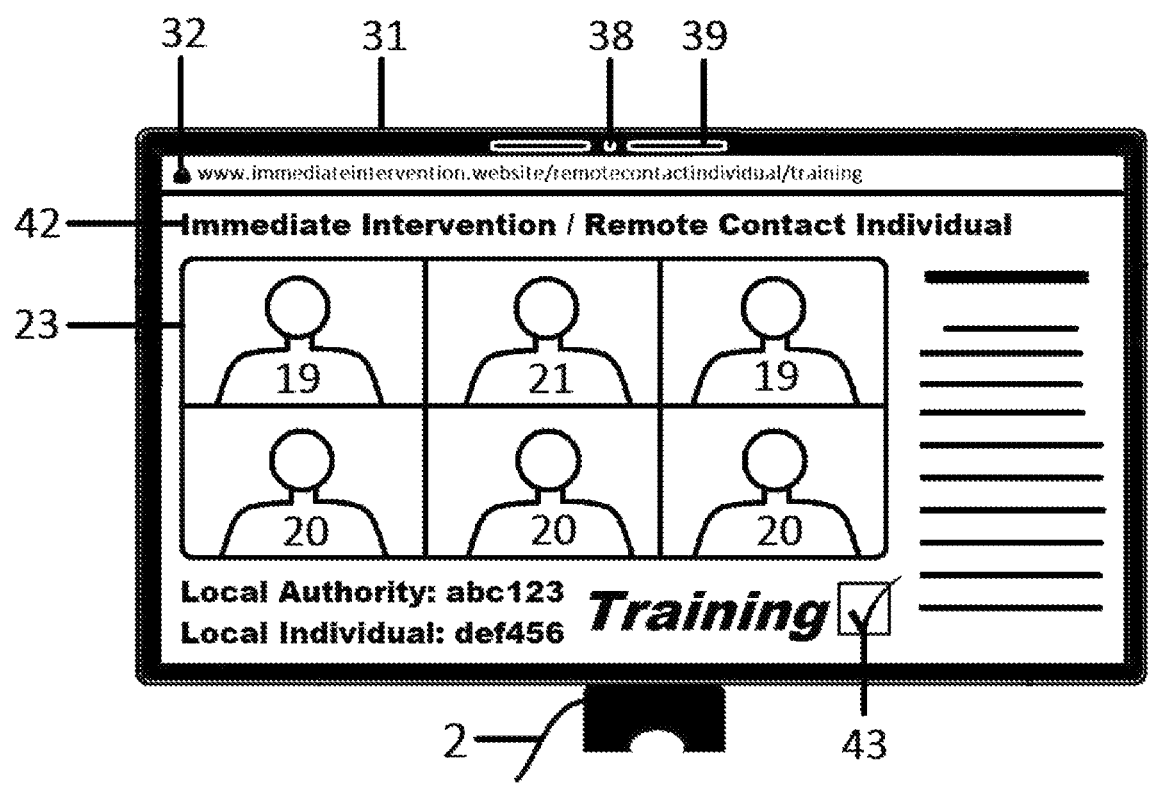

FIG. 11 illustrates a computerized device of a remote contact individual (jk1101112) that is connected to a network and transmitting a data to the central computer and is equipped with a digital camera means, a speaker means and a microphone means. The remote contact individual (jk1101112) has completed a training as required for practicing the processes of the present invention.

Figure 12:
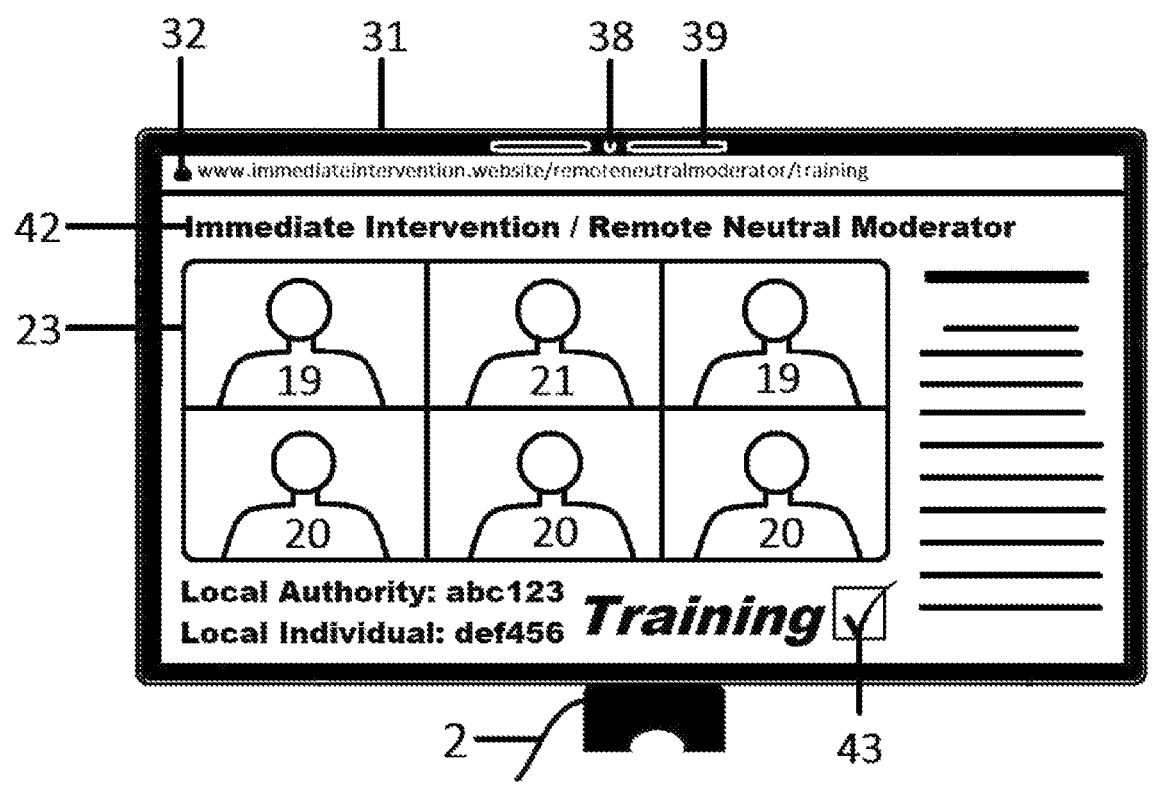

FIG. 12 illustrates a computerized device of a remote neutral moderator (mno131415) that is connected to a network and transmitting a data to the central computer and is equipped with a digital camera means, a speaker means and a microphone means. The remote neutral moderator (mno131415) has completed a training as required for practicing the processes of the present invention.

Figure 13:
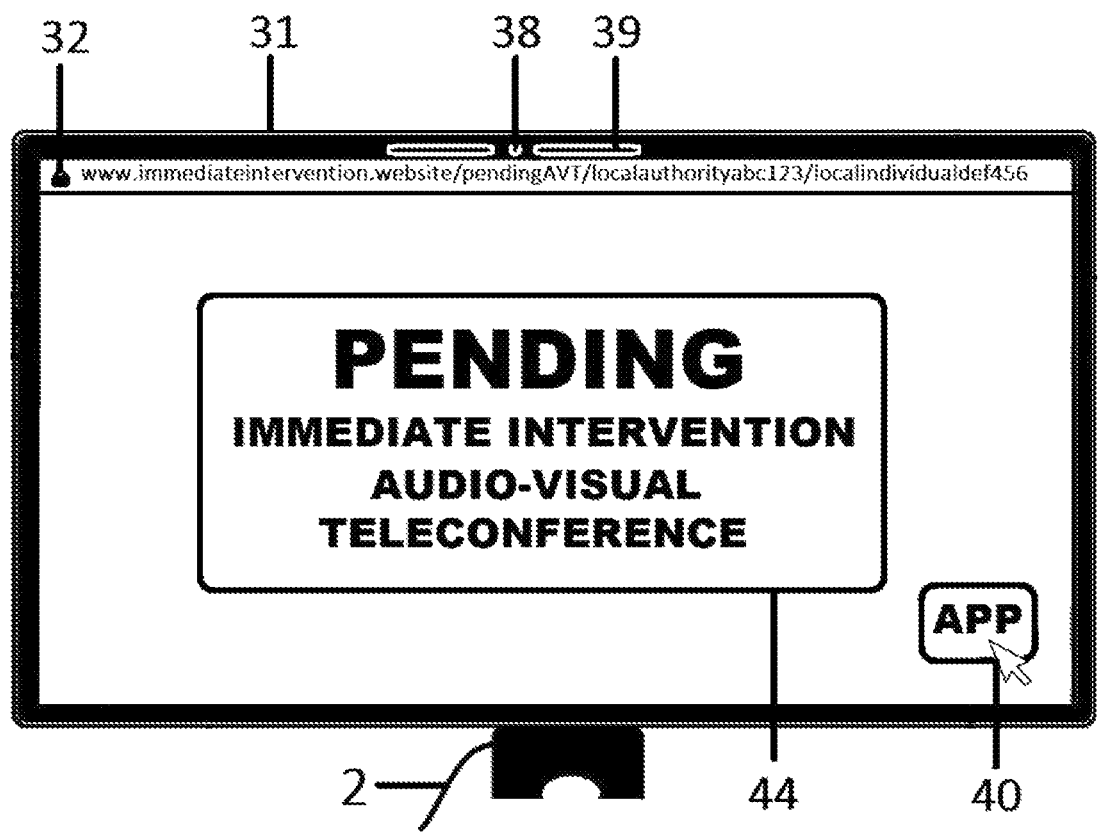

FIG. 13 illustrates a computerized device of a (remote authority (ghi789), a remote contact individual jk1101112) and a remote neutral moderator (mno131415)). The computerized device of the (remote authority (ghi789), remote contact individual jk1101112) and remote neutral moderator (mno131415)) is displaying a, "Pending Immediate Intervention Audio-Visual Teleconference" window and the (remote authority (ghi789), remote contact individual jk1101112) and a remote neutral moderator (mno131415)) are engaging an "App" icon.

Figure 14:
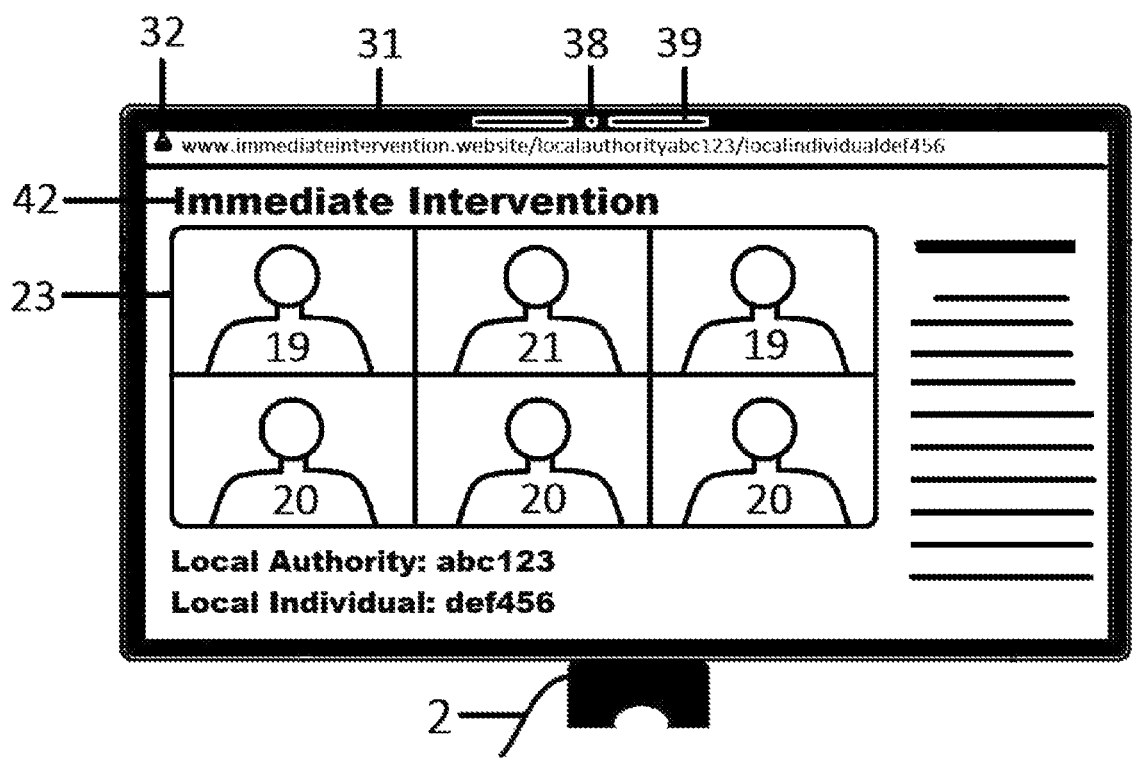

FIG. 14 illustrates a computerized device that is connected to the network and displaying an inset window of an ongoing audio-visual teleconference involving the parties of: a remote authority (ghi789) a remote contact individual (jk1101112), and a remote neutral moderator (mno131415). The immediate intervention audio-visual teleconferencing is ongoing as a result of a local authority (abc123) interacting with a local individual (def456).

Figure 15:
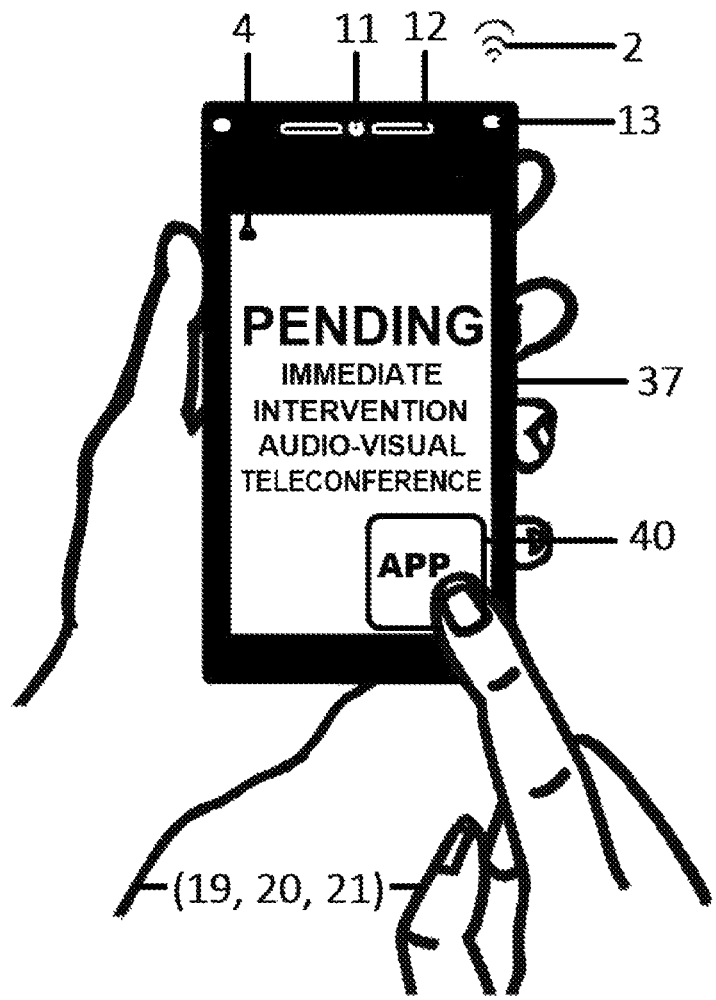

FIG. 15 illustrates an alternative embodiment of computerized device in the form of a cellular or "smartphone" of a (remote authority (ghi789), a remote contact individual jk1101112) and a remote neutral moderator (mno131415)). The alternative embodiment of computerized device in the form of a cellular or "smartphone" of the (remote authority (ghi789), remote contact individual jk1101112) and remote neutral moderator (mno131415)) is displaying a, "Pending Immediate Intervention Audio-Visual Teleconference" window and the (remote authority (ghi789), remote contact individual jk1101112) and a remote neutral moderator (mno131415)) are engaging an "App" icon.

Figure 16:
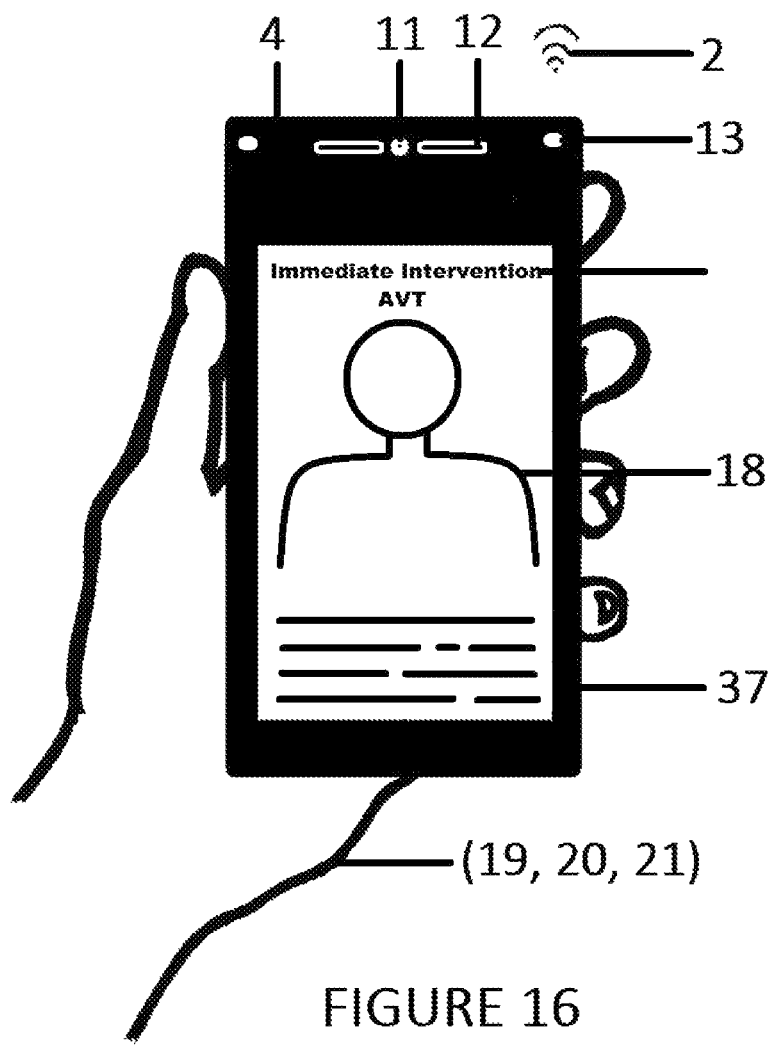

FIG. 16 illustrates an alternative embodiment of the computerized device in the form of a cellular or "smartphone" that is connected to the network and displaying an inset window of an ongoing audio-visual teleconference involving the parties of: a remote authority (ghi789) a remote contact individual (jk1101112), and a remote neutral moderator (mno131415). The immediate intervention audio-visual teleconferencing is ongoing as a result of a local authority (abc123) interacting with a local individual (def456).

Figure 17:
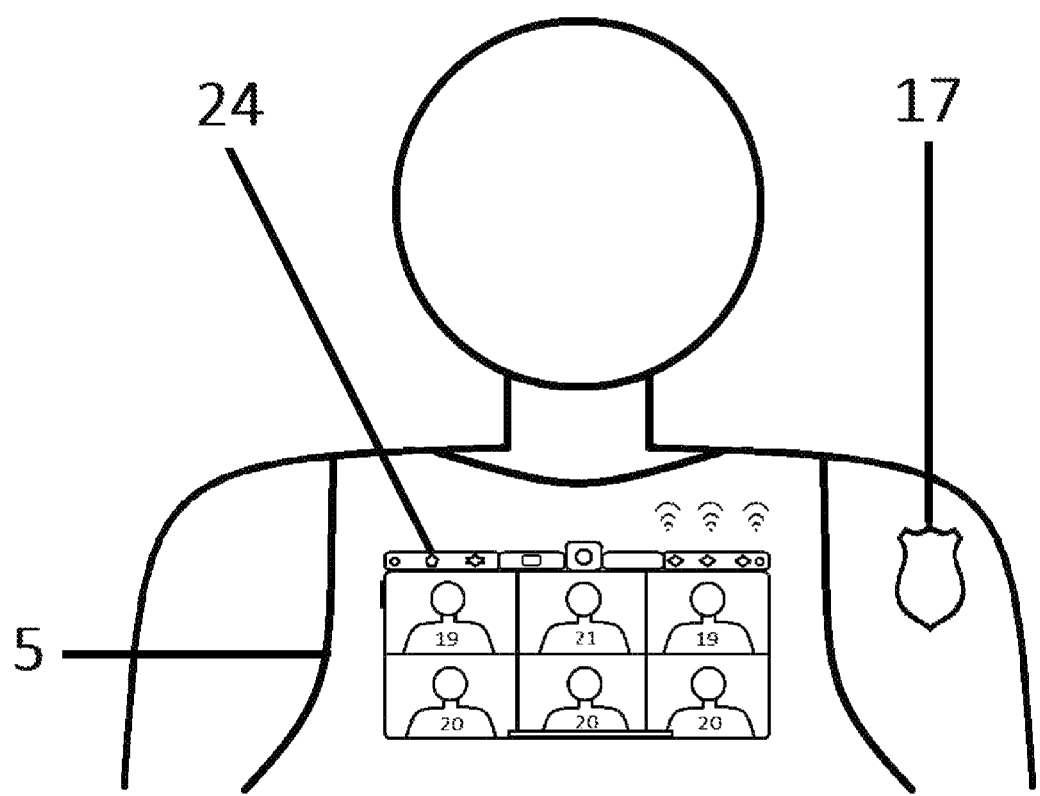

FIG. 17 illustrates a local authority (abc123) wearing a personal protective equipment in the form of a bullet proof vest. A LAMP is mounted on the vest of the local authority (abc123).

Figure 18:
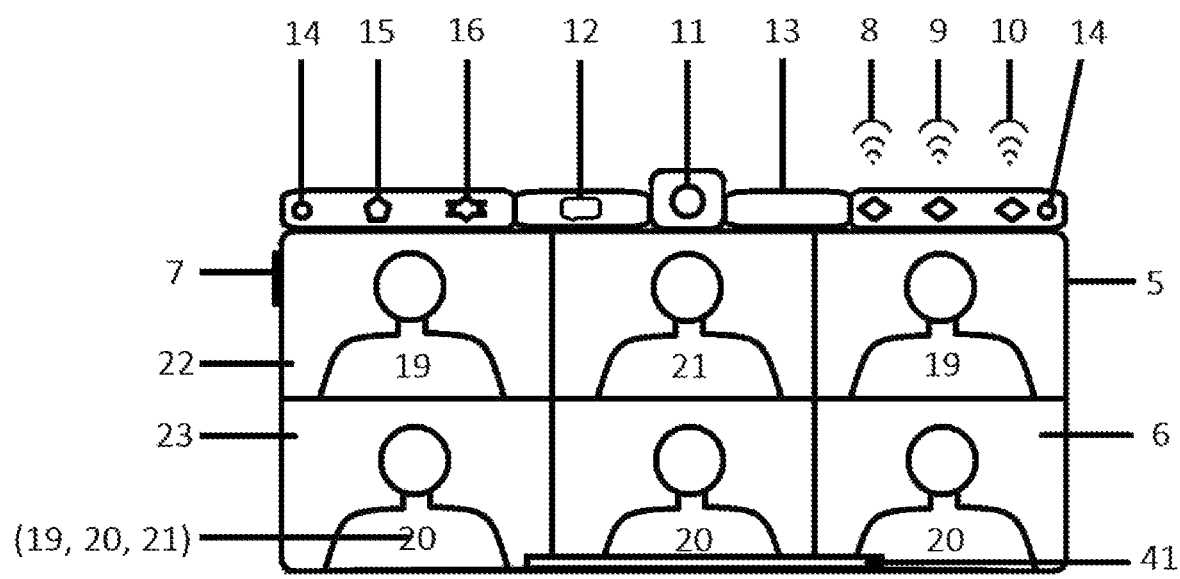

FIG. 18 illustrates a detailed view of a LAMP comprising: a monitor, initializing button, network connection means, GPS, means, ECS, digital camera(s) means, digital microphone means, digital audio speaker(s) means, triangulation means, human organism presence detection, facial recognition, touchscreen keyboard, an inset windows of an ongoing IIAVT inclusive of remote authorities (ghi789), remote contact individual(s) (jk1101112), and a remote neutral moderator (mno131415).

Figure 19:
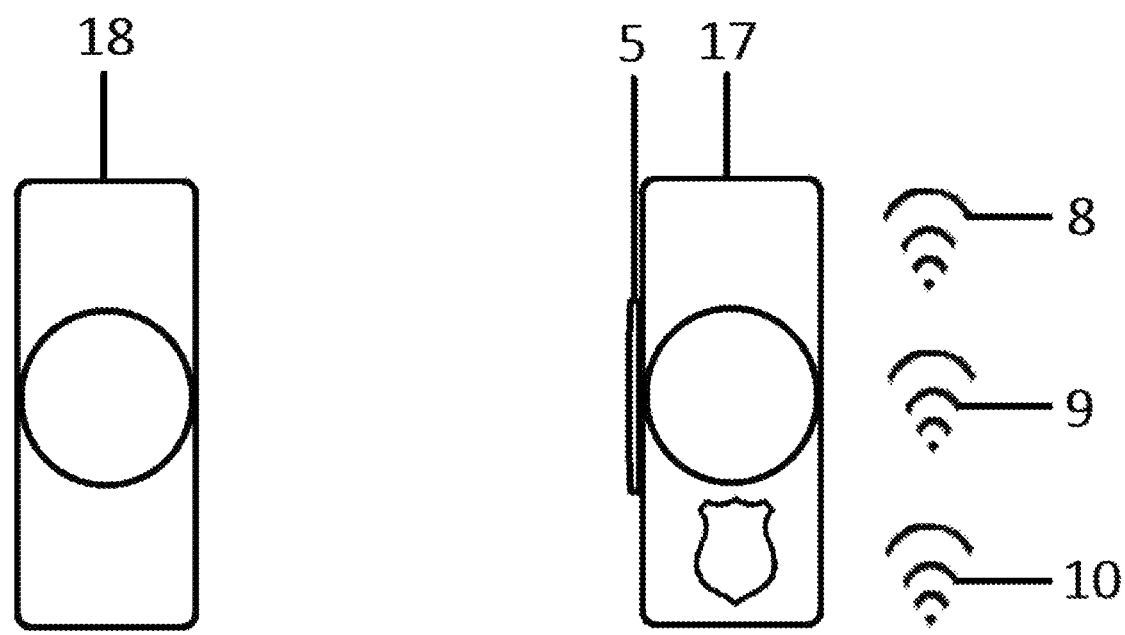

FIG. 19 illustrates an aerial view of a local authority (abc123), who is equipped with a LAMP inclusive of network connectivity means, GPS and ECS, and interacting with a local individual. The local authority (abc123) is equipped with a LAMP inclusive of ECSs.

Figure 20:
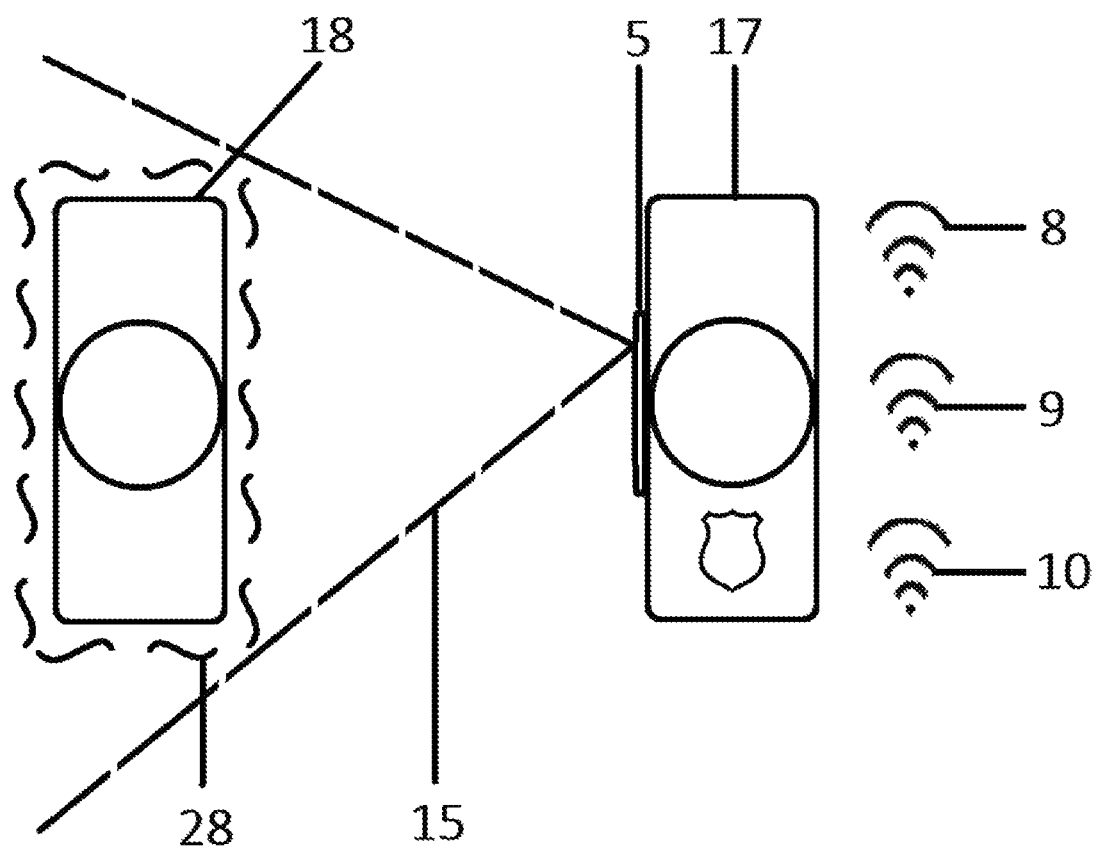

FIG. 20 illustrates an aerial view of a local authority (abc123), who is equipped with a LAMP inclusive of network connectivity means, GPS and ECS, and interacting with a local individual (def456) and utilizing an infrared means of the LAMP in order to detect the presence of a human organism by detecting a human organism body temperature signature.

Figure 21:
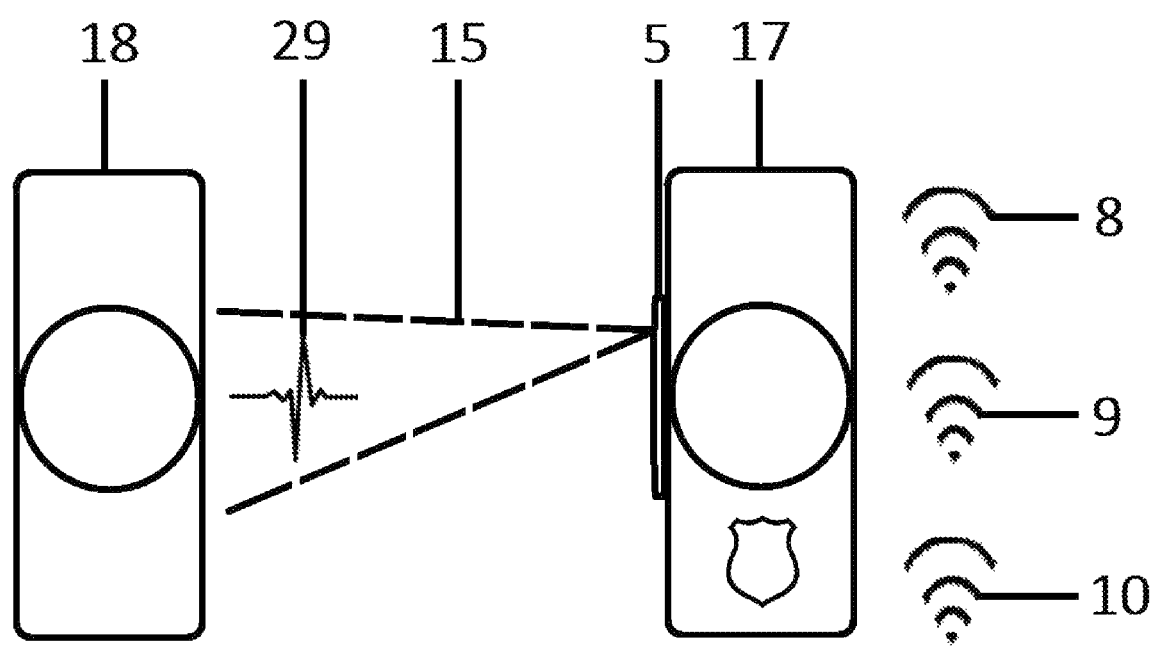

FIG. 21 illustrates an aerial view of a local authority (abc123), who is equipped with an operative LAMP inclusive of network connectivity means, GPS and ECS, and interacting with a local individual (def456) and utilizing an human organism heartbeat signature means of the LAMP in order to detect the presence of a human organism.

Figure 22:
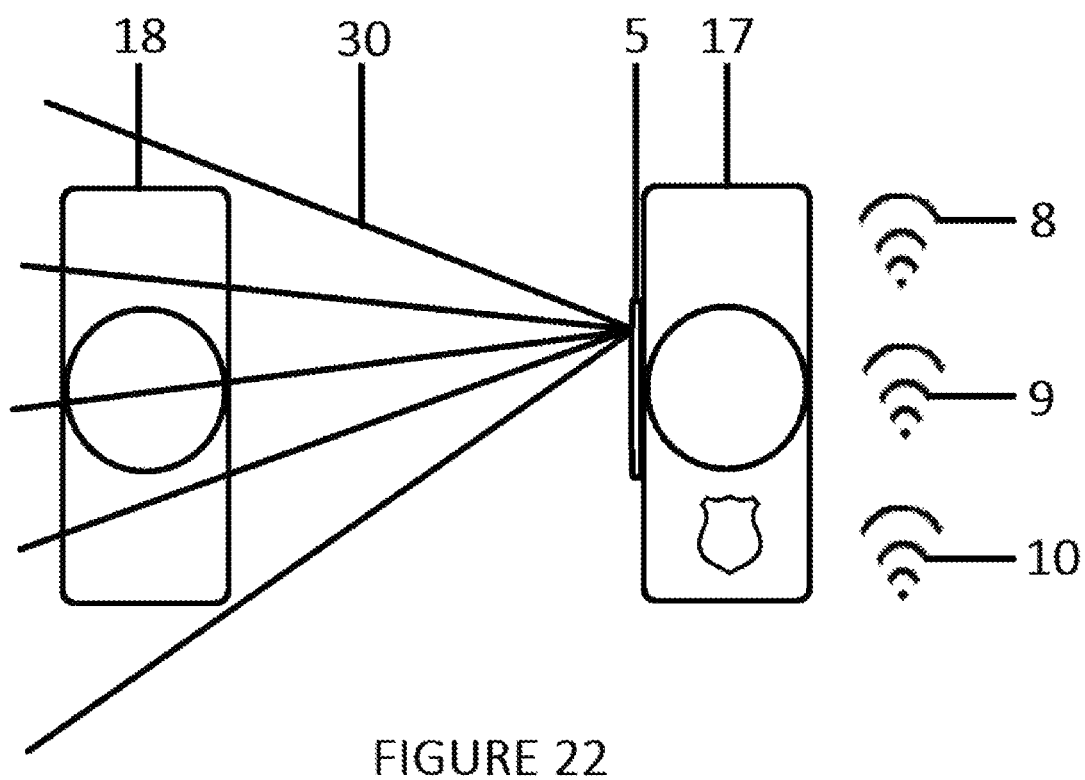

FIG. 22 illustrates an aerial view of a local authority (abc123), who is equipped with an operative LAMP inclusive of network connectivity means, GPS and ECS, and with a local individual (def456) and utilizing a three (3) dimensional figure contour means of the LAMP in order to detect the presence of a human organism.

Figure 23:
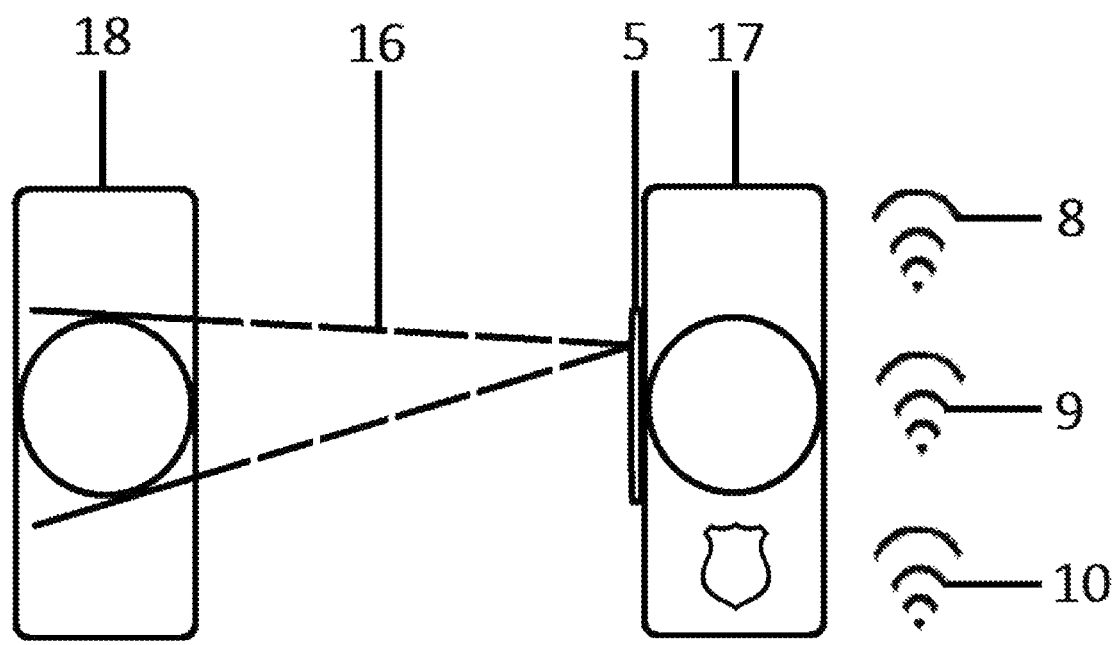

FIG. 23 illustrates an aerial view of a local authority (abc123), who is equipped with an operative LAMP inclusive of network connectivity means, GPS and ECS, and interacting with a local individual (def456) and utilizing a facial recognition means of the LAMP and identifying a local individual (def456).

Figure 24:
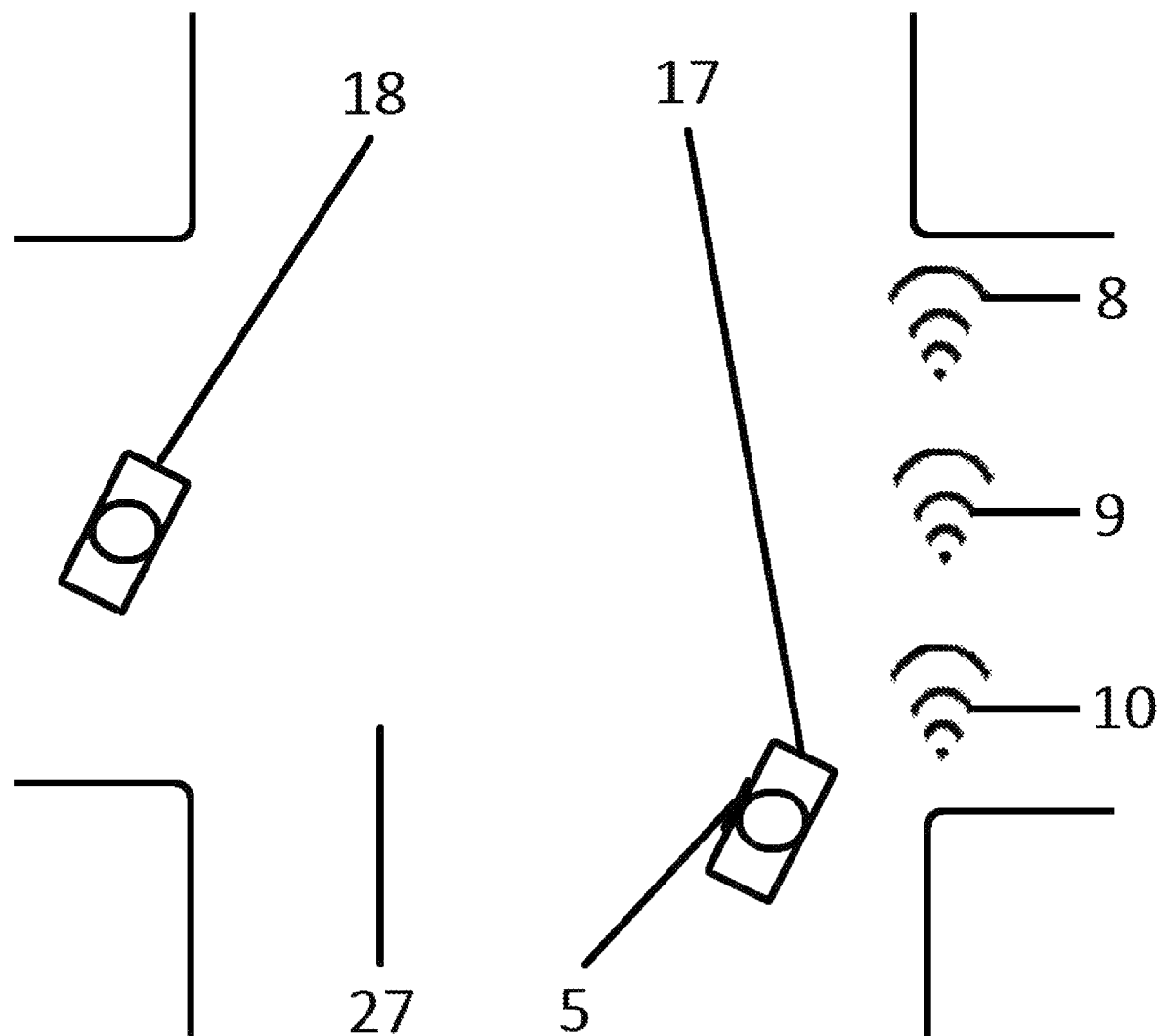

FIG. 24 illustrates an aerial view of a local authority (abc123), who is equipped with an operative LAMP inclusive of network connectivity means, GPS and ECS, and interacting with a local individual (def456) in a locality.

Figure 25:
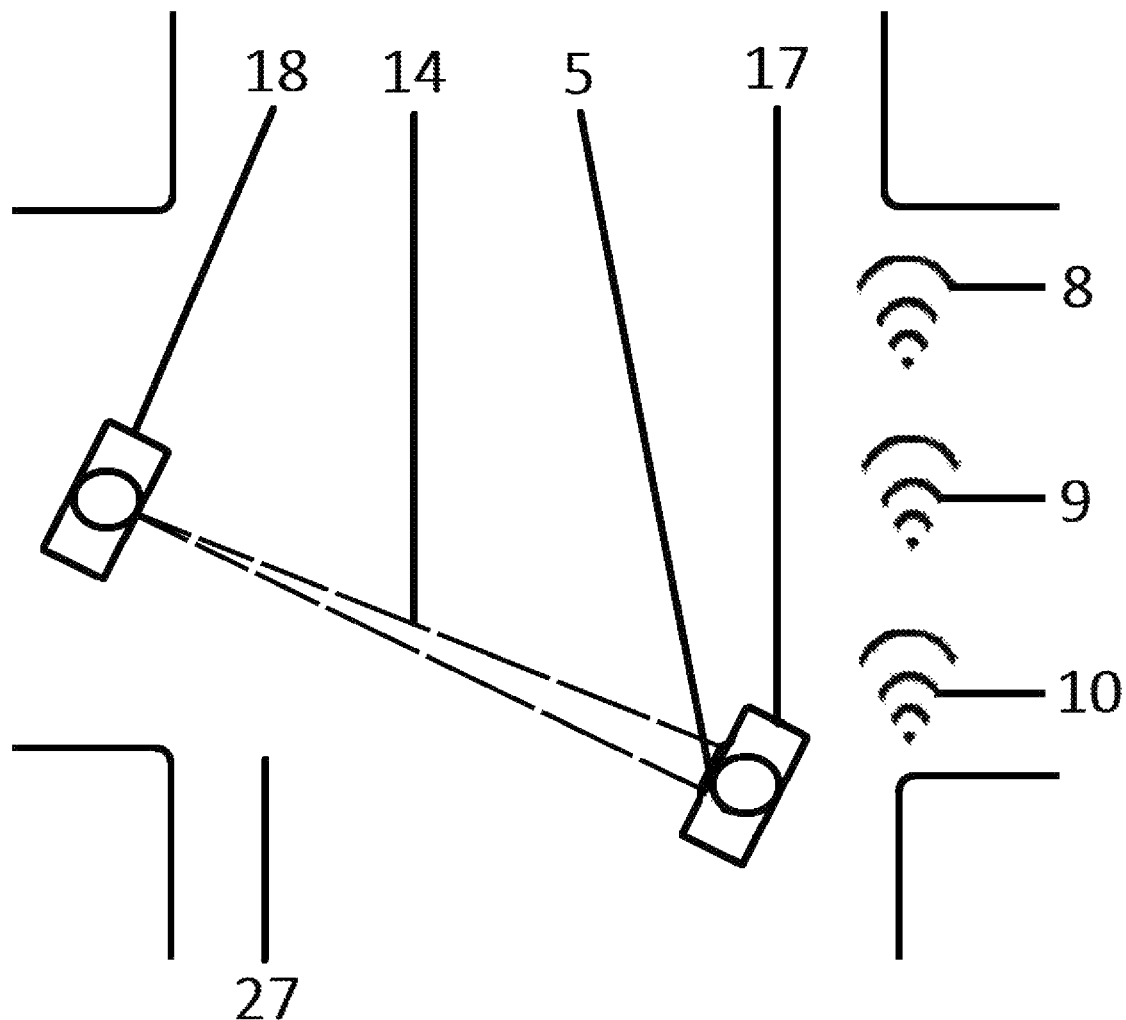

FIG. 25 illustrates an aerial view of a local authority (abc123), who is equipped with an operative LAMP inclusive of network connectivity means, GPS and ECS, and interacting with a local individual (def456) in a locality. The local authority (abc123) is utilizing a triangulation means of the local authority's (abc123) LAMP and transmitting a triangulation data that has been sub-processed by the LAMP through the network to the central computer by means of the LAMP's ECMS means. The central computer is calculating a data of the LAMP and determining a GPS location of the local authority (abcc123) and calculating a sub-processed data of the LAMP's that was sent through the network by the LAMP's ECS and calculating a determination of a local individual's 18 GPS location in relation to the local authority's 17 GPS location.

Figure 26:
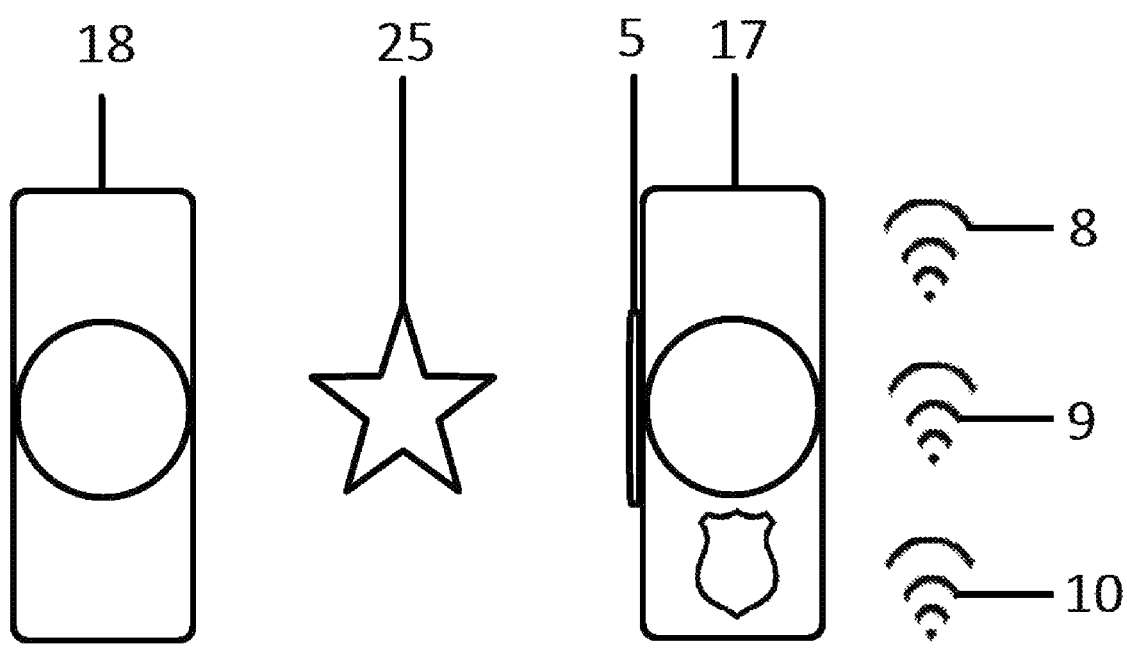

FIG. 26 illustrates an aerial view of a local authority (abc123, who is equipped with LAMP inclusive of network connectivity means, GPS and ECS, and interacting with a local individual (def456). The actions of the local authority (abc123) and/or the actions of the local individual (def456) are deemed consistent and compliant with the order of an enforcement of a law and the order of and exercise of a right as indicated by the iconic representation of a "Star".

Figure 27:
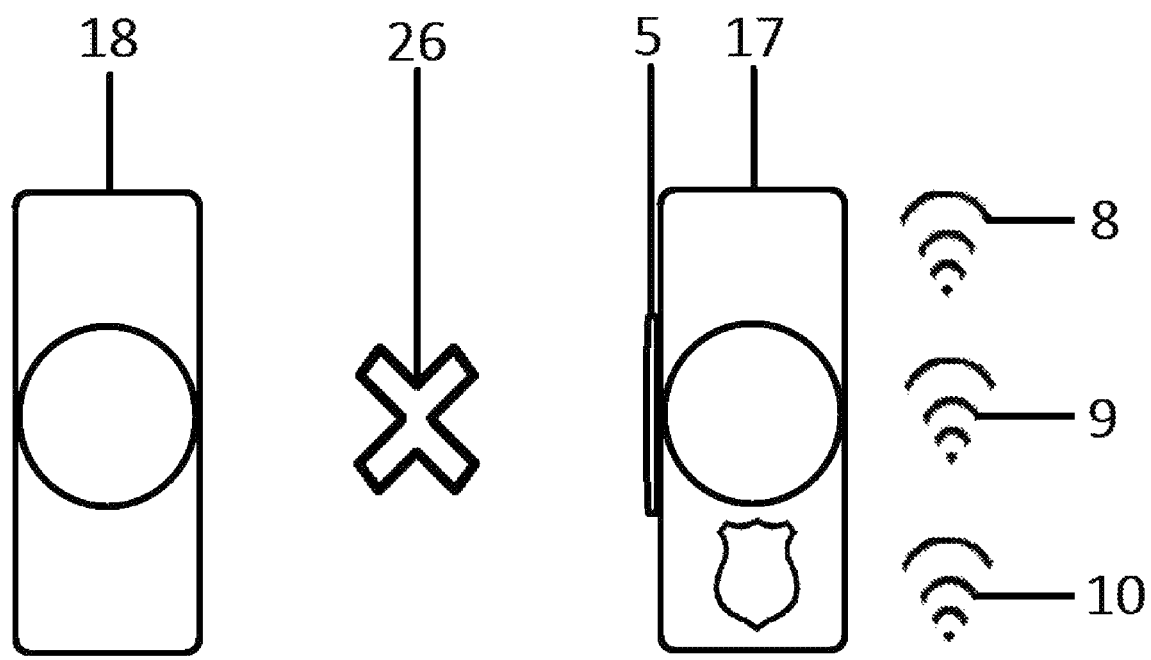

FIG. 27 illustrates an aerial view of a local authority (abc123), who is equipped with an operative LAMP inclusive of ECS, interacting with a local individual (def456). The actions of the local authority (abc123) and/or the actions of the local individual (def456) are deemed inconsistent and non-compliant with the order of an enforcement of a law and the order of and exercise of a right as indicated by the iconic representation of an "X".

FIG. 28 illustrates a unique identifying code.

Figure 29:
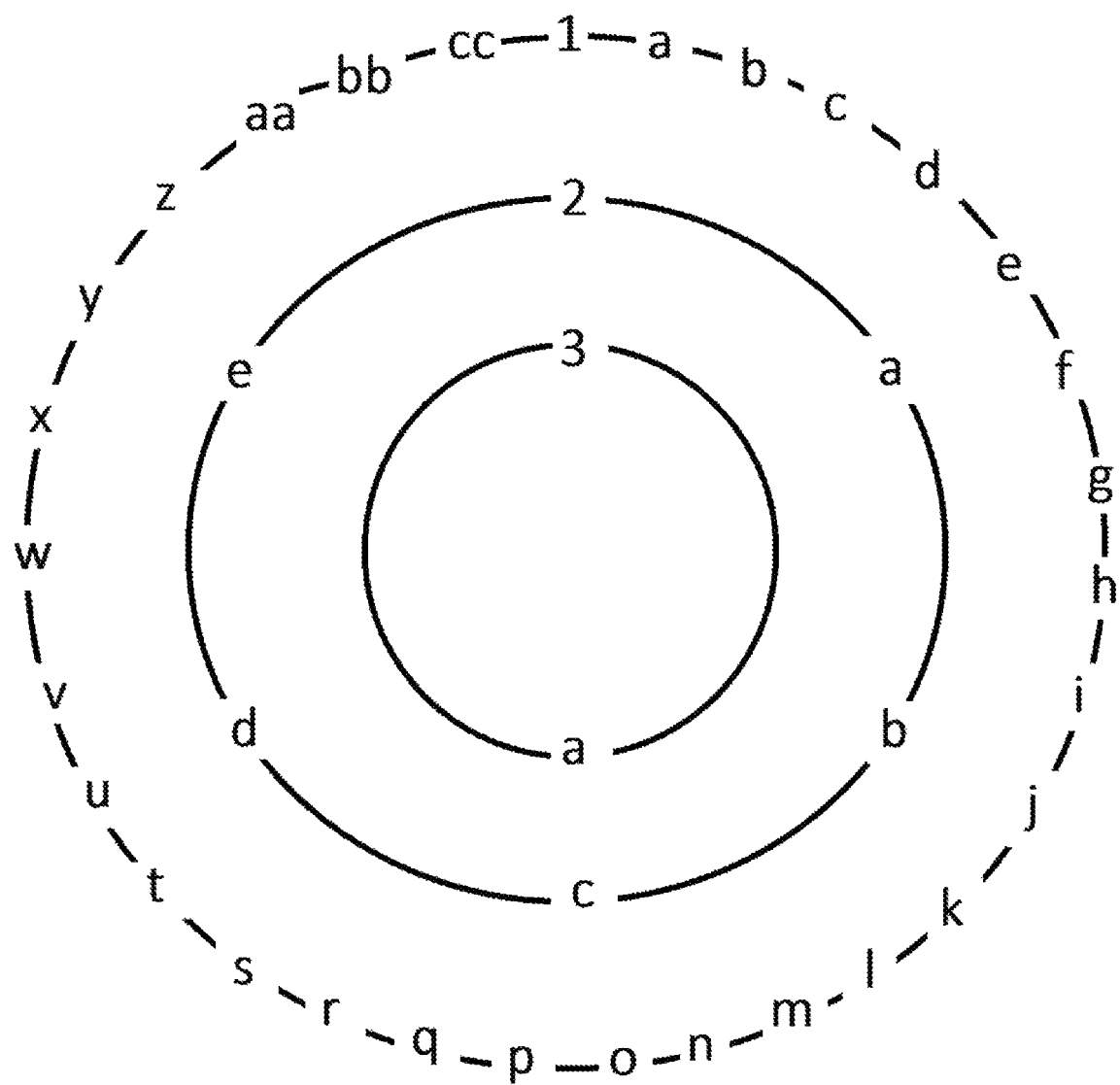
Figure 1:
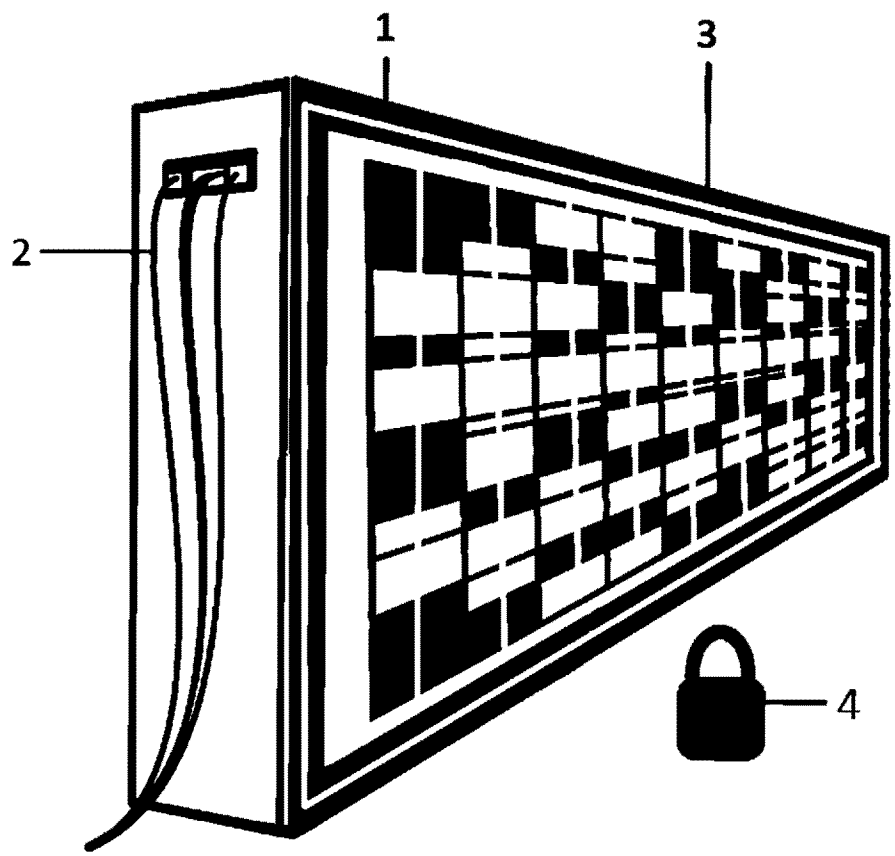
Figure 2:
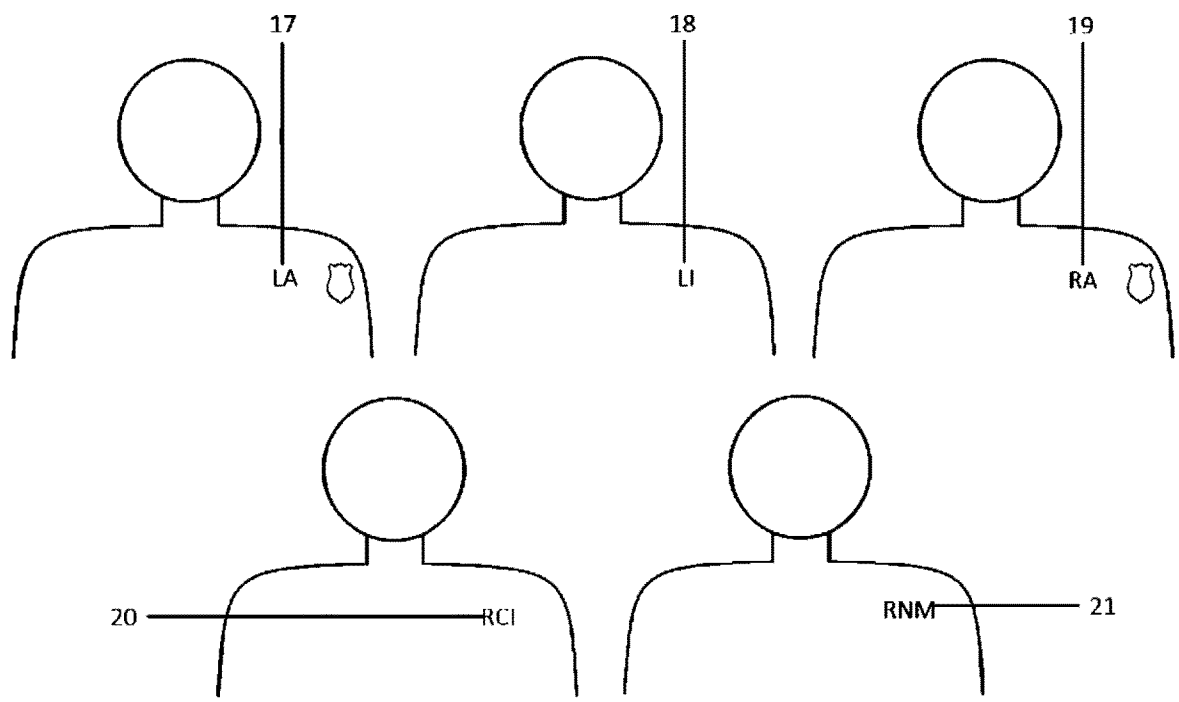
Figure 3:
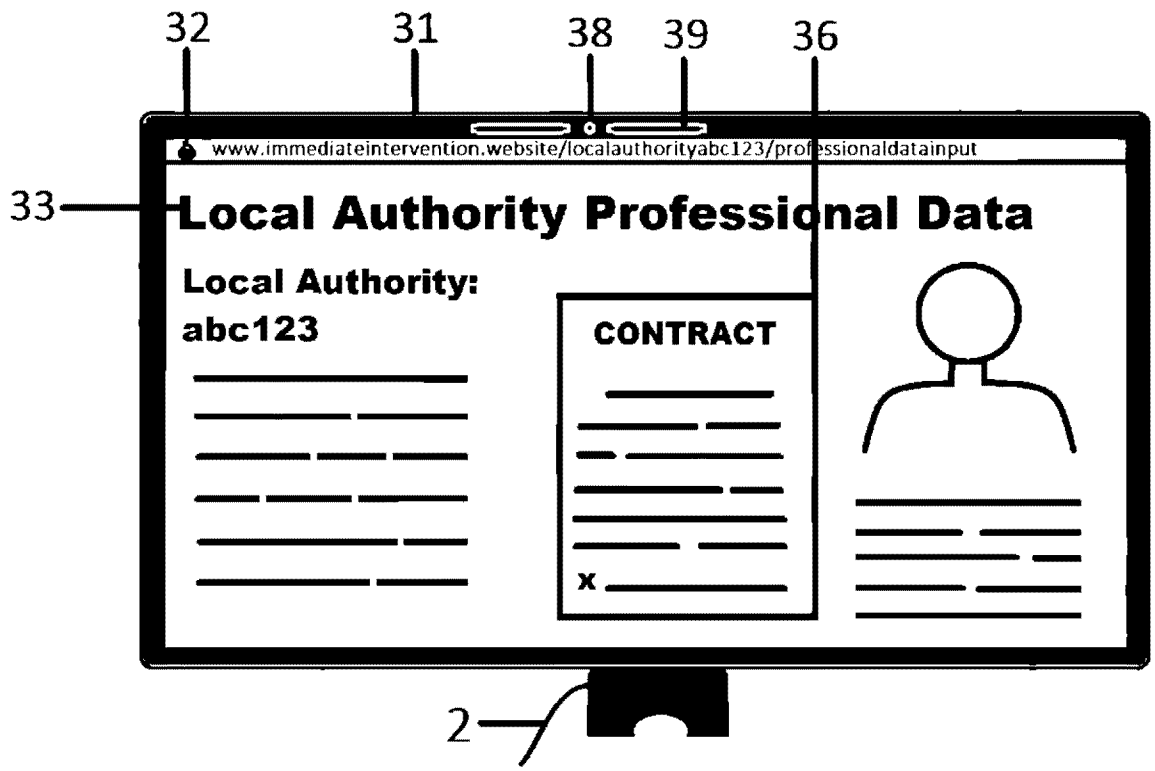
Figure 4:
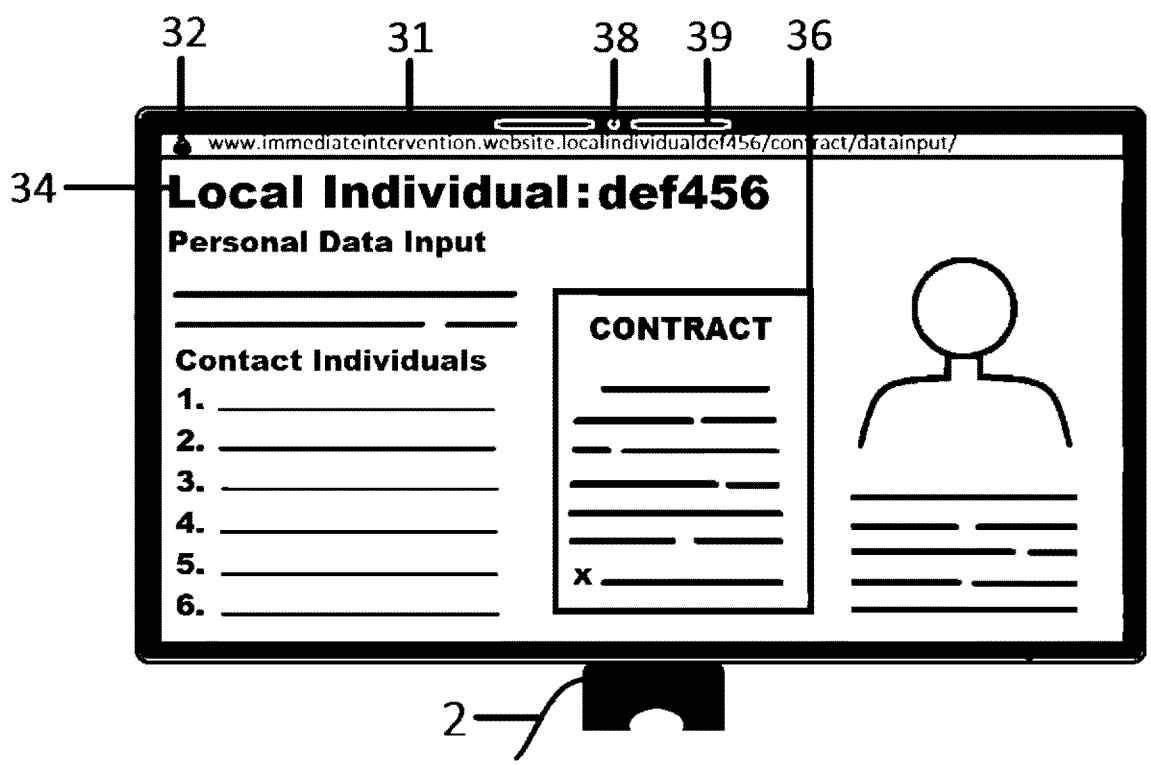
Figure 5:
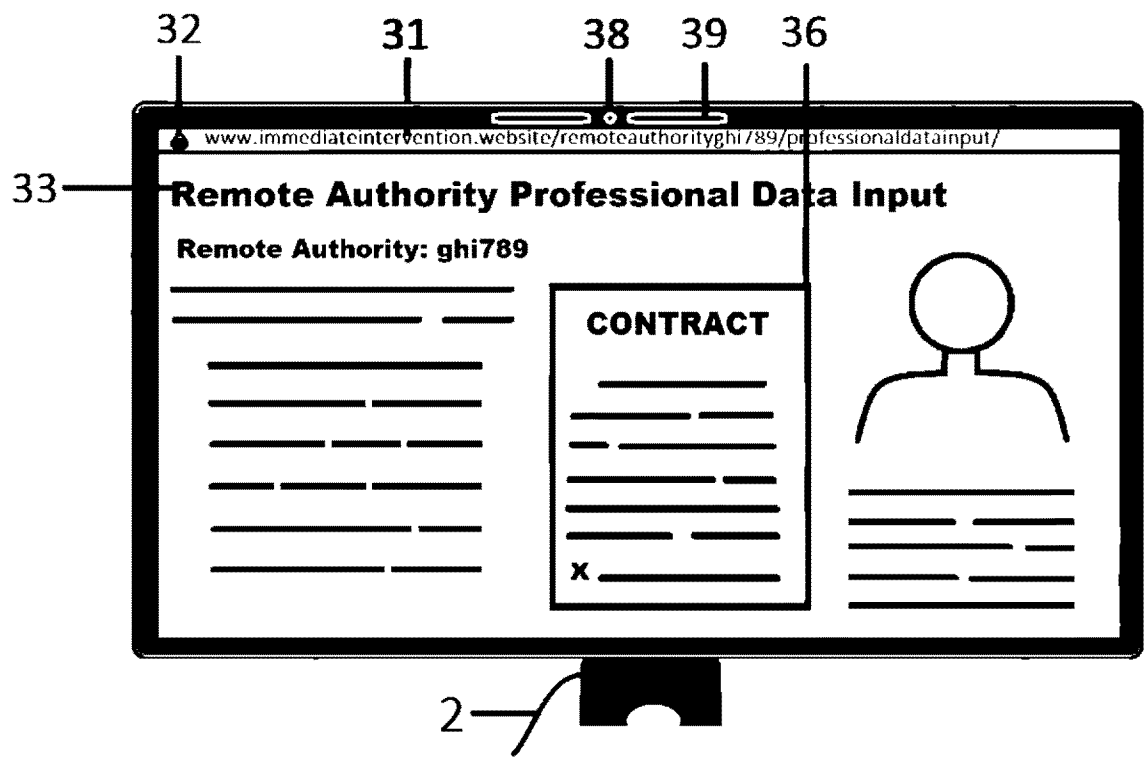
Figure 6:
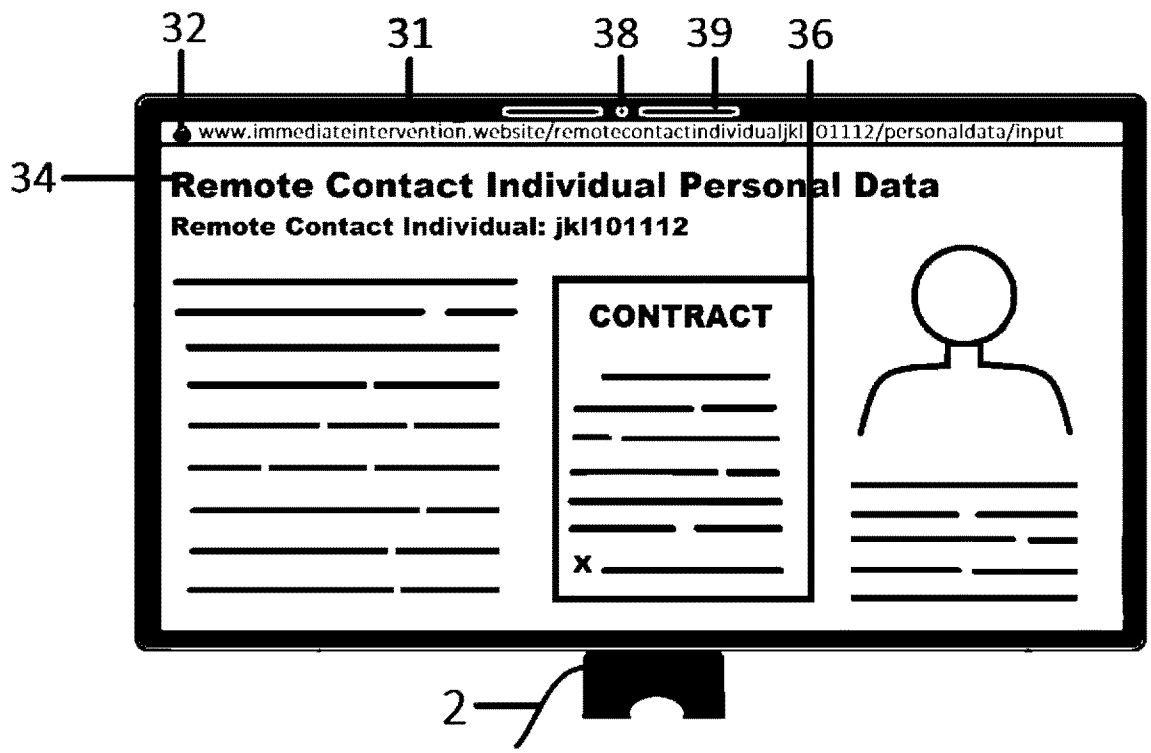
Figure 7:
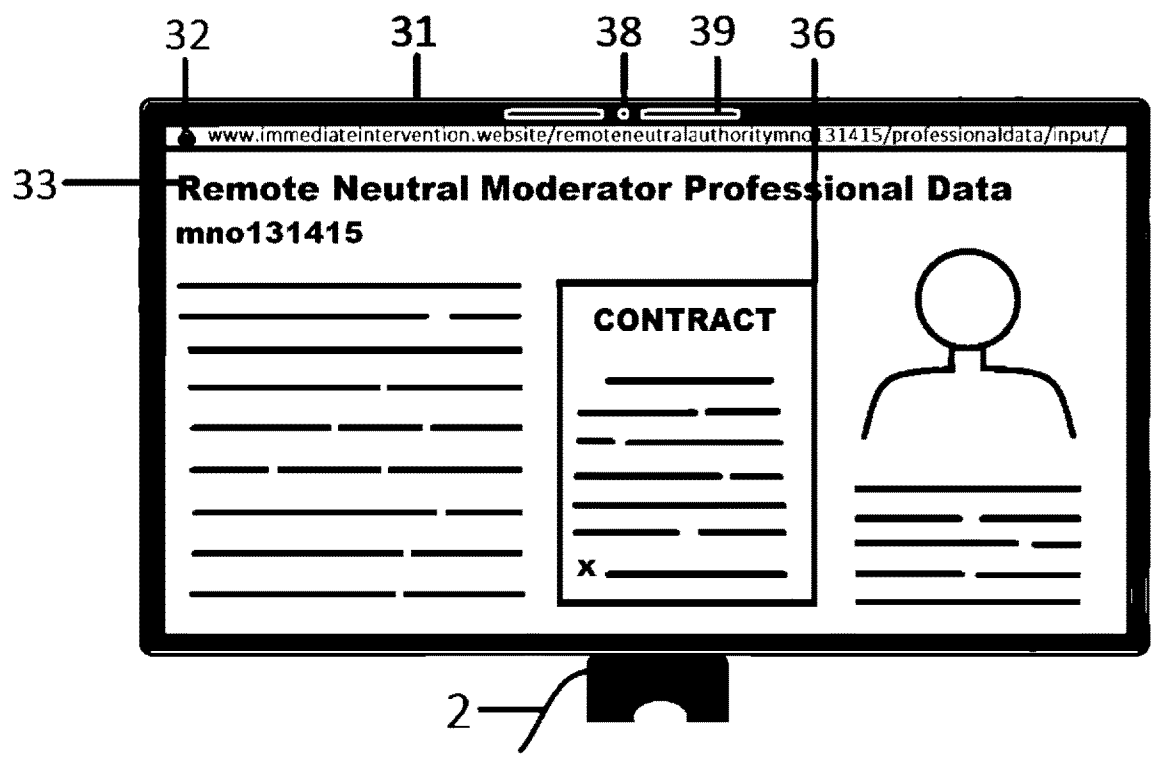
Figure 8:
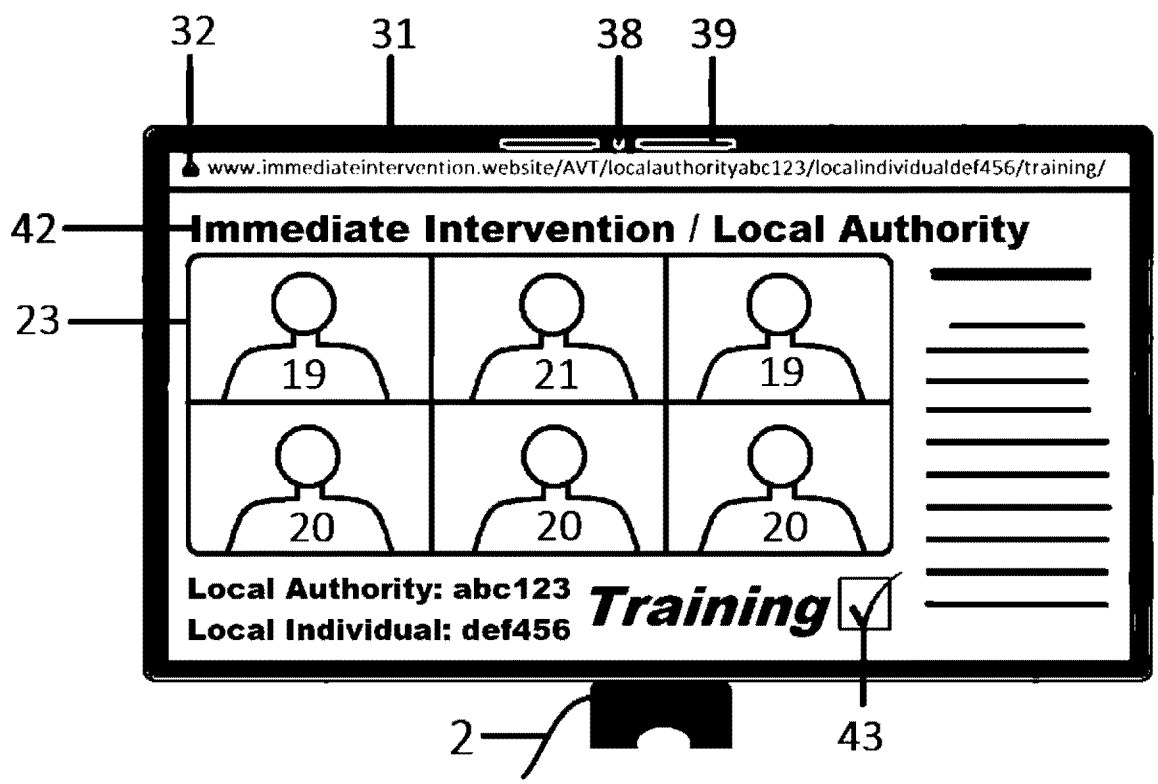
Figure 9:
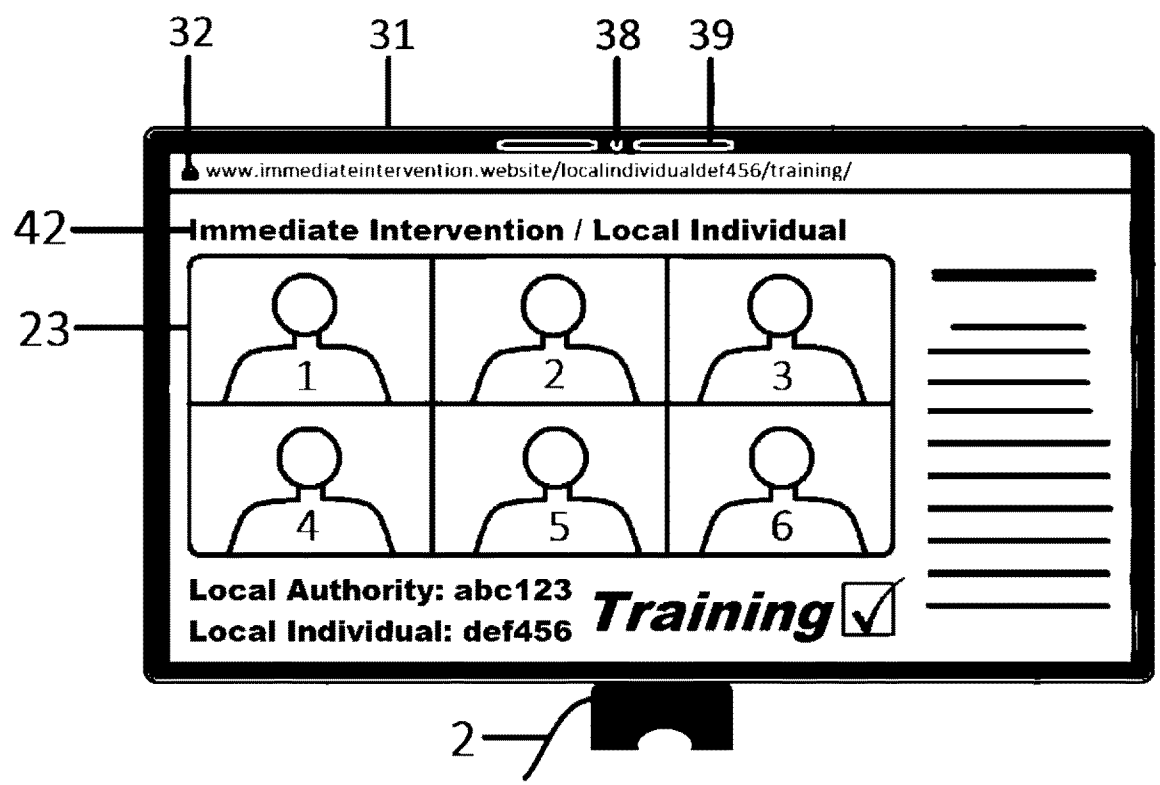
Figure 10:
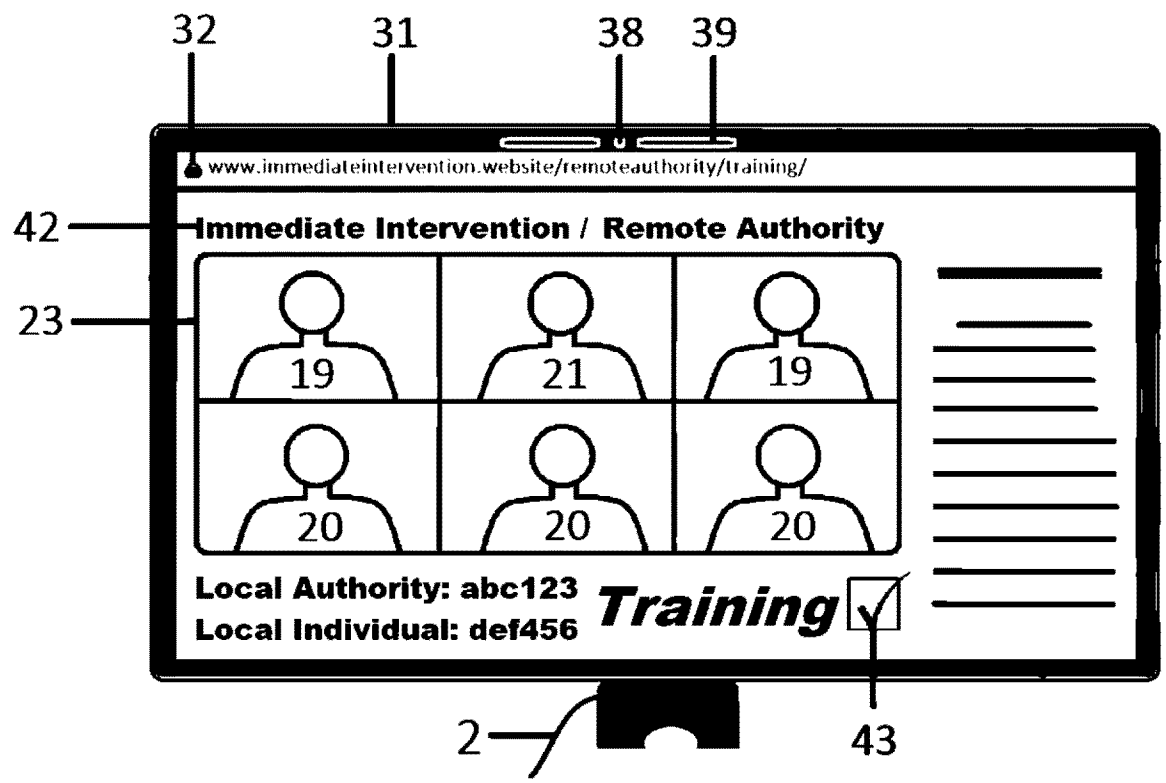
Figure 11:
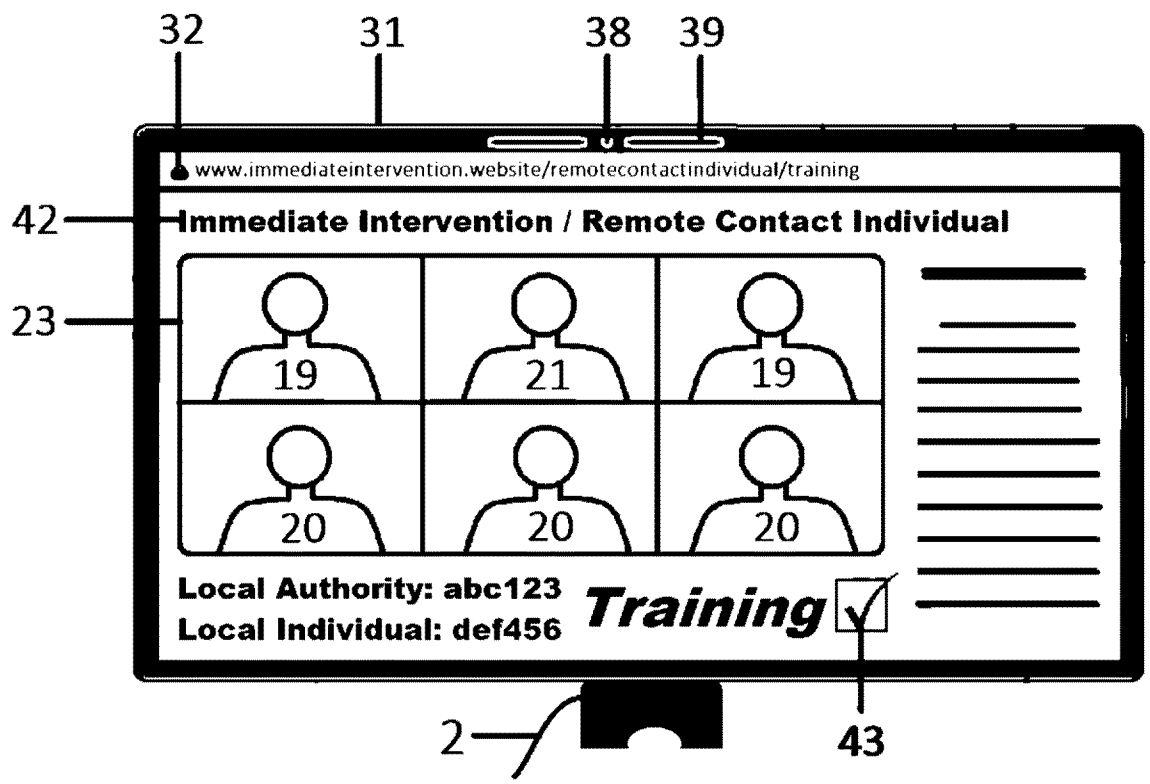
Figure 12:
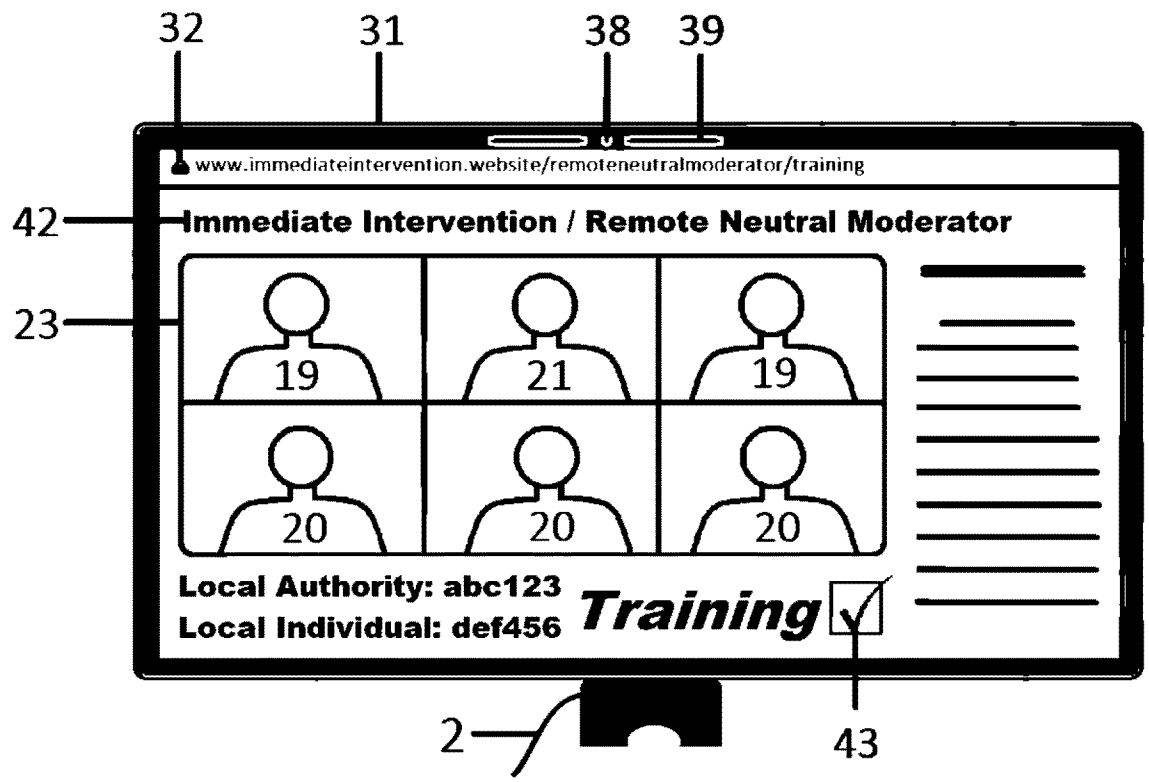
Figure 13:
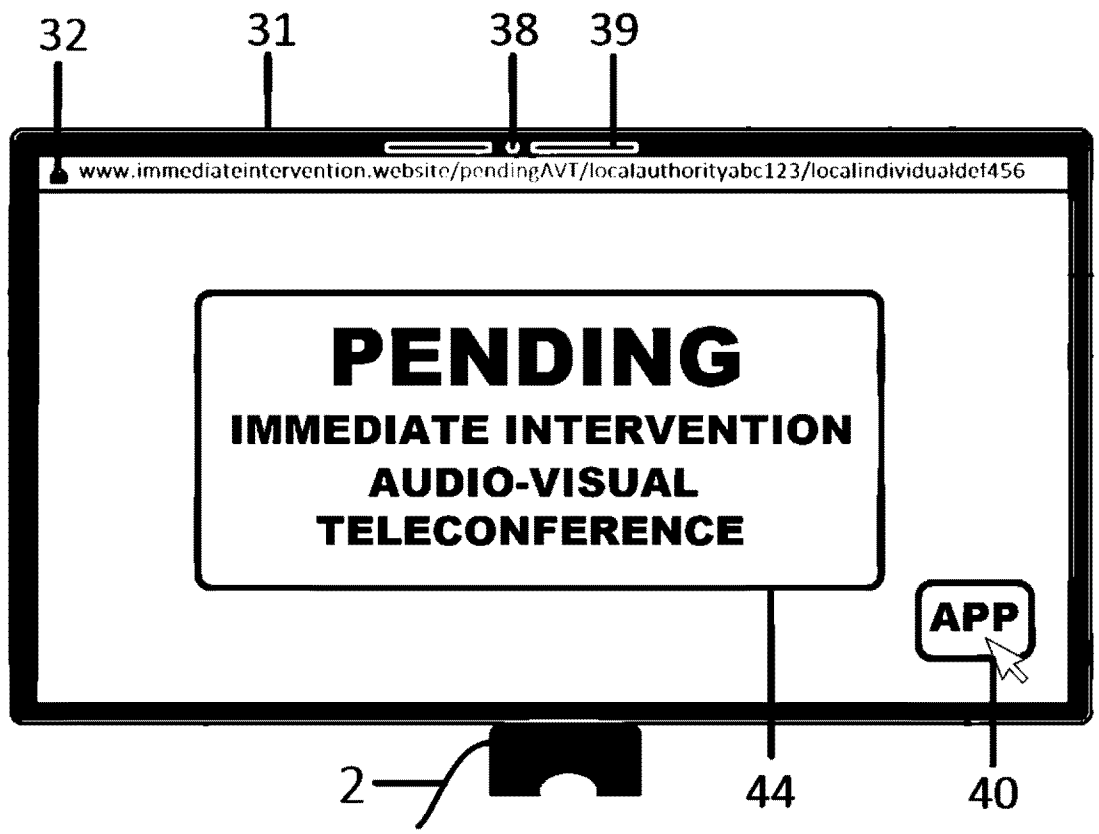
Figure 14:
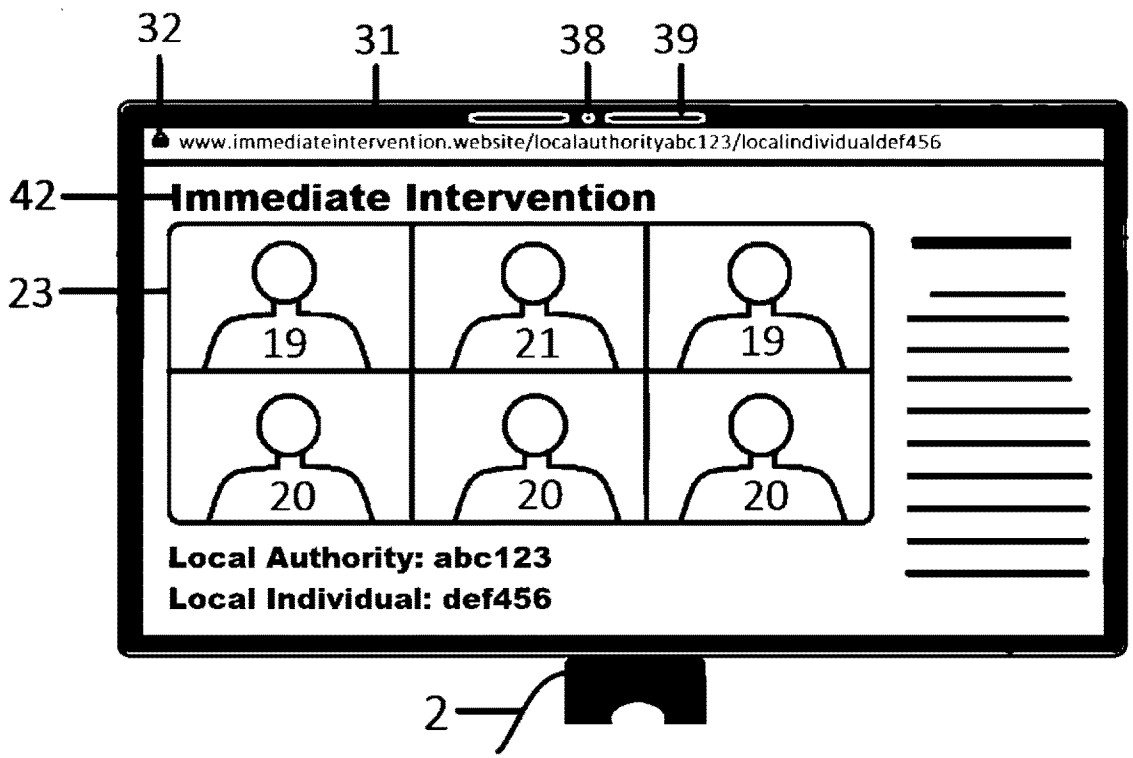
Figure 15:
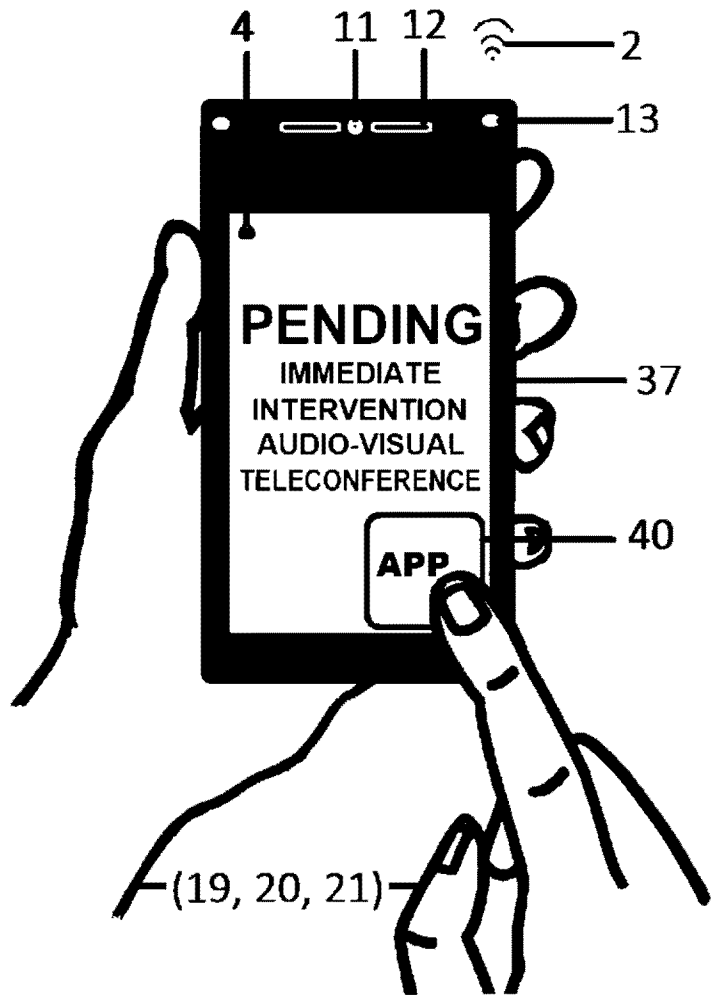
Figure 16:
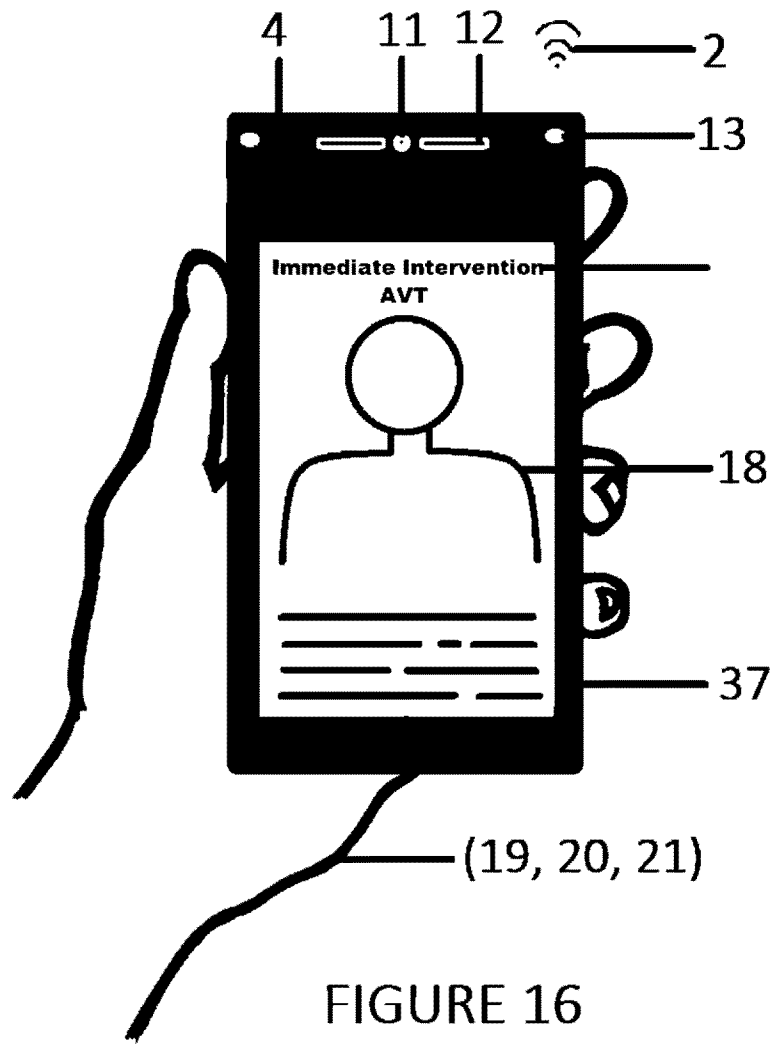
Figure 17:
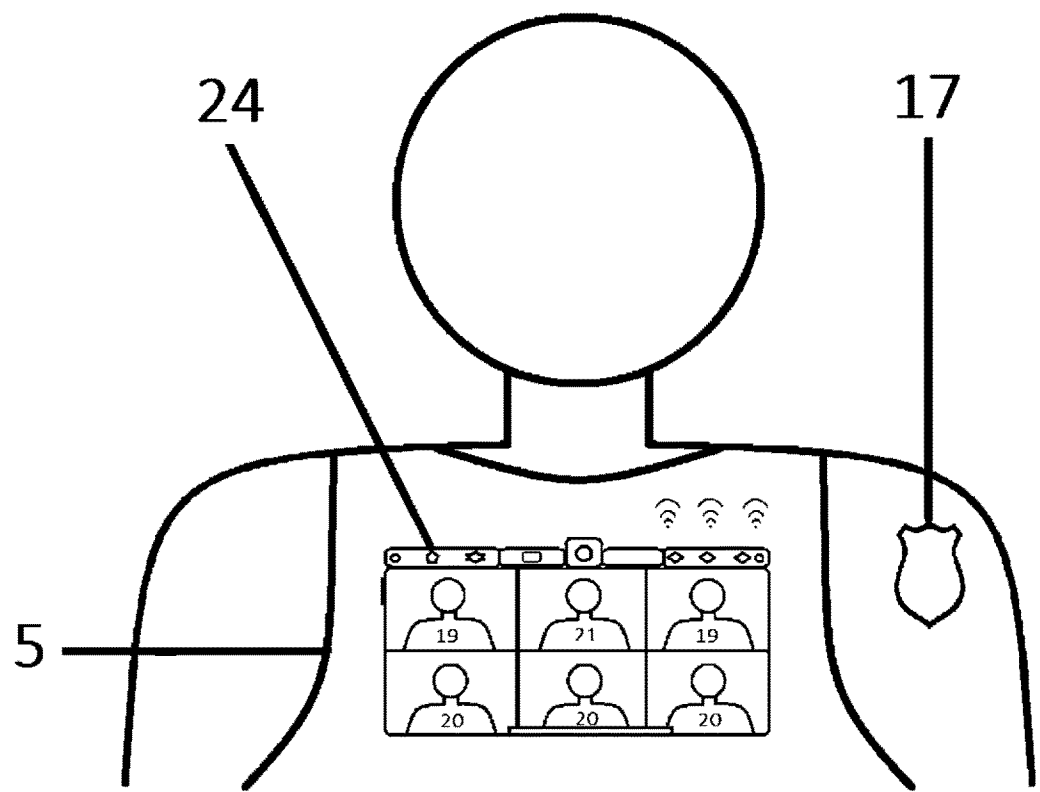
Figure 18:
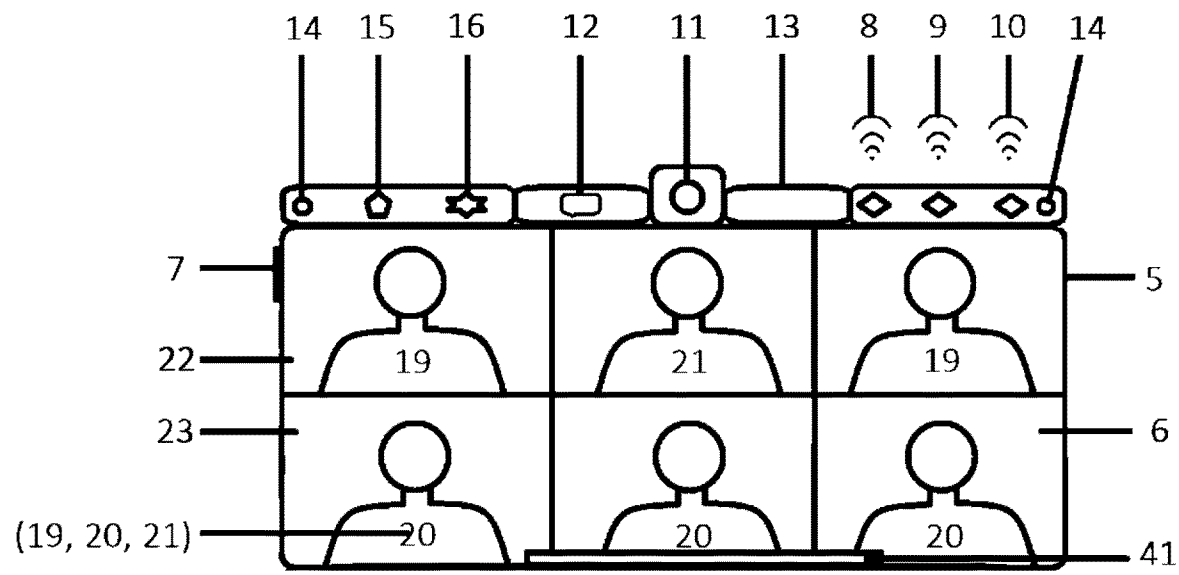
Figure 19:
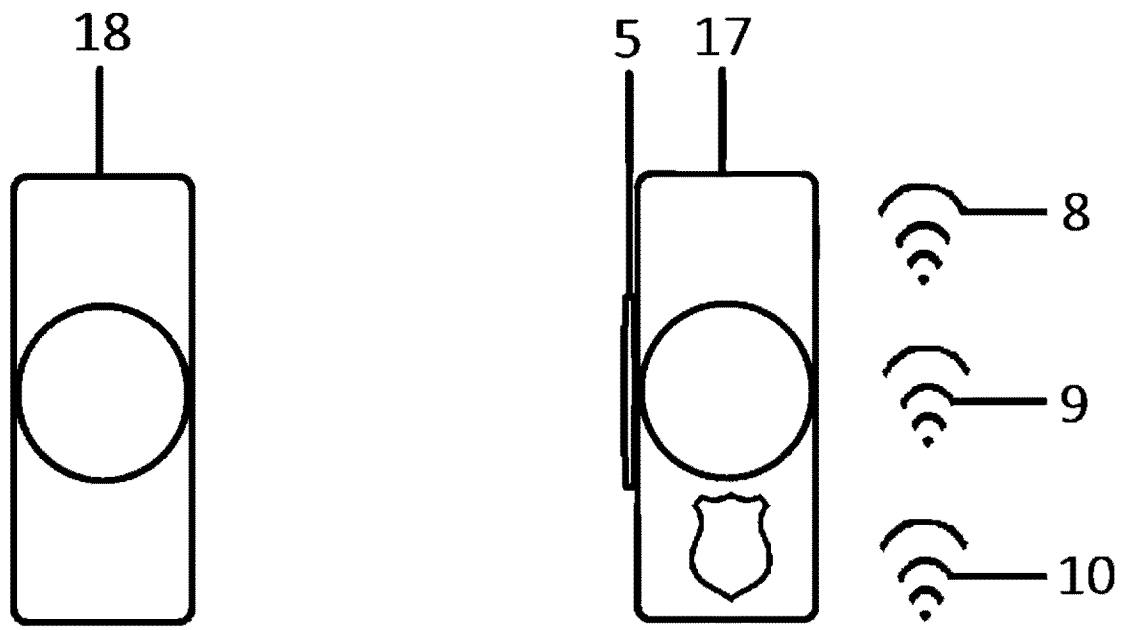
Figure 20:
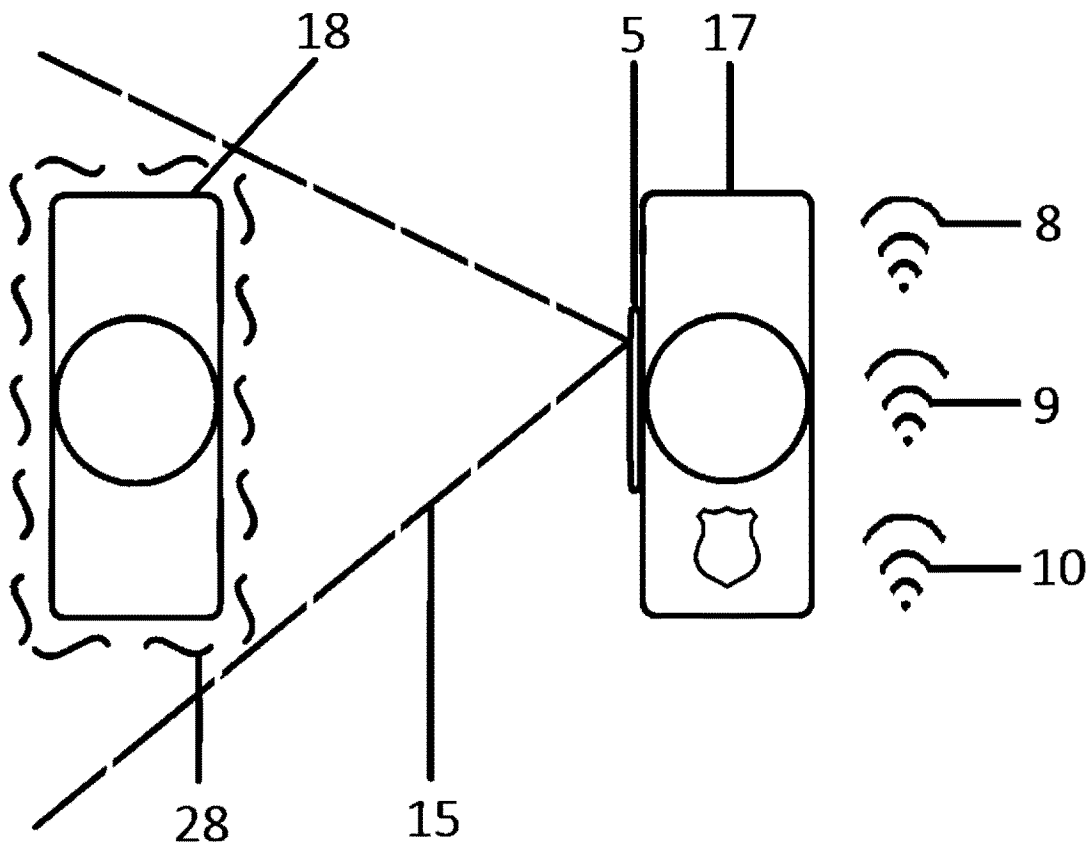
Figure 21:
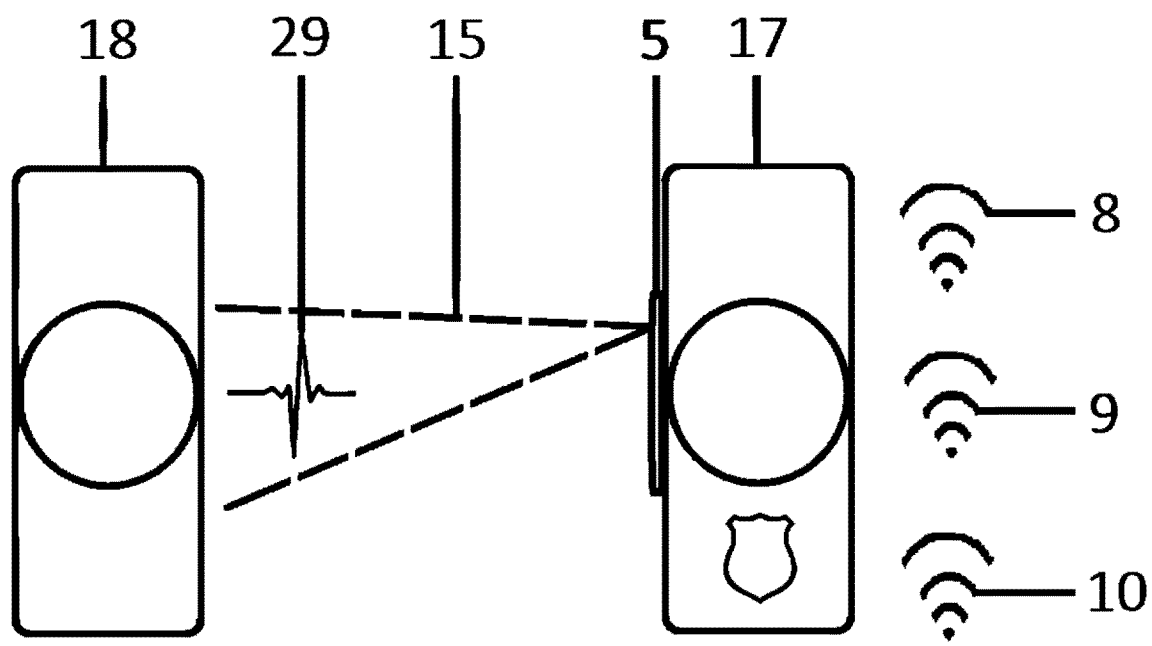
Figure 22:
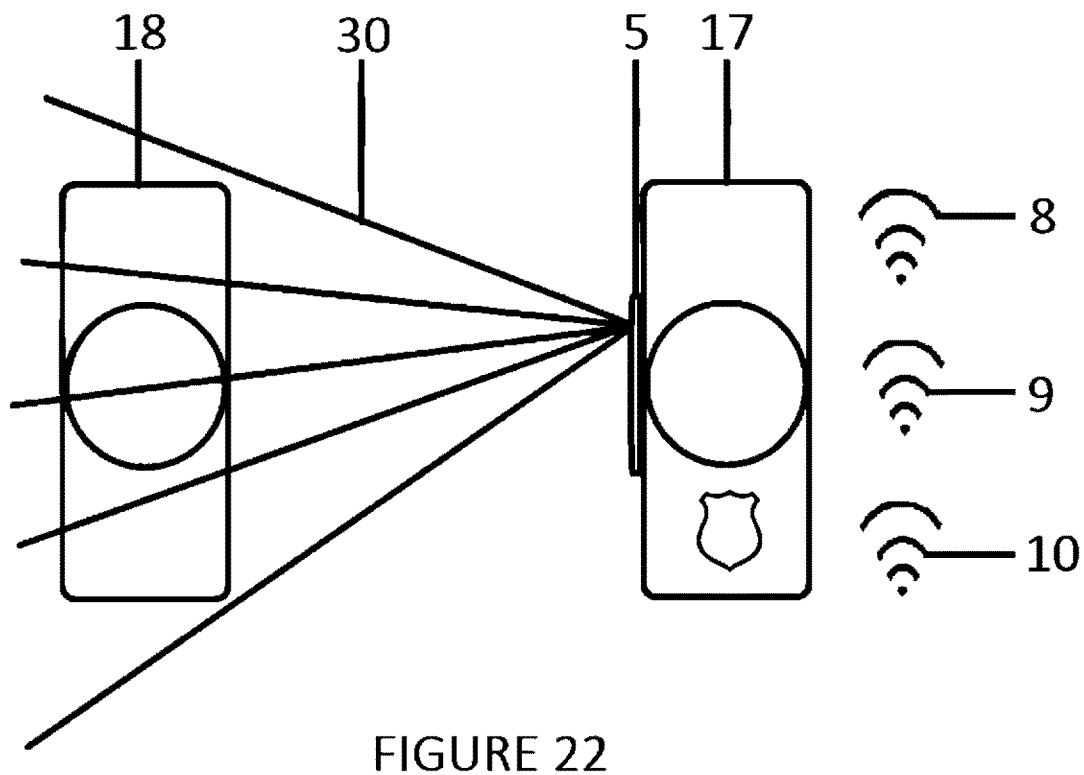
Figure 23:
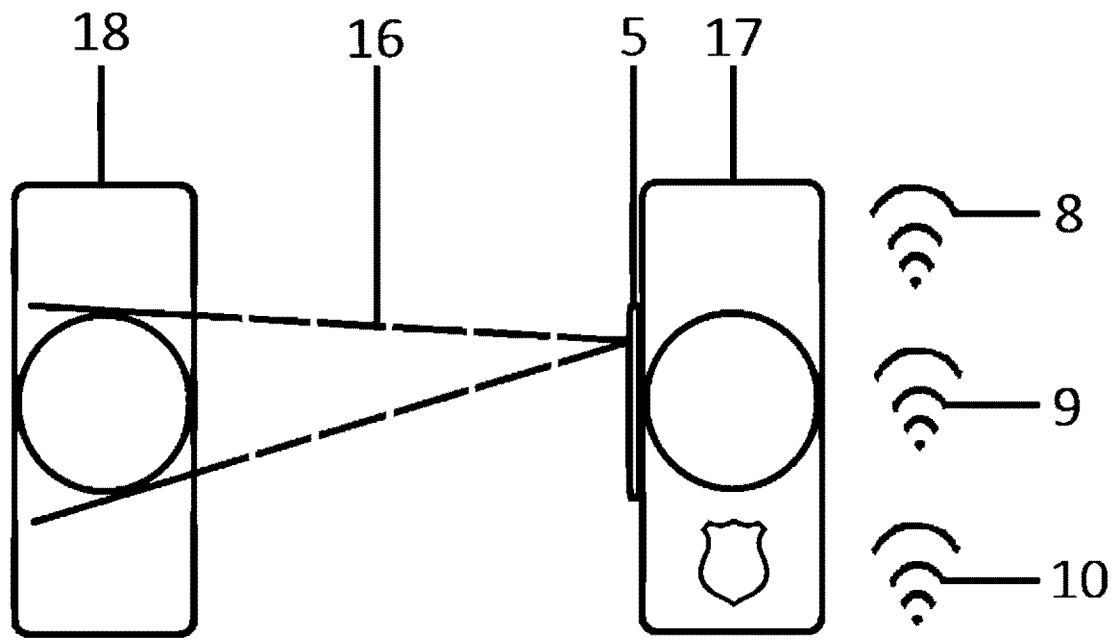
Figure 24:
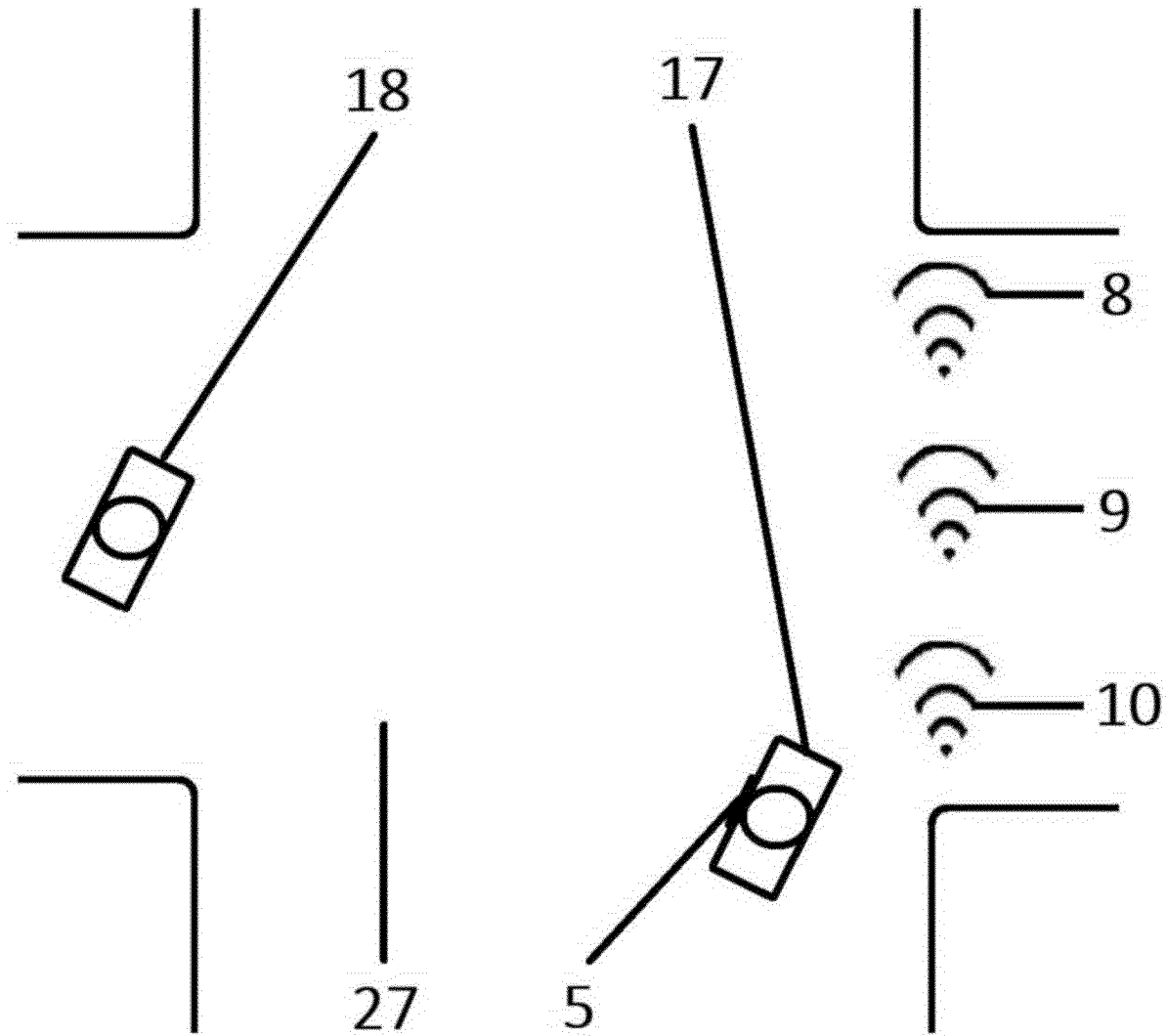
Figure 25:
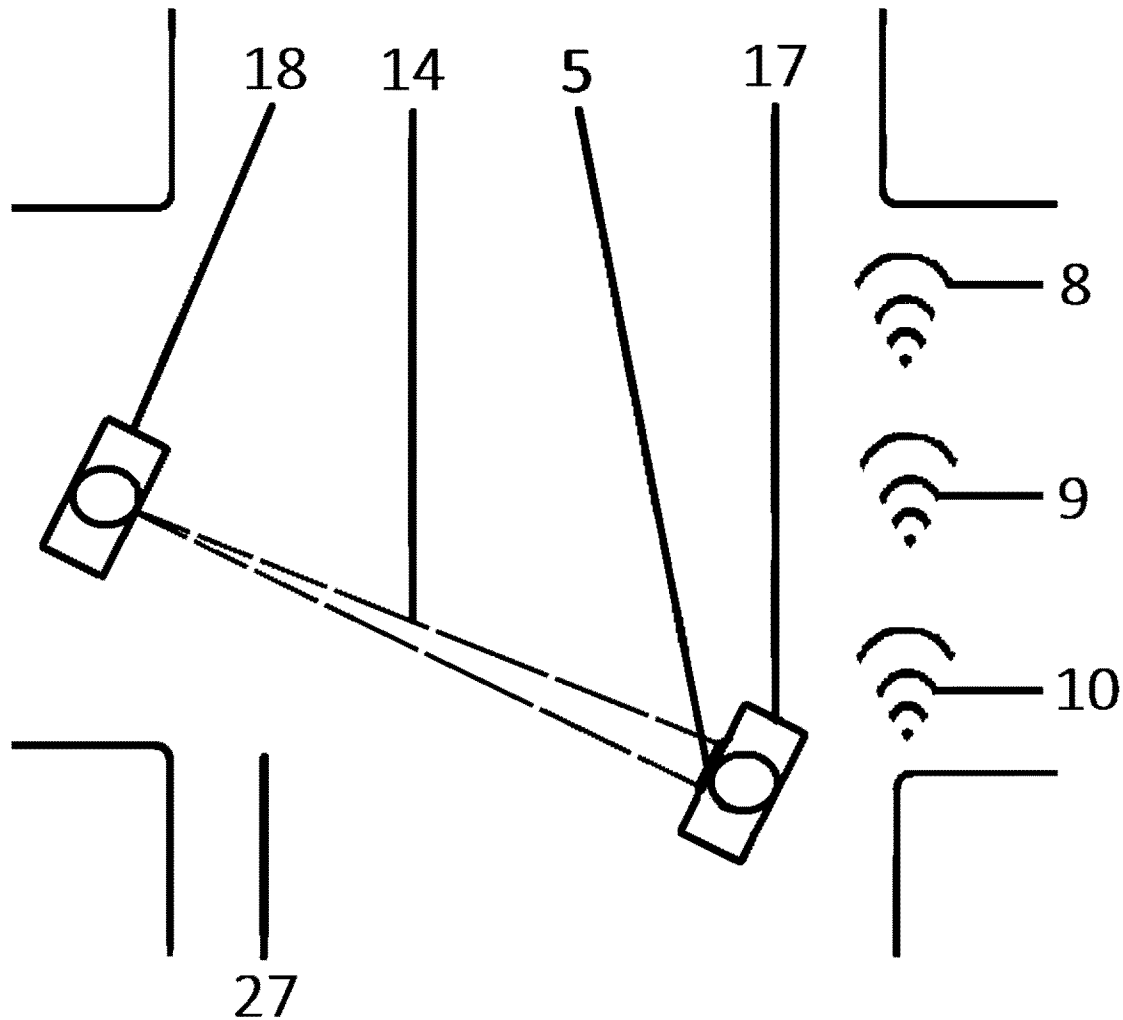
Figure 26:
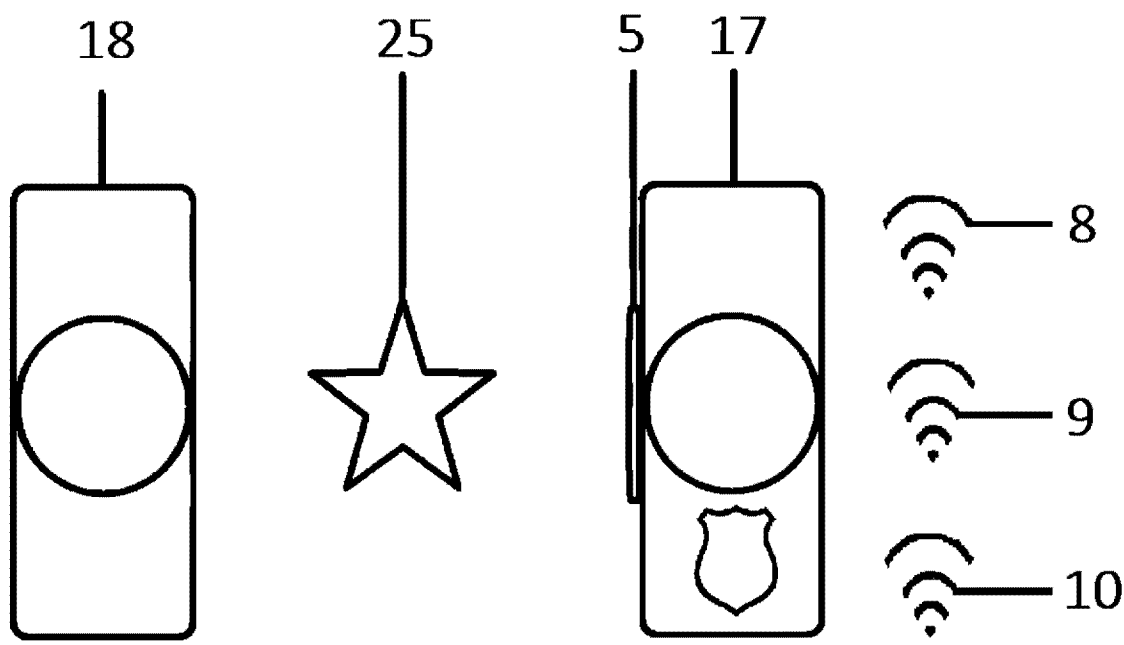
Figure 27:
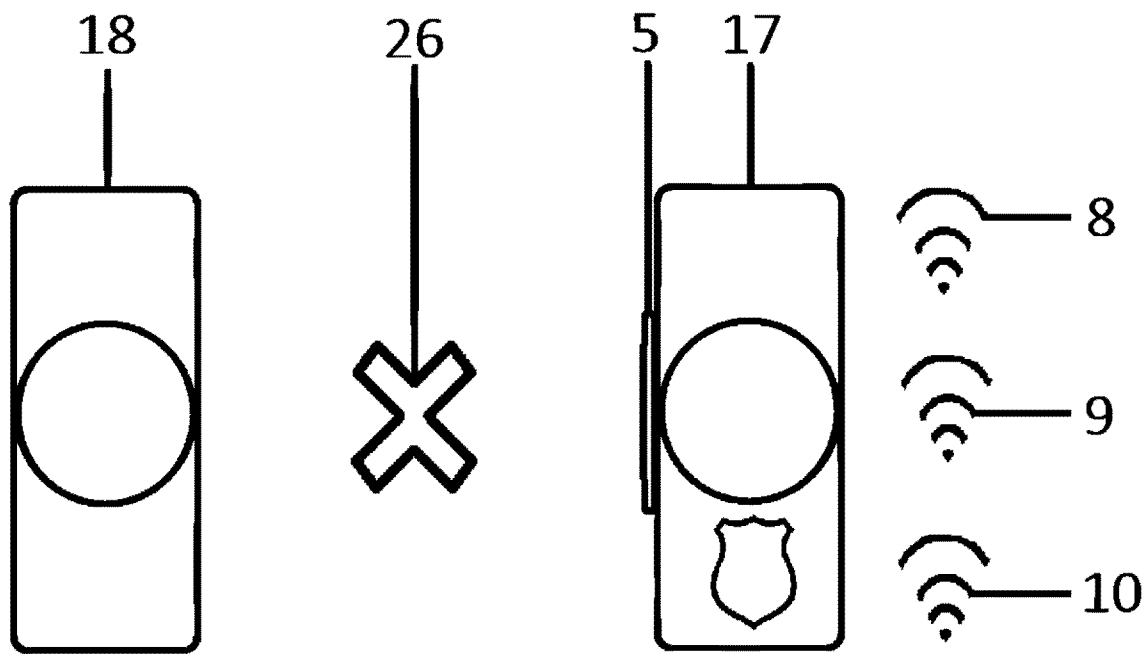
Figure 29:
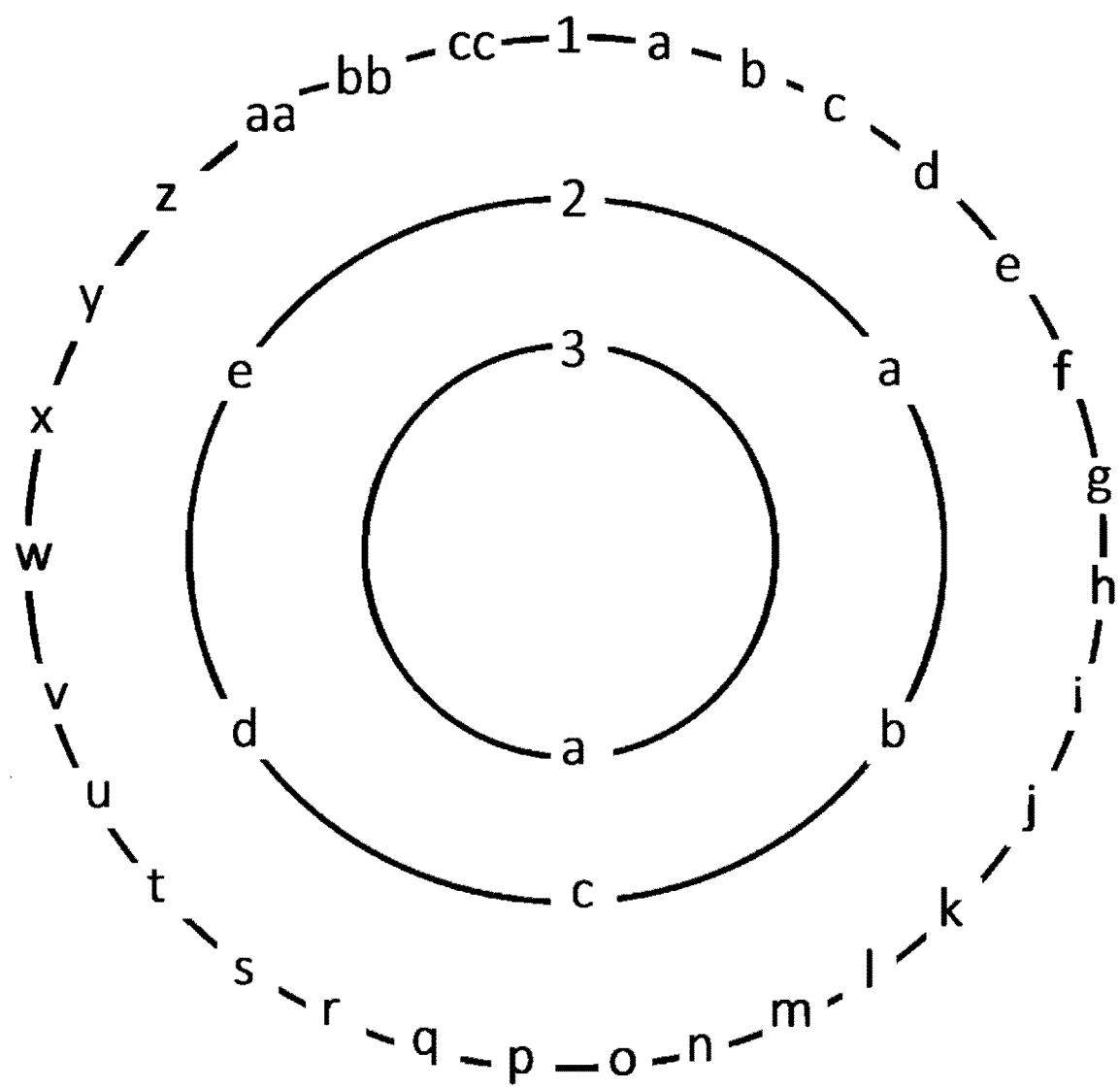

FIG. 29 illustrates programmatically performing all processes as unified.

DETAILED DESCRIPTION OF THE INVENTION

In light of a detailed description of the present invention, a process, consistent with the subject matter and implementation thereof of a claim of the present invention, is herein provided.

Figure 1:
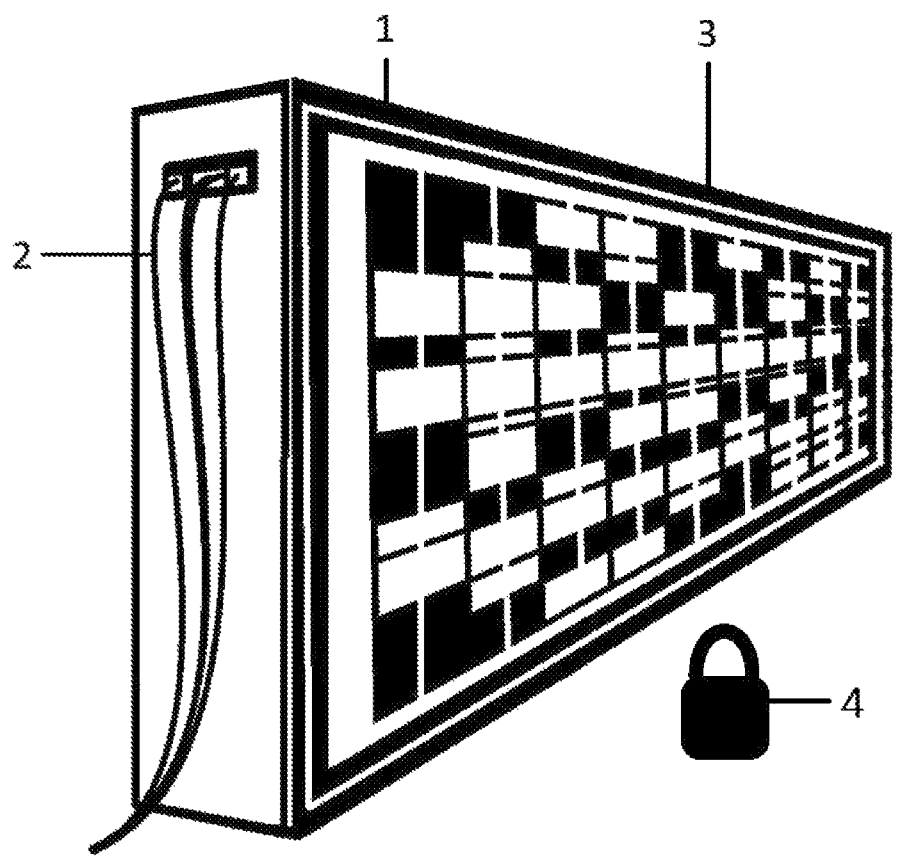
FIG. 1 illustrates a central computer process that is processing a data and connected to a network and is equipped with a non-transitory computer-readable medium and is secured.

FIG. 1 illustrates a central computer 1 process that is processing a data and connected to a network 2 and is equipped with a non-transitory computer-readable medium 3 and is secured 4. The central computer 1 is processing a data of a unified process for immediate intervention 42 of local and remote parties interactive audio-visual teleconferencing through means of a local authority's dedicated battery powered wearable mobile computerized device 31 display monitor 6 interface platform; processing a data of an encoding the central computer's 1 non-transitory computer readable medium with a database with a registry of a uniquely identifying criteria of authoritative and local individual's 18 personally identifying criteria and facial recognition data means; processing a data of an equipping the LAMP 5 with a computerized data processor and programming the computerized data processor of the LAMP 5 to perform a calculation of a sub-processing of a data; processing a data of an equipping the LAMP 5 with a plurality of human organism presence detection 15 method means, a triangulation 14 means, a global positioning satellite (GPS 9) technology (x, y) coordinate means, a geographical orientation compass means, an electronic communication and signalizations means (ECS 10), a display monitor 6 means, a digital imaging camera(s) 38 means, an audio speaker 13 means, a touchscreen keyboard means, an initializing means, a network 2 connectivity means and connecting the LAMP 5 to the network 2; processing a data of a programming the computerized data processor of the LAMP 5 to perform a sub-processing calculation of a plurality of human organism presence detection method means data, a geographical orientation compass data means, a triangulation 14 means data, a GPS 9 (x, y coordinate) means data, and an (ECS 10) data; processing a data of a programming the central computer 1 to perform a calculation from a sub-processed data received through the network 2 from the LAMP 5 of a plurality of human organism detection means data, to perform a calculation of a triangulation 14 means data, to perform a calculation of a geographical orientation compass means, to perform a calculation of a GPS 9 (x, y coordinate) means data, to perform a calculation of an ECS 10, a calculation of a teleconferencing means, a calculation of an access of database of a registry of a uniquely identifying criteria of authoritative and local individual's 18 personally identifying criteria and facial recognition data means; processing a data of an assigning a local authority 17, a remote authority 19, a local individual 18, a remote contact individual 20 and a remote neutral moderator 21 with a unique identifying code 46; processing a data of an equipping a local authority 17 with a LAMP 5; processing a data of an assigning the LAMP 5 with a unique identifying code 46 and synchronizing a unique identifying code 46 of a local authority 17 with a unique identifying code 46 of a LAMP 5; processing a data of an programming the computerized data processor of the LAMP 5 with an application 40 that performs a calculation of a sub-processing data of a unique identifying code 46 and a synchronized unique identifying code 46 of a local authority 17 and a unique identifying code 46 of a LAMP 5; processing a data of an programming the computerized data processor of the computerized device 31 of the LAMP 5 to perform a process of a sub-processing of a data of an immediate intervention 42 Audio-Visual Teleconferencing IIAVT 22; processing a data of an designating an authority as local and designating an authority as remote; processing a data of a mounting the LAMP 5 upon and/or over a Personal Body Armor Vest 24 (PBAV), of a local authority 17; processing a data of a providing a means for local authorities, local individual's 18, remote authorities, remote contact individuals 35 and a remote neutral moderator 21 a means to input a uniquely identifying criteria of themselves into a secured 4 computerized registry of the central computer's 1 non-transitory computer readable medium 3 database; processing a data of a synchronizing a secured 4 computerized registry of the central computer's 1 non-transitory computer readable database of local authorities, LAMPs 5, local individuals 18, remote authorities. remote contact individuals 35 and remote neutral moderators 21; processing a data of a providing a registry of the central computer's 1 non-transitory computer readable medium with a list containing a list of synchronized unique identifying criteria of a local authorities, LAMPs 5, local individuals 18, remote authorities, remote contact individuals 35 and remote neutral moderators a unique identifying criteria; processing a data of a providing a means of a signatory documentation of accepting a term and condition to local individuals 18, remote authorities. remote contact individual 35 and remote neutral moderators, and encoding the central computer's 1 non-transitory computer readable medium with the signatory documentation of accepting a term and condition of the local individuals 18, remote authorities, remote contact individuals 35 and remote neutral moderators 21; processing a data of a providing a remote authority 19, a remote contact individual 20 and a remote neutral moderator 21 with a computerized device 31 and an immediate intervention 42 computerized IIAVT 22 application 40 means, inclusive of a means for being programmatically and immediately alerted of a pending 44 IIAVT 22; processing a data of an inputting a local individual's 18 unique identifying criteria by a local authority 17 into a LAMP 5 and sub-processing a local individual's 18 unique identifying criteria by the computer processor of the LAMP 5 and transmitting a sub-processed data of a local individual's 18 unique identifying criteria through the network 2 to the central computer 1; processing a data of an encoding the central computer's 1 non-transitory computer readable medium with a uniquely identifying criteria registry of local individual's 18 facial recognition 16 database; processing a data of an performing a facial recognition 16 process programmatically utilizing the LAMP's 5 camera 38 by capturing a digital image of a facial likeness data of a local individual's 18 utilizing the LAMP's 5 camera 38 digital imaging means, transferring the likeness data through the network 2 to the central computer 1, the central computer 1 performing a facial recognition 16 likeness calculation of an individual and determining an identity of a local individual's 18; processing a data of an establishing a geographical global position of a local authority 17 through a sub-processed data received through the network 2 from the LAMP 5 and determining a geographical orientation of a local authority 17 from a sub-processed data of a LAMP 5 compass 45 data that was sent through the network 2 and as calculated by the central computer 1; processing a data of an establishing a GPS 9 (x, y) coordinate of a local individual 18 in relation to a local authority 17 through a GPS 9 (x, y) coordinate data of a local authority 17 and a triangulation 14 data that was sub-processed by a LAMP 5 and sent through the network 2 to the central computer 1 and as calculated by the central computer 1; processing a data of an designating a local identified individual as local in relation to the local authority 17 and as remote to the remote authority 19, and designating an authoritative individual as remote in relation to the local authority 17 and as remote in relation to the local and identified individual and designating an remote contact individual 19 as remote in relation to the local authority 17 and as remote in relation to the local identified individual; processing a data of a designating a remote neutral moderator 21 as remote to a local authority 17, a local identified individual and a remote authority 19; processing a data of an initializing an IIAVT 22 between a local authority 17, a local individual 18, a remote authority 19, a remote contact individual 19 and a remote neutral moderator 21; processing a data of an engaging the local authority 17, the local identified individual 18, the remote authority 19, remote contact individual 20 and the remote neutral moderator 21 in an IIAVT 22 by immediately and programmatically alerting all parties in the event a local authority 17 and a local individual's 18 are interacting; processing a data of a providing a remote neutral moderator 21 a means to moderate an IIAVT 22; processing a data of a storing a record of the IIAVT 22 in the central computer's 1 non-transitory computer readable medium 3; processing a data of a providing a local authority 17, a local individual 18, a remote authority 19, a remote individual and a remote neutral moderator 21 a means of training 43 in order to practice the processes of the present invention; processing a data of a providing a remote authority 19, a remote contact individual 20 and a remote neutral moderator 21 a computerized application 40 means to be programmatically alerted upon an occasion that a local authority 17 is interacting with a local individual's 18; processing a data of an encoding the central with a registry comprising local authorities 17, local individuals 18, remote authorities 19, remote contacts individuals 20 and remote neutral moderators 21; processing a data of an encoding the central computer's 1 non-transitory computer readable medium 3 with a local authority's 17, a local individual's 18, a remote authority's 19, a remote contact individual 20 and a remote neutral moderator 21 with a registry condition of a legal record and a legal contract 36 and providing a signatory line of a legal contract 36 of a local authority's 17, a local individual's 18, a remote authority's 17, a remote contact individual 20 and a remote neutral moderator 21 in a manner consistent with an enforcement of a law and an exercise of a right as expressed in a term and a condition of a legal contract 36; processing a data of a securing and initializing all processes; and processing a data of a programmatically performing all processes as operationally unified 47.

Figure 2:
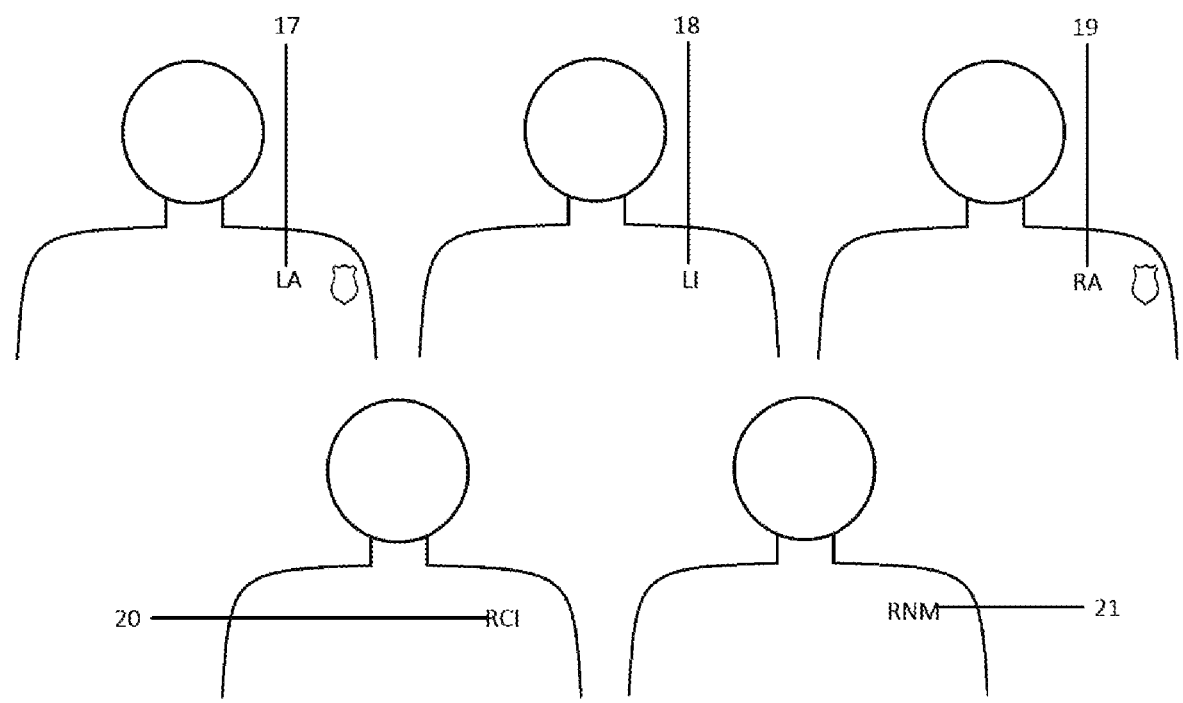
FIG. 2 illustrates five (5) individuals; a local authority (abc123), a local individual (def456), a remote authority (ghi789), a remote contact individual (jk1101112) and a remote neutral (nmo131415).

FIG. 2 illustrates five (5) individuals; a local authority 17 (abc123), a local individual's 18 (def456), a remote authority 19 (ghi789), a remote contact individual 20 (jk1101112) and a remote neutral moderator 21 (mno131415).

FIG. 3 illustrates a computerized device 31 of a local authority 17 (abc123), that is connected to a network 2. The local authority 17 (abc123), is inputting a professional data of the local authority 17 (abc123) and signing a contract 36 that is formed in a manner consistent with a term and a condition in accordance with a law and a right. The contract 36 stipulates a term and a condition of utilizing the processes of the present invention in accordance with a manner that is consistent with a term and a condition of a law and a right. A data of the local authority 17 (abc123) is being transmitted through the network 2 and is being stored in the central computer's 1 non-transitory computer readable medium 3.

FIG. 4 illustrates a computerized device 31 of a local individual's 18 (def456), that is connected to a network 2. The local individual's 18 (def456), is inputting a personal data 34 of the local individual's 18 (def456), list of remote contact individuals 20, the local individual's remote contacts my consist of though not be limited to a family relation such a spouse, a parental figure, a professional colleague, a friend, neighbor or spiritual advisor and a private attorney, and signing a contract 36 that is formed in a manner consistent with a term and a condition in accordance with a law and a right. The contract 36 stipulates a term and a condition of utilizing the processes of the present invention in accordance with a manner that is consistent with a term and a condition of a law and a right. A data of the local individual's 18 (def456) is being transmitted through the network 2 and is being stored in the central computer's 1 non-transitory computer readable medium 3.

FIG. 5 illustrates a computerized device 31 of a remote authority 19 (ghi789), that is connected to a network 2. The remote authority 19 (ghi789), is inputting a professional data of the remote authority 19 (ghi789) and signing a contract 36 that is formed in a manner consistent with a term and a condition in accordance with a law and a right. The contract 36 stipulates a term and a condition of utilizing the processes of the present invention in accordance with a manner that is consistent with a term and a condition of a law and a right. A data of the remote authority 19 (ghi789), is being transmitted through the network 2 and is being stored in the central computer's 1 non-transitory computer readable medium 3.

FIG. 6 illustrates a computerized device 31 of a remote contact individual 20 (jk101112), that is connected to a network 2. The remote contact individual 20 (jk101112), is inputting a personal data 34 of the remote contact individual 20 (jk101112) and signing a contract 36 that is formed in a manner consistent with a term and a condition in accordance with a law and a right. The contract 36 stipulates a term and a condition of utilizing the processes of the present invention in accordance with a manner that is consistent with a term and a condition of a law and a right. A data of the remote contact individual 20 (jk101112), is being transmitted through the network 2 and is being stored in the central computer's 1 non-transitory computer readable medium 3.

FIG. 7 illustrates a computerized device 31 of a remote neutral moderator 21 (mno131415), that is connected to a network 2. The remote neutral moderator 21 (mno131415), is inputting a professional data of the remote neutral moderator 21 (mno131415) and signing a contract 36 that is formed in a manner consistent with a term and a condition in accordance with a law and a right. The contract 36 stipulates a term and a condition of utilizing the processes of the present invention in accordance with a manner that is consistent with a term and a condition of a law and a right. A data of the remote neutral moderator 21 (mno131415), is being transmitted through the network 2 and is being stored in the central computer's 1 non-transitory computer readable medium 3.

FIG. 8 illustrates a computerized device 31 of a remote local authority 17 (abc123) that is connected to a network 2 and transmitting a data to the central computer 1 and is equipped with a digital camera 38 means, a speaker 13 means and a microphone means. The local authority 17 (abc123) has completed a training 43 a requirement for practicing the processes of the present invention.

FIG. 9 illustrates a computerized device 31 of a local authority 17 (abc123) that is connected to a network 2 and transmitting a data to the central computer 1 and is equipped with a digital camera 38 means, a speaker 13 means and a microphone means. The local authority 17 (abc123) has completed a training 43 as required for practicing the processes of the present invention.

FIG. 10 illustrates a computerized device 31 of a remote authority 19 (ghi789) that is connected to a network 2 and transmitting a data to the central computer 1 and is equipped with a digital camera 38 means, a speaker 13 means and a microphone means. The remote authority 19 (ghi789) has completed a training 43 as required for practicing the processes of the present invention.

FIG. 11 illustrates a computerized device 31 of a remote contact individual 20 (jk1101112) that is connected to a network 2 and transmitting a data to the central computer 1 and is equipped with a digital camera 38 means, a speaker 13 means and a microphone means. The remote contact individual 20 (jk1101112) has completed a training 43 as required for practicing the processes of the present invention.

FIG. 12 illustrates a computerized device 31 of a remote neutral moderator 21 (mno131415) that is connected to a network 2 and transmitting a data to the central computer 1 and is equipped with a digital camera 38 means, a speaker 13 means and a microphone means. The remote neutral moderator 21 (mno131415) has completed a training 43 as required for practicing the processes of the present invention.

FIG. 13 illustrates a computerized device 31 of a (remote authority 19 (ghi789), a remote contact individual 20 (jk1101112) and a remote neutral moderator 21 (mno131415)). The computerized device 31 of the (remote authority 19 (ghi789), remote contact individual 20 (jk1101112) and remote neutral moderator 21 (mno131415)) is displaying a, "Pending 44 Immediate intervention 42 Audio-Visual Teleconference" window and the (remote authority 19 (ghi789), remote contact individual 320 (jk1101112) and a remote neutral moderator 21 (mno131415)) are engaging an "App 40" icon.

FIG. 14 illustrates a computerized device 31 that is connected to the network 2 and displaying an inset window of an ongoing audio-visual teleconference involving the parties of: a remote authority 19 (ghi789) a remote contact individual 20 (jk1101112), and a remote neutral moderator 21 (mno131415). The immediate intervention 42 audio-visual teleconferencing is ongoing as a result of a local authority 17 (abc123) interacting with a local individual's 18 (def456).

FIG. 15 illustrates an alternative embodiment 37 of computerized device 31 in the form of a cellular or "smartphone" of a (remote authority 19 (ghi789), a remote contact individual 20 (jk1101112) and a remote neutral moderator 21 (mno131415)). The alternative embodiment 37 of computerized device 31 in the form of a cellular or "smartphone" of the (remote authority 19 (ghi789), remote contact individual 20 (jk1101112) and remote neutral moderator 21 (mno131415)) is displaying a, "Pending 44 Immediate intervention 42 Audio-Visual Teleconference" window and the (remote authority 19 (ghi789), remote contact individual 20 (jk1101112) and a remote neutral moderator 21 (mno131415)) are engaging an "App 40" icon.

FIG. 16 illustrates an alternative embodiment 37 of the computerized device 31 in the form of a cellular or "smartphone" that is connected to the network 2 and displaying an inset window of an ongoing audio-visual teleconference involving the parties of: a remote authority 19 (ghi789) a remote contact individual 20 (jk1101112), and a remote neutral moderator 21 (mno131415). The immediate intervention 42 audio-visual teleconferencing is ongoing as a result of a local authority 17 (abc123) interacting with a local individual's 18 (def456).

FIG. 17 illustrates a local authority 17 (abc123) wearing a personal protective equipment in the form of a bullet proof vest 24. A LAMP 5 is mounted on the vest 24 of the local authority 17 (abc123).

FIG. 18 illustrates a detailed view of a LAMP 5 comprising: a monitor 6, initializing button 7, network 2 connection means, GPS 9, means, ECS 10, digital camera(s) 38 means, digital microphone means, digital audio speaker(s) 13 means, triangulation 14 means, human organism presence detection 15, facial recognition 16, touchscreen keyboard 41, an inset windows 23 of an ongoing IIAVT 22 inclusive of remote authorities (ghi789), remote contact individual(s) 35 (jk1101112), and a remote neutral moderator 21 (mno131415).

FIG. 19 illustrates an aerial view of a local authority 17 (abc123), who is equipped with a LAMP 5 inclusive of network 2 connectivity means, GPS 9 and ECS 10 and interacting with a local individual 18. The local authority 17 is equipped with a LAMP 5 inclusive of ECS 10.

FIG. 20 illustrates an aerial view of a local authority 17, who is equipped with a LAMP 5 inclusive of network 2 connectivity means, GPS 9 ECS 10, and interacting with a local individual 18 (def456) and utilizing an infrared 15 means of the LAMP 5 in order to detect the presence of a human organism by detecting a human organism body temperature signature 28.

FIG. 21 illustrates an aerial view of a local authority 17 (abc123), who is equipped with an operative LAMP 5 inclusive of network 2 connectivity means, GPS 9 and ECS 10, and interacting with a local individual 18 (def456) and utilizing an human organism heartbeat 29 signature means of the LAMP 5 in order to detect the presence of a human organism.

FIG. 22 illustrates an aerial view of a local authority 17 (abc123), who is equipped with an operative LAMP 5 inclusive of network 2 connectivity means, GPS 9 and ECS 10, and with a local individual 18 (def456) and utilizing a three (3) dimensional figure contour means of the LAMP 5 in order to detect the presence of a human organism.

FIG. 23 illustrates an aerial view of a local authority 17 (abc123), who is equipped with an operative LAMP 5 inclusive of network 2 connectivity means, GPS 9 and ECS 10, and interacting with a local individual 18 (def456) and utilizing a facial recognition means of the LAMP 5 and identifying a local individual 18 (def456).

FIG. 24 illustrates an aerial view of a local authority 17 (abc123), who is equipped with an operative LAMP 5 inclusive of network 2 connectivity means, GPS 9 and ECS 10, and interacting with a local individual 18 (def456) in a locality 27.

FIG. 25 illustrates an aerial view of a local authority 17 (abc123), who is equipped with an operative LAMP 5 inclusive of network 2 connectivity means, GPS 9 and ECS 10, and interacting with a local individual 18 (def456) in a locality 27. The local authority 17 (abc123) is utilizing a triangulation 14 means of the local authority's 17 (abc123) LAMP 5 and transmitting a triangulation 14 data that has been sub-processed by the LAMP 5 through the network 2 to the central computer 1 by means of the LAMP's 5 ECMS 10 means. The central computer 1 is calculating a data of the LAMP 5 and determining a GPS 9 location of the local authority 17 (abc123) and calculating a sub-processed data of LAMP 5's that was sent through the network 2 by the LAMP 5's ECS 10 and calculating a determination of a local individual's 18 GPS 9 location in relation to the local authority's 17 GPS 9 location.

FIG. 26 illustrates an aerial view of a local authority 17 (abc123), who is equipped with a LAMP 5 inclusive of network 2 connectivity means, GPS 9 and ECS 10 and interacting with a local individual 18 (def456). The actions of the local authority 17 (abc123) and/or the actions of the local individual 18 (def456) are deemed consistent and compliant with the order of an enforcement of a law and the order of and exercise of a right as indicated by the iconic representation of a "Star".

FIG. 27 illustrates an aerial view of a local authority 17 (abc123), who is equipped with an operative LAMP 5 inclusive of network 2 connectivity means, GPS 9 and interacting with local individual 18 (def456). The actions of the local authority 17 (abc123) and/or the actions of the local individual 18 (def456) are deemed inconsistent and non-compliant with the order of an enforcement of a law and the order of and exercise of a right as indicated by the iconic representation of an "X".

FIG. 28 illustrates a unique identifying code 46.

FIG. 29 illustrates a claim and a limitation of the present invention programmatically performing all processes as unified 47.

I claim:

1. Unified process for Immediate Intervention of local and remote parties interactive Audio-Visual Teleconferencing (IIAVT) through means of a local authority's dedicated battery powered wearable mobile computerized device display monitor interface platform comprising at least; a secured central computer, a network, a Local Authority's dedicated battery powered wearable Mobile computerized device display monitor interface Platform (LAMP), a keyboard, a camera, a microphone, a speaker and comprised of the steps of;

a) equipping the central computer with a non-transitory computer readable medium, and connecting the central computer to the network;

b) encoding the central computer's non-transitory computer readable medium with a database of a uniquely identifying criteria of local authorities;

c) equipping the LAMP with a computerized data processor and programming it to sub-process data;

d) equipping the LAMP with means of: a plurality of human organism presence detection, triangulation, GPS, compass(es), electronic communication and signalizations (ECS), display monitor(s), digital imaging camera(s), audio speaker(s), microphone(s), keyboard(s), initializing, IIAVT, network connectivity, and connecting it to the network;

e) programming the computerized data processor of the LAMP to sub-process data of: a plurality of human organism presence detection, triangulation, GPS, compass(es), electronic communication and signalizations (ECS), display monitor(s), digital imaging camera(s), audio speaker(s), microphone(s), keyboard(s), initializing, network connectivity;

f) programming the central computer to calculate data from a sub-processed data received through the network from the LAMP of: a plurality of human organism detection, triangulation, GPS, compass(s), ECS, display monitor, digital camera(s), microphone(s), audio speaker(s), keyboard(s), initializing, IIAVT, and of local individuals' facial recognition data, and to determine an identity of a local individual from a sub-processed facial recognition data received from the LAMP;

g) assigning a local authority, a remote authority, a local individual, a remote contact individual and a remote neutral moderator, collectively, "all parties" with a unique identifying code;

h) equipping a local authority with a LAMP;

i) assigning the LAMP with a unique identifying code and synchronizing a unique identifying code of a local authority with a unique identifying code of a LAMP;

j) programming the computerized data processor of the LAMP to sub-process a data of a synchronized unique identifying code of a local authority and a unique identifying code of a LAMP;

k) programming the computerized data processor of the LAMP to sub-process a data of an IIAVT;

l) designating an authority as local and designating an authority as remote;

m) mounting the LAMP upon and/or over an equipment of a local authority;

n) providing all parties a means to input a uniquely personal identifying criteria of themselves into a registry of the central computer's non-transitory computer readable medium database;

o) synchronizing the registry list of the central computer's non-transitory computer readable database with LAMP codes and all parties' unique identifying criteria;

p) encoding the central computer's non-transitory computer readable medium database with the synchronist registry list of LAMP codes and all parties' unique identifying criteria;

q) providing a means of a signatory documentation of accepting a term and condition to all parties, and encoding the central computer's non-transitory computer readable medium with the signatory documentation of accepting a term and condition of all parties;

r) providing a remote authority, a remote contact individual and a remote neutral moderator with a computerized device and an IIAVT application means, inclusive of a means for being programmatically and immediately alerted of a pending IIAVT;

s) inputting a local individual's unique identifying criteria by a local authority into the LAMP, sub-processing and transmitting it through the network to the central computer;

t) encoding the central computer's non-transitory computer readable medium with a uniquely identifying criteria registry of local individual's facial recognition database;

u) performing a facial recognition process programmatically utilizing the LAMP's camera by capturing a digital image of a facial likeness data of a local individual, transferring the likeness data through the network to the central computer, the central computer performing a facial recognition likeness calculation of a local individual and determining an identity of a local individual;

v) establishing a global position and determining a geographical orientation of a local authority from a sub-processed data received through the network from the LAMP's compass data that was sent through the network and calculated by the central computer;

w) establishing a GPS (x, y) coordinate of a local individual in relation to a local authority by means of a GPS (x, y) coordinate and triangulation data of a local authority that was sub-processed by the local authority's LAMP and sent through the network to and calculated by the central computer;

x) designating a local identified individual as local in relation to the local authority and as remote to the remote authority, and designating an authority as remote in relation to the local authority and as remote in relation to the local identified individual, and designating a remote contact individual as remote in relation to the local authority and as remote in relation to the local identified individual;

y) designating a remote neutral moderator as remote to a local authority, a local identified individual and a remote authority;

z) initializing an IIAVT between all parties;

aa) engaging all parties in an IIAVT by immediately and programmatically alerting all parties when a local authority and a local individual are interacting;

bb) providing a remote neutral moderator a means to moderate an IIAVT; and cc) storing a recording of the IIAVT in the central computer's non-transitory computer readable medium.

2. A process of claim 1 further comprising the steps of:

a) providing all parties a means of training in order to practice the processes of the present invention;

b) providing a remote authority, a remote contact individual and a remote neutral moderator a computerized application means in order to be programmatically alerted when a local authority is interacting with a local individual;
c) encoding the central computer's non-transitory computer readable medium with a registry comprising all parties' uniquely personal identify criteria;
d) encoding the registry with a term and a condition of a legal contract comprised of a signatory line for all parties in a manner consistent with an enforcement of a law and an exercise of a right as expressed in a term and a condition of the legal contract; and
e) securing and initializing all processes.

3. A process of claim 1 further comprising the steps of:
a) programmatically performing all processes as operationally unified.

* * * * *

UNITED STATES PATENT AND TRADEMARK OFFICE
CERTIFICATE OF CORRECTION

PATENT NO. : 10,887,550 B2
APPLICATION NO. : 16/925726
DATED : January 5, 2021
INVENTOR(S) : Robert George Coghlan It is certified that error appears in the above-identified patent and that said Letters Patent is hereby corrected as shown below:

On the Title Page

Delete the title page and substitute therefore with the attached title page consisting of the corrected illustrative figure.

In the Drawings

Please replace FIGS. 1-29 with FIGS. 1-29 as shown on the attached pages.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*

(12) United States Patent
Coghlan

(10) Patent No.: US 10,887,550 B2
(45) Date of Patent: Jan. 5, 2021

(54) LOCAL AUTHORITY'S MOBILE PLATFORM

(71) Applicant: Robert George Coghlan, Hialeah, FL (US)

(72) Inventor: Robert George Coghlan, Hialeah, FL (US)

(*) Notice: Subject to any disclaimer, the term of this patent is extended or adjusted under 35 U.S.C. 154(b) by 0 days.

(21) Appl. No.: 16/925,726

(22) Filed: Jul. 10, 2020

(65) Prior Publication Data

US 2020/0344447 A1  Oct. 29, 2020

(51) Int. Cl.
*H04N 7/15* (2006.01)
*H04L 29/06* (2006.01)
*G06K 9/00* (2006.01)
*G06F 16/587* (2019.01)
*G06F 16/51* (2019.01)

(52) U.S. Cl.
CPC ........... *H04N 7/152* (2013.01); *G06F 16/51* (2019.01); *G06F 16/587* (2019.01); *G06K 9/00288* (2013.01); *H04L 63/0861* (2013.01)

(58) Field of Classification Search
CPC ......... H04N 7/15; H04L 29/06; G06F 16/51; G06F 16/587; G06K 9/00
USPC ............................ 348/14.01–14.16
See application file for complete search history.

(56) References Cited

U.S. PATENT DOCUMENTS

| | | | |
|---|---|---|---|
| 2003/0200227 A1* | 10/2003 | Ressler | G08G 1/017 |
| 2014/0368601 A1* | 12/2014 | deCharms | H04L 65/403 |
| | | | 348/14.02 |
| 2016/0173950 A1* | 6/2016 | Brown, Jr. | G06Q 30/0277 |
| | | | 725/116 |
| 2019/0318618 A1* | 10/2019 | Gilbert | G06Q 50/18 |

* cited by examiner

*Primary Examiner* — Melur Ramakrishnaiah

(57) ABSTRACT

A unified process of immediate intervention for local and remote parties interactive audio-visual teleconferencing by means of a local authority's dedicated battery powered wearable mobile computerized device display monitor interface platform is provided. The unified process includes among other embodiments and processes; a secured central computer, a network, and a Local Authority's Mobile Platform, (LAMP). A secured immediate intervention audio-visual teleconferencing (IIAVT) means initializes between a plurality of local and remote individuals when a local authority and a local individual are interacting by means of the local authority engaging a LAMP's initialization means, and whereas a process of the present invention is performed for the principle of maintaining an order of an enforcement of a law and an exercise of a right.

3 Claims, 29 Drawing Sheets

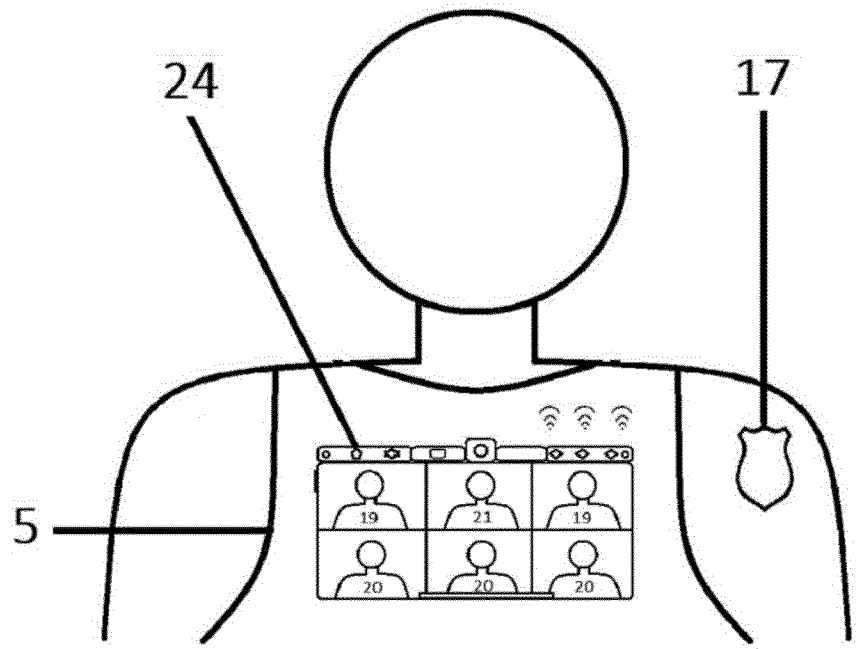

(XOXOXO)———— 46

FIGURE 28